US009057843B2

(12) United States Patent
Weber et al.

(10) Patent No.: US 9,057,843 B2
(45) Date of Patent: Jun. 16, 2015

(54) IMMERSED ASYMMETRIC REFLECTOR WITH REDUCED COLOR

(75) Inventors: Michael F. Weber, Shoreview, MN (US); Timothy J. Nevitt, Red Wing, MN (US); Tao Liu, Woodbury, MN (US); John A. Wheatley, Lake Elmo, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 275 days.

(21) Appl. No.: 13/501,860

(22) PCT Filed: Oct. 22, 2010

(86) PCT No.: PCT/US2010/053670
§ 371 (c)(1),
(2), (4) Date: Apr. 13, 2012

(87) PCT Pub. No.: WO2011/050233
PCT Pub. Date: Apr. 28, 2011

(65) Prior Publication Data
US 2012/0206674 A1 Aug. 16, 2012

Related U.S. Application Data

(60) Provisional application No. 61/254,692, filed on Oct. 24, 2009, provisional application No. 61/298,830, filed on Jan. 27, 2010.

(51) Int. Cl.
*G02F 1/1335* (2006.01)
*G02F 1/1333* (2006.01)
(Continued)

(52) U.S. Cl.
CPC ............ *G02B 5/305* (2013.01); *G02F 1/13362* (2013.01); *G02B 6/005* (2013.01)

(58) Field of Classification Search
USPC .................................. 349/96–98, 84; 359/495
See application file for complete search history.

(56) References Cited

U.S. PATENT DOCUMENTS 3,610,729 A 10/1971 Rogers
4,446,305 A 5/1984 Rogers
(Continued)

FOREIGN PATENT DOCUMENTS

WO    WO 94/10589 A1    5/1994
WO    WO 95/17699 A1    6/1995
WO    WO 2008/144656    11/2008

OTHER PUBLICATIONS

Berremen, "Bragg Reflection of Light From Single-Domain Cholesteric Liquid-Crystal Films", Physical Review Letters, Aug. 31, 1970, vol. 25, Issue 9, pp. 577-581.
(Continued)

*Primary Examiner* — Dung Nguyen
(74) *Attorney, Agent, or Firm* — David J. Iden

(57) ABSTRACT

A film construction (610) includes a group of microlayers that reflect normally incident light polarized along a first axis more than normally incident light polarized along a second axis. The microlayers are arranged into optical repeat units (ORUs) that have a layer thickness distribution along a thickness axis perpendicular to the first and second axes that provides the group of microlayers with an intermediate reflectivity over an extended reflection band for a given incidence condition. The ORUs include thinner ORUs whose thicknesses are less than an average thickness, and thicker ORUs whose thicknesses are greater than the average thickness. The group of microlayers is optically immersed in a medium having a refractive index greater than air, such that "supercritical light" can propagate through the microlayers. The microlayers are oriented such that, on average, the thinner ORUs are closer than the thicker ORUs to an output surface of the construction. By "supercritical light" is meant that travels through the film at an angle that is more oblique than can be achieved by illumination from air using a flat, smooth air/film interface.

23 Claims, 20 Drawing Sheets

(51) Int. Cl.
  *G02B 5/30* (2006.01)
  *F21V 8/00* (2006.01)

(56) References Cited

U.S. PATENT DOCUMENTS

| | | | |
|---|---|---|---|
| 5,103,337 A | 4/1992 | Schrenk | |
| 5,122,905 A * | 6/1992 | Wheatley et al. | 359/586 |
| 5,360,659 A | 11/1994 | Arends | |
| 5,486,949 A | 1/1996 | Schrenk | |
| 5,770,306 A * | 6/1998 | Suzuki et al. | 428/328 |
| 5,882,774 A | 3/1999 | Jonza | |
| 6,157,490 A | 12/2000 | Wheatley | |
| 6,179,948 B1 | 1/2001 | Merrill | |
| 6,207,260 B1 | 3/2001 | Wheatley | |
| 6,368,699 B1 | 4/2002 | Gilbert | |
| 6,752,505 B2 | 6/2004 | Parker | |
| 6,783,349 B2 | 8/2004 | Neavin | |
| 7,019,905 B2 | 3/2006 | Weber | |
| 7,851,054 B2 * | 12/2010 | Weber et al. | 428/220 |
| 8,035,774 B2 * | 10/2011 | Ouderkirk et al. | 349/96 |
| 2006/0082699 A1 | 4/2006 | Gehlsen | |
| 2008/0037127 A1 | 2/2008 | Weber | |
| 2008/0111959 A1 * | 5/2008 | Su et al. | 349/114 |
| 2010/0265584 A1 | 10/2010 | Coggio | |
| 2012/0021134 A1 | 1/2012 | Kolb | |
| 2012/0026431 A1 | 2/2012 | Coggio | |
| 2012/0027945 A1 | 2/2012 | Kolb | |
| 2012/0038850 A1 | 2/2012 | Hao | |
| 2012/0038990 A1 | 2/2012 | Hao | |
| 2012/0039089 A1 | 2/2012 | Hao | |
| 2012/0195050 A1 | 8/2012 | Pokorny | |
| 2012/0200931 A1 | 8/2012 | Haag | |
| 2012/0201977 A1 | 8/2012 | Haag | |
| 2012/0206806 A1 | 8/2012 | Weber | |
| 2012/0275023 A1 | 11/2012 | Weber | |

OTHER PUBLICATIONS

Azzam, "Ellipsometry and Polarized Light" 1977, 9 pages.

* cited by examiner

IMMERSED ASYMMETRIC REFLECTOR WITH REDUCED COLOR

CROSS REFERENCE TO RELATED APPLICATIONS

This application is a national stage filing under 35 U.S.C. 371 of PCT/US2010/053670, filed on Oct. 22, 2010, which claims priority to U.S. Provisional Application No. 61/254,692, filed on Oct. 24, 2009, and U.S. Provisional Application No. 61/298,830, filed on Jan. 27, 2010, the disclosure of which is incorporated by reference in its/their entirety herein.

FIELD OF THE INVENTION

This invention relates generally to optical films whose reflection and transmission characteristics are determined in large part by constructive and destructive interference of light reflected from interfaces between microlayers within the film, with particular application to combinations of such films with other components, such as components suitable for use in display systems or other lighting systems, for example. The invention also relates to associated articles, systems, and methods.

BACKGROUND

Reflective polarizers composed of a plurality of microlayers whose in-plane refractive indices are selected to provide a substantial refractive index mismatch between adjacent microlayers along an in-plane block axis and a substantial refractive index match between adjacent microlayers along an in-plane pass axis, with a sufficient number of layers to ensure high reflectivity for normally incident light polarized along the block axis while maintaining low reflectivity and high transmission for normally incident light polarized along the pass axis, have been known for some time. See, e.g., U.S. Pat. Nos. 3,610,729 (Rogers), 4,446,305 (Rogers et al.), and 5,486,949 (Schrenk et al.).

More recently, researchers from 3M Company have pointed out the significance of layer-to-layer refractive index characteristics of such films along the direction perpendicular to the film, i.e. the z-axis, and shown how these characteristics play an important role in the reflectivity and transmission of the films at oblique angles of incidence. See, e.g., U.S. Pat. No. 5,882,774 (Jonza et al.). Jonza et al. teach, among other things, how a z-axis mismatch in refractive index between adjacent microlayers, more briefly termed the z-index mismatch or $\Delta n_z$, can be tailored to allow the construction of multilayer stacks for which the Brewster angle—the angle at which reflectance of p-polarized light at an interface goes to zero—is very large or is nonexistent. This in turn allows for the construction of multilayer mirrors and polarizers whose interfacial reflectivity for p-polarized light decreases slowly with increasing angle of incidence, or is independent of angle of incidence, or increases with angle of incidence away from the normal direction. As a result, multilayer films having high reflectivity for both s- and p-polarized light for any incident direction in the case of mirrors, and for the selected direction in the case of polarizers, over a wide bandwidth, can be achieved.

BRIEF SUMMARY

As manufacturers continue to consolidate functionality of optical films and other optical components into fewer and fewer piece parts to reduce cost and improve performance, multilayer optical films that previously were placed into a product as a stand-alone film, with air gaps at both major surfaces of the film, may now be bonded or otherwise joined to other films or optical components such that the air gaps are no longer present at the outer surfaces of the multilayer optical film. Depending on the nature of the optical components that are joined to the multilayer optical film, the multilayer optical film in such a film construction may be "optically immersed" in a material of refractive index greater than air such that light is able to propagate through the film at "supercritical" angles, i.e., angles that are more oblique than the critical angle for air.

We have discovered an unexpected characteristic of certain multilayer optical film constructions in which the multilayer optical film is optically immersed in this way. When the multilayer optical film is designed as a relatively broad band partial reflector, e.g., partially transmitting and partially reflecting light nominally uniformly over the visible wavelength range, and when the multilayer optical film has asymmetric normal incidence reflectance or transmission such that normally incident light polarized along a first axis is reflected more (or transmitted less) than normally incident light polarized along a second axis perpendicular to the first axis, we have found that the orientation or "sidedness" of the multilayer optical film relative to the observer, or relative to an input surface or output surface of the film construction, can have a significant and noticeable effect on the apparent color and/or spatial color uniformity of the system. For example, if the microlayers that make up the multilayer optical film are arranged into optical repeat units (ORUs) whose optical thicknesses are arranged according to a layer thickness profile, with thinner ORUs disposed generally closer to a first surface of the film and thicker ORUs disposed generally closer to a second surface of the film, the apparent color and/or spatial color uniformity of the system can be significantly different depending on whether the multilayer optical film is oriented (within the context of the film construction) with the first surface towards an output surface of the film construction (or an observer), or the second surface towards such output surface. This interesting and unexpected characteristic can be exploited to fabricate multilayer optical film constructions that are tailored to provide low perceived color variation, for example, in the intended application. Thus, if reduced color is desired, the multilayer optical film can be oriented so that the thinner ORUs are generally closer than the thicker ORUs to the output surface of the film construction.

We therefore disclose, among other things, film constructions that include a group of microlayers that reflect normally incident light polarized along a first axis more than normally incident light polarized along a second axis. The microlayers are arranged into optical repeat units (ORUs) that have a thickness distribution along a thickness axis perpendicular to the first and second axes that provides the group of microlayers with an intermediate reflectivity over an extended reflection band for a given incidence condition. The ORUs include thinner ORUs whose thicknesses are less than an average thickness, and thicker ORUs whose thicknesses are greater than the average thickness. The group of microlayers is optically immersed in a medium having a refractive index greater than air, such that supercritical light can propagate through the microlayers. The microlayers are oriented such that, on average, the thinner ORUs are closer than the thicker ORUs to an output surface of the construction. This orientation may be referred to as "thin-side-out".

We also disclose a film construction having an input surface and an output surface. The construction includes a plurality of microlayers arranged into optical repeat units (ORUs) to selectively reflect light by constructive or destructive interference, the microlayers having a greater reflectivity for normally incident light polarized along a first axis than for normally incident light polarized along a second axis, the first and second axes defining a film plane. The microlayers are optically immersed in a medium having a refractive index greater than air, such that supercritical light can propagate through the plurality of microlayers. The ORUs have a layer thickness distribution along a thickness axis perpendicular to the film plane, the layer thickness distribution having an average thickness and being effective to provide the plurality of microlayers with an intermediate reflectivity over an extended reflection band for a given incidence condition. Because of the thickness distribution, the ORUs include thinner ORUs whose thicknesses are less than the average thickness, and thicker ORUs whose thicknesses are greater than the average thickness. The microlayers are preferably oriented such that, on average, the thinner ORUs are closer than the thicker ORUs to the output surface.

The intermediate reflectivity provided by the microlayers over the extended band allows for partial reflection and partial transmission over this band. Depending on the system design of which the multilayer optical film is a part, such intermediate reflectivity may be designed to occur for a variety of desired incidence conditions. In one case, for example, the incidence condition may be for normally incident light polarized along the second axis, in which case the broadband partial reflection and transmission are associated with light of a "pass state". In another case, the incidence condition may be for normally incident light polarized along the first axis, in which case the broadband partial reflection and transmission are associated with light of a "block state". In other cases, the incidence condition may be for light incident obliquely in a selected plane of incidence. For example, s- or p-polarized light may be specified, or an average of s- and p-polarized light (unpolarized light). The selected plane of incidence may be a plane containing the first axis and the thickness axis, or a plane containing the second axis and the thickness axis, or a plane rotated at an intermediate position relative to those planes. For example, the plane of incidence may be a plane containing the thickness axis and rotated 10 degrees, or 20 degrees or 45 degrees, relative to the first axis. The angle of incidence in such a plane may be further specified, for example, at 49 degrees in a medium of refractive index 1.494, or at an angle of 38 degrees in such medium, or at other angles and in other media, as desired.

The microlayers may be arranged in a single optical packet, and the thinner ORUs may be disposed predominantly on a first side of the optical packet, and the thicker ORUs disposed predominantly on a second side of the optical packet, the first side facing the output surface of the film construction. Alternatively, the microlayers may be arranged in at least two distinct optical packets.

The plurality of microlayers may include a first set of microlayers comprising a first material and a second set of microlayers comprising a second material different from the first material. Each of the ORUs may include or consist essentially of a first microlayer from the first set of microlayers and a second microlayer from the second set of microlayers. In some cases, the first material may be biaxially birefringent, and in other cases the first material may be uniaxially birefringent. In either case, the second material may be substantially isotropic, or it may be birefringent.

The film construction may have first and second opposed major surfaces exposed to air, and the input surface may be or comprise the first major surface and the output surface may be or comprise the second major surface.

The plurality of microlayers may comprise low absorption materials such that percent transmission plus percent reflection of the plurality of microlayers is about 100%. The intermediate reflectivity may then, for example, include an average reflectivity for the given incidence condition of at least 10% but less than 90%, or at least 20% but less than 80%, over visible wavelengths from 400-700 nm, if desired.

The film construction may further include a first optical element connected to the plurality of microlayers with no air gap. Such a first optical element may include a microstructured surface, which may have any number of different shapes. The microstructured surface may have a regular repeating pattern, a random pattern, or a combination thereof. The microstructured surface may be faceted, with identifiable edges or boundaries between adjacent facets or other features, or it may be undulating with no such edges or boundaries. The microstructured surface may be formed, cast, coated, made by microreplication techniques involving a mold, or made by any other suitable technique such as incorporating beads or other particles into an otherwise smooth layer. In some cases, the microstructured surface may include a plurality of linear prisms, each of the prisms extending parallel to a prism axis. The prism axis may, for example, be substantially parallel to the second axis of the film construction, but other orientations of the prism axis may also be used as desired. Other types of prisms, including but not limited to 3-sided prisms or 4-sided prisms, may also be used. In some cases, the microstructured surface may include a regular or irregular array of lenticular structures.

The reflectivity for normally incident light polarized along the first axis may be R1 over visible wavelengths, and the reflectivity for normally incident light polarized along the second axis may be R2 over visible wavelengths, and R1 may be at least 50%, and R2 may be at least 10%, but these values should not be construed as limiting. In some cases, R1 may be 50% or less, and R2 may be 10% or less.

The film construction may also be included as part of an optical system, the system also including a light source disposed to introduce light into the film construction through the input surface. The system may also include a display panel disposed proximate the output surface of the film construction. The film construction may include a first optical element connected to the plurality of microlayers with no air gap. The first optical element may, for example, be or comprise a light guide, and the input surface may be a side surface of the light guide.

The optical system may include an optically thick layer, and the input surface may be a major surface of the optically thick layer. In some cases the major surface includes a microstructured surface. In some cases the optically thick layer may include light diffusive elements disposed therein.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

In the figures, like reference numerals designate like elements.

DETAILED DESCRIPTION OF ILLUSTRATIVE EMBODIMENTS

Most optical films that are suitable for use in displays, backlights, luminaires, and the like have optical transmission and reflection characteristics that change with the angle of incidence of light. Multilayer optical films, for example, which comprise a plurality of microlayers that are sufficiently thin so that some light is reflected from a plurality of the microlayer interfaces to undergo constructive or destructive interference to provide the desired reflective or transmissive properties, are specifically designed for a particular range of entrance and/or exit angles in a particular medium—typically air. Similarly, surface structured films, such as prismatic brightness enhancement films, are also specifically designed for a particular range of entrance and/or exit angles in air. For given incidence angles in air, propagation angles and exit angles for such optical films are determined by well known formulas such as Snell's law for refraction or other formulas such as those for diffractive gratings.

Many optical films used in liquid crystal display (LCD) applications are designed for use in air, i.e., light impinges from air on a first major surface of the film over a range of entrance angles, and light emerges from a second major surface of the film into air over a range of exit angles, and one or both of the entrance or exit angles cover a range from 0° to 90° in air. Such a film can be said to be "optically immersed" in air. This may be true even if it is difficult for the unaided eye to observe any air layer. For example, if one optical film is laid atop another optical film, it may appear to the unaided eye that the two films are in substantial contact over their entire major surfaces. Often, however, such films contact each other only at a finite number of points, and an optically thick air gap—i.e., one whose thickness is substantially greater than the wavelength of light of interest—is substantially maintained between the major surfaces of the films.

Market forces for reducing cost of LCD displays and other products, and/or for design enhancements such as reduced product thickness, may lead to a desire to identify and eliminate unnecessary components and to combine individual components into one or more packaged sets. In the case of optical films, such a desire may lead to an attempt to affix or attach the optical film to one or more other films or system components to form a laminate construction, wherein substantially no air gap exists between the elements of the laminate.

Figure 1:
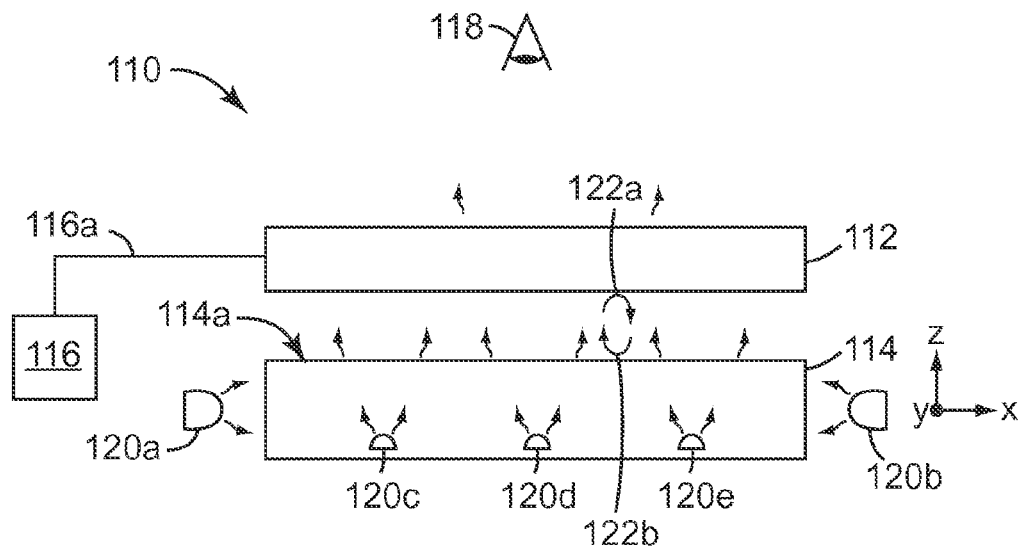
FIG. 1 is a schematic side view of a display system.

FIG. 1 shows a schematic side view of a typical display system 110 that includes a display assembly 112 and a backlight 114, within the context of a Cartesian x-y-z coordinate system for ease of reference. If the system 110 is an LCD, the display assembly 112 may include a liquid crystal (LC) display panel sandwiched between a front and back absorbing polarizer, the LC display panel further including glass panel plates between which liquid crystal material is disposed with an array of electrode structures and a color filter grid to form individually addressable picture elements (pixels). A controller 116 couples to the display assembly 112 via connection 116a to drive the electrode structures appropriately to produce a suitable image that can be perceived by an observer 118. The backlight 114 may be of the "edge lit" variety, in which case one or more LEDs, cold cathode fluorescent lamps (CCFLs), or other suitable light sources 120a, 120b are positioned along one or more edges or borders of the backlight, outside of the viewing area thereof. Alternatively, the backlight may be of the "direct lit" variety, in which case one or more such light sources 120c, 120d, 120e may be positioned in the viewing area behind a diffuser plate or other suitable element. In any event, the backlight 114 provides light over a large output area 114a corresponding to the viewing area of the display assembly 112. The light provided by the backlight is typically white, i.e., it includes an appropriate balance of red, green, and blue spectral components (or other suitable mix of spectral components) so that it appears at least nominally white to an observer.

The display system 110 also typically includes one or more optical films or other components between the display assembly 112 and the backlight 114 or elsewhere in the system. Depending on the type of display system, such components may include one or more polarizer (including e.g. absorptive polarizers and/or reflective polarizers), diffuser (including e.g. diffuser plates, gain diffusers, volume diffusers, and/or surface diffusers), and/or prismatic brightness enhancement film (including e.g. any of the wide variety of Vikuiti™ BEF products offered by 3M Company, St. Paul, Minn., USA), for example. Such films are often used to enhance the efficiency and/or brightness of the display system by reflecting "unusable light" (i.e., light that would not contribute to the desired system output, whether because it is of a polarization that would be absorbed by a rear absorbing polarizer in the display assembly 112 or because it is propagating at an unsuitable angle) away from the display assembly, and then redirecting some of that reflected light back towards the display assembly as "useable light" (i.e., light that can contribute to the system output) via a diffuse, specular, or semi-specular reflector, for example. Such reflection and re-direction of the light provides for at least some degree of light recycling in the display system, which recycling is indicated generally by arrows 122a, 122b.

Figure 2:
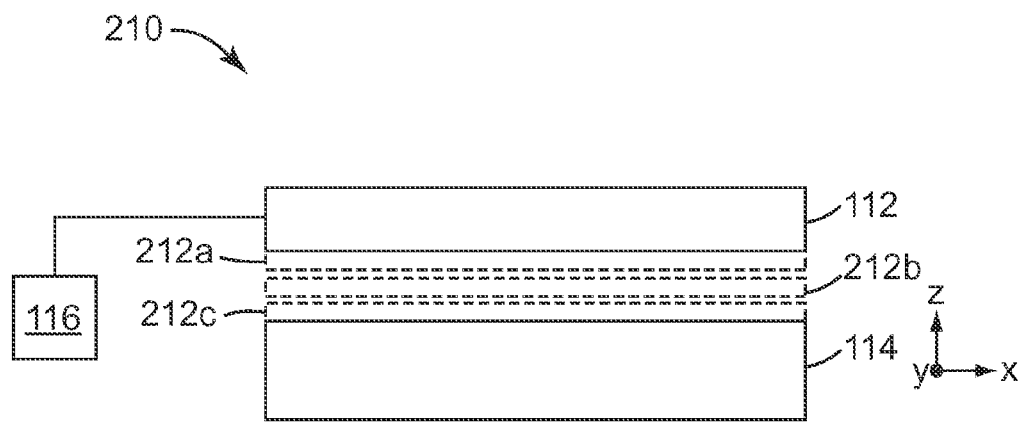
FIG. 2 is a schematic side view of the system of FIG. 1 which has been modified by the addition of laminates and/or films as disclosed herein.

The films and components normally located between the display assembly 112 and backlight 114, or disposed elsewhere, are candidates for use in the laminate constructions discussed above that are devoid of air gaps. Such laminate constructions are depicted generally in the display system 210 of FIG. 2. Except for the laminate constructions, the system 210 may be substantially identical to the system 110 of FIG. 1 including its various permutations discussed above, and like reference numerals are used to refer to like elements with no further description provided for brevity. The display system of FIG. 2, however, joins one or more optical films to other films or components with no air gap to provide one or more laminates 212a, 212b, 212c as shown. In the figure, laminate 212a attaches to the display assembly 112 (or a component thereof) with no air gap, and laminate 212c attaches to the backlight 114 (or a component thereof) with no air gap. In some cases, a laminate 212b may be provided that attaches one or more optical films to other film(s) or component(s) with no air gap therebetween, but that may be spaced apart from both the display assembly and the backlight via an air gap.

Depending on the types of optical films to be included in the laminates, the elimination of an air interface or air gap may or may not pose a problem for the operation of the optical film. In cases where each film or component to be joined does not substantially scatter or otherwise redirect light in the process of entering or after it enters one major surface and before it exits the other major surface of the film, the film may continue to function as it did before lamination, i.e., before elimination of the air gap. However, when the light enters the film through a non-planar surface, or through a surface that is not parallel to the film, the film may not function properly. One example of this is BEF prisms coated onto Vikuiti™ DBEF multilayer reflective polarizing film. Both the BEF prismatic film and the DBEF film are designed for use in air, but no loss of functionality occurs when the air gap is eliminated by optically coupling the planar surfaces of both films with e.g. an optical adhesive. Another example is a Vikuiti™ DBEF film laminated to an absorbing polarizer film. In both of these examples, the elimination of the air gap does not substantially affect the angular distribution of light that propagates through the affected films. Stated differently, each optical film in the laminate construction can said to be optically immersed in air, even though its major surfaces may not be in contact with air. This is explained further below in connection with FIGS. 3a-c.

In other cases, at least one film or component that generates highly oblique light is provided in the laminate, and the elimination of the air gap in combination with such highly oblique light has the effect of causing "supercritical" light to propagate through an optical film of interest and exit the laminate in such a way as to degrade system performance. By "supercritical" light we mean light that travels through the film at an angle that is more oblique than can be achieved by illumination from air using a flat, smooth air/film interface. Thus, when a film is optically immersed in air, the maximum angle of incidence for light impinging on the major surface of the film from air is 90 degrees. Such grazing incidence light is refracted into the film at the critical angle, $\theta_c$, which is a function of the refractive index of the film. The critical angle is typically the most oblique angle at which light would propagate within the film. For laminate constructions that allow supercritical light to propagate through the optical film and eventually emerge from the laminate construction, the optical film can be said to be optically immersed in a medium of higher refractive index than air. This is explained further below in connection with FIG. 3c. In the context of the present application, a film or component that is described as being "optically immersed" is assumed to be optically immersed in a medium whose refractive index is greater than that of air, unless otherwise indicated.

Such a situation can occur when laminating a BEF prismatic film to the diffuser plate of a backlight, or to an LCD panel, for example, using a conventional optical adhesive having an index of refraction near 1.5. In both cases the entrance and exit angles for the BEF film are dramatically affected by the refractive index of the laminating adhesive, which is significantly different from that of air. This situation can also occur when a diffuser is laminated with a conventional optical adhesive to one side of a reflective polarizer, the other side of which is then laminated to an LCD panel. In this case the optical adhesive transmits highly oblique light produced within the diffuser into the reflective polarizer as supercritical light, which may be further transmitted into the LCD panel. Since neither the reflective polarizer nor the LCD panel are typically designed to accommodate such highly oblique light, this can result in degraded performance by the polarizer and large amounts of internally scattered light within the LCD panel, which in turn may result in much lower display contrast and brightness. Even if the reflective polarizing film is redesigned to handle a larger range of incidence angles, such as by substantially widening the already broad reflection band of a multilayer stack reflective polarizer (e.g. by increasing the number of microlayers and extending the upper limit of the thickness gradient that characterizes the microlayers), such a redesigned film will continue to transmit the pass axis polarization of light through the larger ranges of angles and the problems cited will remain unsolved.

In order to minimize problems associated with supercritical light propagation in laminate constructions, it may in some cases be desirable and feasible to utilize a material layer that, from an optical design standpoint, resembles an air gap as closely as possible, e.g., a material layer that is both highly transmissive to light for light paths that are optically thick, and whose refractive index is close to 1.0. Stated differently, there is sometimes a need for a means to physically attach transmissive optical components in a surface-to-surface mode while still restricting the angles of entrance and exit to those comparable to air. Ultra-low index ("ULI") films with good mechanical integrity and low haze have recently been developed. Such films can be coated onto almost any optical film, so as to approximate an air gap, and then any conventional optical adhesive can be applied to join the coated film with another component in the system. Suitable ultra low index materials are described in, for example, the following U.S. patent applications which are incorporated herein in their entireties by reference: "Optical Film" filed on Apr. 15, 2009 and having Ser. No. 61/169,466; "Optical Construction and Display System Incorporating Same" filed on Apr. 15, 2009 and having Ser. No. 61/169,521; "Retroreflecting Optical Construction" filed on Apr. 15, 2009 and having Ser. No. 61/169,532; "Optical Film for Preventing Optical Coupling" filed on Apr. 15, 2009 and having Ser. No. 61/169,549; "Backlight and Display System Incorporating Same" filed on Apr. 15, 2009 and having Ser. No. 61/169,555; "Process and Apparatus for Coating with Reduced Defects" filed on Apr. 15, 2009 and having Ser. No. 61/169,427; "Process and Apparatus for A Nanovoided Article" filed on Apr. 15, 2009 and having Ser. No. 61/169,429; and "Optical Construction and Method of Making the Same" filed on Oct. 22, 2009 and having Ser. No. 61/254,243. Ultra-low index materials can also be made using a gel type of fumed silica. The ultra-low index material may have a refractive index over visible wavelengths in a range from 1.1-1.3, or from 1.15 to 1.25, for example. In many cases, the ULI material may be porous, and in some cases techniques can be used to seal the outer surface of a layer of ULI material so that liquid material from an adjacent layer, e.g., an adhesive layer, does not completely migrate into the pores of the ULI layer. Such techniques are disclosed in one or more of the cited applications.

The ultra-low index material may also exhibit a gradient in refractive index. For example, the material may be in the form of a gradient film or layer comprising a binder and a plurality of particles, wherein a weight ratio of the binder to the plurality of the particles is not less than about 1:2. The gradient optical film may further include a plurality of interconnected voids having a local volume fraction, wherein the local volume fraction of the plurality of interconnected voids varies along a thickness direction of the film so as to provide a local refractive index within the film that changes along such thickness direction. Reference is made to U.S. patent application Ser. No. 61/254,673, "GRADIENT LOW INDEX ARTICLE AND METHOD", and U.S. patent application Ser. No. 61/254,674, "PROCESS FOR GRADIENT NANOVOIDED ARTICLE", both filed on Oct. 24, 2009 and incorporated herein by reference.

Such ultra-low refractive index materials can be used in laminates that include angle-sensitive optical films so that such films can be mechanically and optically coupled to other films or components while minimizing the deleterious effects of supercritical light propagation. However, even when using one or more such ultra-low index material layer in a laminate construction, the effects of supercritical light propagation can still play an important part in system performance, and indeed can substantially degrade system performance unless design aspects of the multilayer optical film(s) and/or of other angle-sensitive optical films are properly handled.

Figure 3A:
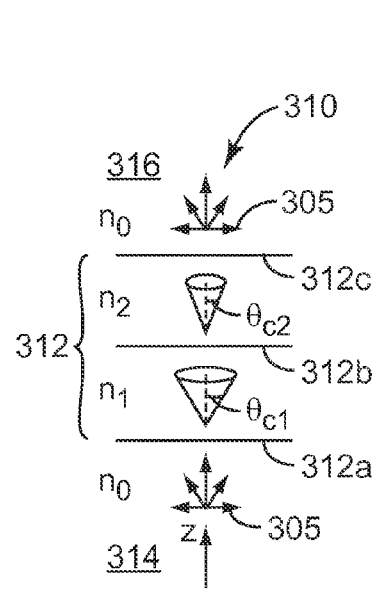
FIGS. 3a-c are a series of schematic side views of a simplified layered film to which other layers are applied, demonstrating the concept of immersing the film in a given optical medium.
Figure 3B:
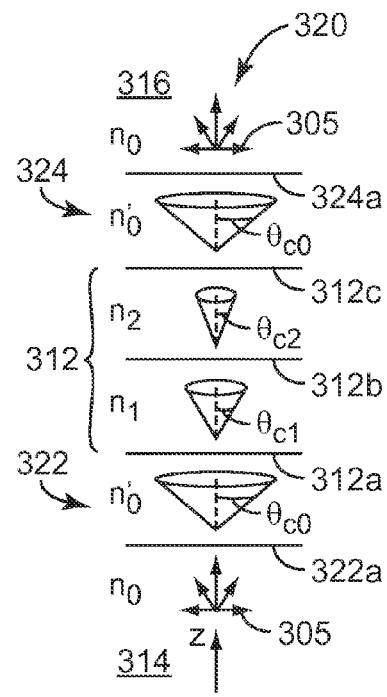
Figure 3C:
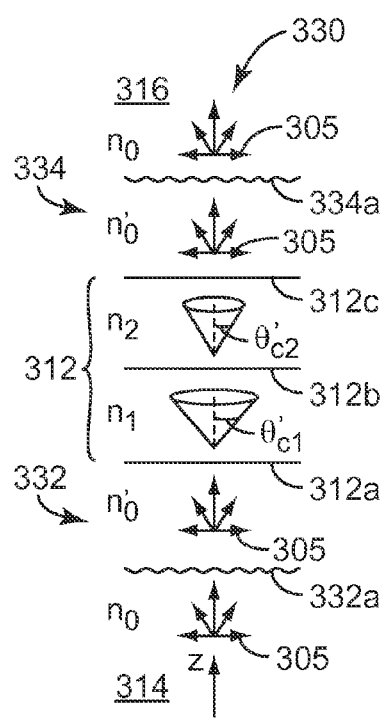

Before discussing specific design considerations for multilayer reflective polarizing films used in laminates that support supercritical light propagation, we turn to FIGS. 3a-c to illustrate the concept of optically immersing a film in a medium other than air.

FIGS. 3a-c are a series of schematic side views of a simplified layered film to which other layers are applied, demonstrating the concept of immersing the film in an optical medium. In FIG. 3a, an elementary film construction 310 consists essentially of a layered film 312 exposed on both sides to a medium of refractive index $n_0$, which is assumed to be air ($n_0$=1.0). For ease of discussion, $n_0$ and the other refractive indices shown in these FIGS. 3a-c are assumed to be isotropic. Furthermore, the film 312 is illustrated as having only two layers: a first layer of a conventional low refractive index optical material, such as a polymer whose refractive index $n_1$ is of the order of 1.5 or above; and a second layer of a conventional higher refractive index optical material, such as a different polymer whose refractive index $n_2$ is also of the order of 1.5 or above, but $n_2$ is substantially greater than $n_1$. The film 312 has a first major surface 312a, a surface or interface 312b that separates the first and second layers, and a second major surface 312c. The surface 312a is exposed to a thick layer 314 of air, and the surface 312c is exposed to another thick layer 316 of air.

Still referring to FIG. 3a, light is incident on the film 312 from below, i.e., from the layer 314 of air. The incident light travels roughly along the depicted z-axis, which may be perpendicular to the thickness dimension of the film 312, but the incident light includes the widest possible range of light ray propagation directions, including rays directed parallel to the z-axis, rays directed at moderate oblique angles to the z-axis, and rays directed at extreme oblique angles that are virtually perpendicular to the z-axis such that they strike surface 312a at glancing incidence. This widest possible range of incidence angles is represented by the 5-headed arrow symbol 305. In some cases the light distribution associated with symbol 305 may be quasi-Lambertian, while in others it may have a very different distribution. In any case the light distribution of symbol 305 includes some amount of light traveling in all directions over a hemisphere (or 2π solid angle) of possible paths. We now follow this incident light as it passes from the air layer 314, through the film 312, to the opposite air layer 316. In doing so, we concentrate on refraction at the various interfaces and, for simplicity, ignore reflection.

The surfaces 312a, 312b, 312c are all assumed to be flat and smooth, and perpendicular to the z-axis. Thus, when the incident light from the air layer 314 impinges on the major surface 312a, it refracts into the first layer of the film 312 according to Snell's law, i.e., $n_0 \sin \theta_0 = n_1 \sin \theta_1$. Since the incident light contains light rays whose incident angle ranges from $\theta_0$=0 to $\theta_0 \approx$90 degrees, the refracted light will contain refracted light rays whose refracted angle, or angle of propagation, ranges from $\theta_1$=0 to $\theta_1=\theta_{c1}$, where $\theta_{c1}$ is the critical angle for the material of the first layer, i.e., $\theta_{c1}=\arcsin(1/n_1)$, since sin(90)=1 and $n_0$=1. The collection of all refracted rays in the first layer is represented by the cone whose half-angle is $\theta_{c1}$.

The refracted light advances generally along the z-axis and encounters the surface or interface 312b, where a second refraction occurs as the light enters the second layer, whose refractive index is $n_2$. The second refraction again follows Snell's law, producing refracted light within the second layer over a range of propagation directions or angles $\theta_2$, where $\theta_2$ ranges from $\theta_2$=0 to $\theta_2=\theta_{c2}$. The angle $\theta_{c2}$ is the critical angle for the material of the second layer, i.e., $\theta_{c2}=\arcsin(1/n_2)$. The collection of all refracted rays in the second layer is represented by the cone whose half-angle is $\theta_{c2}$. Since the refractive index $n_2$ was assumed to be greater than refractive index $n_1$, the angle $\theta_{c2}$ is shown as being smaller than $\theta_{c1}$.

The refracted light in the second layer advances further until it encounters the major surface 312c. Here, another refraction occurs as the light passes from the second layer into the air layer 316. Again in accordance with Snell's law, the range of propagation angles $\theta_2$ for light in the second layer is transformed by refraction into a range of propagation angles for the air layer 316 that ranges from 0 to substantially 90 degrees, indicated again by symbol 305. Thus, in the process of traversing the film 312, hemispherically incident light from air is converted into conical distributions of light in the different material layers of the film, and then back again into hemispherically propagating light in the other air layer. The half-angle of the conical distributions in the material layers equals the critical angle of the respective material.

Turning now to FIG. 3b, we see there a schematic side view of another film construction 320. Film construction 320 includes the two-layered film 312 from FIG. 3a, but adds to it one layer of ultra low index material, having refractive index $n_0'$, on each side of the film 312 to produce the construction 320. The index $n_0'$ is greater than air but substantially less than the low index $n_1$. A first layer 322 of the index $n_0'$ material is applied to the surface 312a of the film 312, and a second layer 324 of the index $n_0'$ material is applied to the surface 312c of the film 312. The original film 312 in combination with the layers 322, 324 now form a new film having flat, smooth major surfaces 322a, 324a exposed to air, the surfaces 322a, 324a being parallel to the surfaces 312a-c.

Still referring to FIG. 3b, light is incident on the construction 320 from below, i.e., from the layer 314 of air. As in FIG. 3a, the incident light travels roughly along the z-axis but with rays spanning the widest possible range of incidence angles, again represented by the 5-headed arrow symbol 305. We follow this incident light as it passes from the air layer 314, through the different layers of the construction 320, to the opposite air layer 316.

When the incident light from the air layer 314 impinges on the major surface 322a, it refracts into the layer 322 of ultra-low index material according to Snell's law, i.e., $n_0 \sin \theta_0 = n_0' \sin \theta_0'$. Since the incident light contains light rays whose incident angle ranges from $\theta_0$=0 to $\theta_0 \approx$90 degrees, the refracted light contains refracted light rays whose refracted angle, or angle of propagation, ranges from $\theta_0'$=0 to $\theta_0'=\theta_{c0}$, where $\theta_{c0}$ is the critical angle for the ultra-low index material, i.e., $\theta_{c0}=\arcsin(1/n_0')$. The collection of all refracted rays in the layer 322 is represented by the cone whose half-angle is $\theta_{c0}$.

This refracted light then advances through the remainder of the construction 320. As it does so, the cone of angles representing the range of propagation directions in each of the distinct layers is determined by Snell's law. In a straightforward manner, one can readily deduce that the half-angle of the cone of propagation directions changes from $\theta_{c0}$ to $\theta_{c1}$ to $\theta_{c2}$ to $\theta_{c0}$ as light advances from layer 322 to layer 324, as shown in FIG. 3b. Light that refracts from layer 324 into the air layer 316 is again refracted into the widest possible range of propagation angles 305.

Comparing FIGS. 3a and 3b, we see that the addition of the layers 322, 324 to the film 312 does nothing to change the range of propagation directions inside the film 312. For each of the two layers of the film 312, the half-angle of the propagation cone remains the same. Note that this result would be the same regardless of the refractive index used for layers 322, 324. Thus, despite the presence of the layers 322, 324 between the film 312 and air, we nevertheless characterize the film 312 as still being optically immersed in air.

Turning now to FIG. 3c, here we have a film construction 330 that is substantially the same as construction 330, except that the layers 322, 324 are replaced with layers 332, 334. The layers 332, 334 have the same ultra-low refractive index as layers 322, 324. However, the flat, smooth major surfaces 322a, 324a of FIG. 3b are replaced with roughened major surfaces 332a, 334a, which provide a significant diffusing effect. As a result, hemispherically distributed incident light rays impinging from the air layer 314 onto the major surface 332a are refracted and diffused at all propagation angles (see symbol 305) in the layer 332, rather than being confined to a cone of half-angle $\theta_{c0}$ as was the case in FIG. 3b. This expanded range of propagation angles in layer 332 produces, via Snell's law at interface 312a, a cone of propagation directions in the first layer of film 312 whose half-angle $\theta_{c1}'$ is substantially greater than the corresponding half-angle $\theta_{c1}$ from FIG. 3b. In particular, $\theta_{c1}'=\arcsin(n_0'/n_1)$. When this light passes into the second layer of film 312, it refracts at surface 312b to produce a cone of propagation directions in the second layer that is also expanded relative to the corresponding cone in FIG. 3b. The half-angle $\theta_{c2}'$ is computed according to $\theta_{c2}'=\arcsin(n_0'/n_2)$. This light is refracted at surface 312c into ultra-low index layer 334 at all angles via Snell's law, and this light in turn is refracted and diffused into the air layer 316 at all angles by virtue of the roughened major surface 334a.

Comparing FIG. 3c with FIGS. 3a and 3b, we see that light is able to propagate at more oblique angles in the layers of film 312 in the construction 330 compared to the constructions 320, 310. Since light is able to impinge upon the film 312 at all angles from ultra-low index layer 332, and since light that enters the film 312 at any such angle is able to exit the film via layers 334, 316, the film 312 in FIG. 3c can be said to be optically immersed in the ultra-low refractive index material of index $n_0'$.

Figure 4:
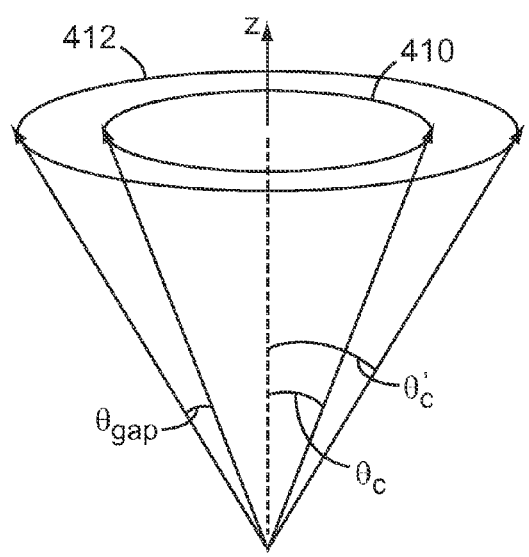
FIG. 4 is a perspective view of the angular range, or cone, of light propagation in a given layer, illustrating the widening of the cone when the layer is immersed in a medium other than air.

FIG. 4 is a perspective view of the angular range, or cone, of light propagation in a given layer, illustrating the widening of the cone when the layer is optically immersed in a medium other than air. Thus, the half-angle of the cone 410 is the critical angle $\theta_c$ for the layer material. This is the range of possible light propagation directions when the layer is optically immersed in air. The range of light propagation directions expands to the wider cone 412, of half angle $\theta_c'$, if the layer is optically immersed in a medium of refractive index greater than air. The difference between these two cones, or solid angles, is represented by the differential angle $\theta_{gap}$ in FIG. 4. Light whose propagation direction lies in this gap represents light for which the layer, or the film of which it is a part, may not be designed to handle.

We now shift our attention to multilayer optical films that can be used in the disclosed laminate film constructions, such that the multilayer optical film can be considered to be optically immersed in an ultra-low refractive index material, or in any other material whose refractive index is greater than that of air. We begin with a broad description of the capabilities of multilayer optical films generally, and then discuss the layer thickness profiles that allow the film to function over broader regions of the spectrum, the orientation of the layer thickness profile having a substantial impact on perceived color.

Figure 5:
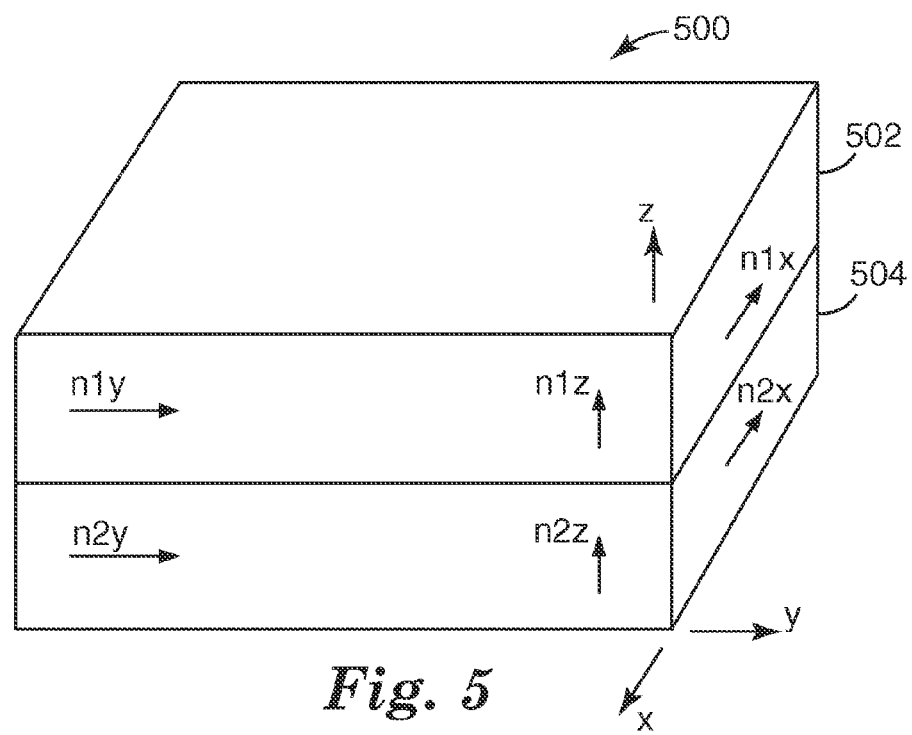
FIG. 5 is a schematic perspective view of an exemplary optical repeat unit (ORU) of a multilayer optical film.

FIG. 5 depicts only two layers of a multilayer optical film 500, which would typically include tens or hundreds of such layers arranged in one or more contiguous packets or stacks. The film 500 includes individual microlayers 502, 504, where "microlayers" refer to layers that are sufficiently thin so that light reflected at a plurality of interfaces between such layers undergoes constructive or destructive interference to give the multilayer optical film the desired reflective or transmissive properties. The microlayers 502, 504 may together represent one optical repeat unit (ORU) of the multilayer stack, an ORU being the smallest set of layers that recur in a repeating pattern throughout the thickness of the stack. Alternative ORU designs are discussed further below. The microlayers have different refractive index characteristics so that some light is reflected at interfaces between adjacent microlayers. For optical films designed to reflect light at ultraviolet, visible, or near-infrared wavelengths, each microlayer typically has an optical thickness (i.e., a physical thickness multiplied by refractive index) of less than about 1 μm. Thicker layers can, however, also be included, such as skin layers at the outer surfaces of the film, or protective boundary layers disposed within the film that separate packets of microlayers.

We may refer to the refractive indices of one of the microlayers (e.g. layer 502 of FIG. 5, or the "A" layers of FIG. 6 below) for light polarized along principal x-, y-, and z-axes as n1x, n1y, and n1z, respectively. The mutually orthogonal x-, y-, and z-axes may, for example, correspond to the principal directions of the dielectric tensor of the material. Typically, and for discussion purposes, the principle directions of the different materials are coincident, but this need not be the case in general. We refer to the refractive indices of the adjacent microlayer (e.g. layer 504 in FIG. 5, or the "B" layers in FIG. 6) along the same axes as n2x, n2y, n2z, respectively. We refer to the differences in refractive index between these layers as $\Delta nx$ ($=n1x-n2x$) along the x-direction, $\Delta ny$ ($=n1y-n2y$) along the y-direction, and $\Delta nz$ ($=n1z-n2z$) along the z-direction. The nature of these refractive index differences, in combination with the number of microlayers in the film (or in a given stack of the film) and their thickness distribution, controls the reflective and transmissive characteristics of the film (or of the given stack of the film). For example, if adjacent microlayers have a large refractive index mismatch along one in-plane direction ($\Delta nx$ large) and a small refractive index mismatch along the orthogonal in-plane direction ($\Delta ny \approx 0$), the film or packet may behave as a reflective polarizer for normally incident light. In this regard, a reflective polarizer may be considered for purposes of this application to be an optical body that strongly reflects normally incident light that is polarized along one in-plane axis (referred to as the "block axis") if the wavelength is within the reflection band of the packet, and strongly transmits such light that is polarized along an orthogonal in-plane axis (referred to as the "pass axis"). "Strongly reflects" and "strongly transmits" may have different meanings depending on the intended application or field of use, but in many cases a reflective polarizer will have at least 50, 60, 70, 80, or 90% reflectivity for the block axis, and at least 50, 60, 70, 80, or 90% transmission for the pass axis. These values, however, should not be construed in a limiting way.

If desired, the refractive index difference ($\Delta n_z$) between adjacent microlayers for light polarized along the z-axis can also be tailored to achieve desirable reflectivity properties for the p-polarization component of obliquely incident light. For ease of explanation, at any point of interest on a multilayer optical film, the x-axis can be considered to be oriented within the plane of the film such that the magnitude of the in-plane $\Delta n$ is a maximum. Hence, the magnitude of $\Delta n_y$ may be equal to or less than (but not greater than) the magnitude of $\Delta n_x$. Furthermore, the selection of which material layer to begin with in calculating the differences $\Delta n_x$, $\Delta n_y$, $\Delta n_z$ may be dictated by requiring that $\Delta n_x$ be non-negative. In other words, the refractive index differences between two layers forming an interface are $\Delta n_j = n_{1j} - n_{2j}$, where j=x, y, or z and where the layer designations 1, 2 are chosen so that $n_{1x} \geq n_{2x}$, i.e., $\Delta n_x \geq 0$.

To maintain near on-axis reflectivity of p-polarized light at oblique angles of incidence, the z-index mismatch $\Delta n_y$ between microlayers can be controlled to be substantially less than the maximum in-plane refractive index difference $\Delta n_x$, such that $\Delta n_z \leq 0.5 * \Delta n_x$. Alternatively, $\Delta n_z \leq 0.25 * \Delta n_x$. A zero or near zero magnitude z-index mismatch yields interfaces between microlayers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e., $\Delta n_z < 0$. This condition yields interfaces whose reflectivity for p-polarized light increases with increasing angles of incidence, as is the case for s-polarized light.

Figure 6:
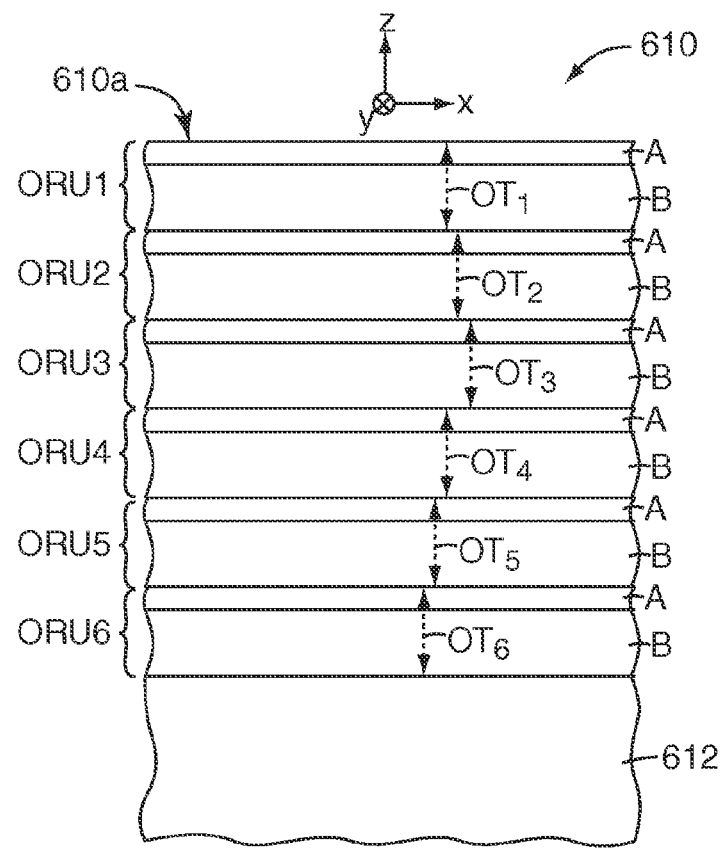
FIG. 6 is a schematic perspective view of a portion of a multilayer optical film, this view showing a packet of microlayers and a plurality of ORUs.

In the schematic side view of FIG. 6, more interior layers of a multilayer film 610 are shown so that multiple ORUs can be seen. The film is shown in relation to a local x-y-z Cartesian coordinate system, where the film extends parallel to the x- and y-axes, and the z-axis is perpendicular to the film and its constituent layers and parallel to a thickness axis of the film. The film 610 need not be entirely flat, but may be curved or otherwise shaped to deviate from a plane, and even in those cases arbitrarily small portions or regions of the film can be associated with a local Cartesian coordinate system as shown.

In FIG. 6, the microlayers are labeled "A" or "B", the "A" layers being composed of one material and the "B" layers being composed of a different material, these layers being stacked in an alternating arrangement to form optical repeat units or unit cells ORU 1, ORU 2, . . . ORU 6 as shown. Typically, a multilayer optical film composed entirely of polymeric materials would include many more than 6 optical repeat units if high reflectivities are desired. The multilayer optical film 610 is shown as having a substantially thicker layer 612, which may represent an outer skin layer, or a PBL that separates the stack of microlayers shown in the figure from another stack or packet of microlayers (not shown). If desired, two or more separate multilayer optical films can be laminated together, e.g. with one or more thick adhesive layers, or using pressure, heat, or other methods to form a laminate or composite film.

In some cases, the microlayers can have thicknesses and refractive index values corresponding to a ¼-wave stack, i.e., arranged in ORUs each having two adjacent microlayers of equal optical thickness (f-ratio=50%, the f-ratio being the ratio of the optical thickness of a constituent layer "A" to the optical thickness of the complete optical repeat unit), such ORU being effective to reflect by constructive interference light whose wavelength λ is twice the overall optical thickness of the optical repeat unit, where the "optical thickness" of a body refers to its physical thickness multiplied by its refractive index. In other cases, the optical thickness of the microlayers in an optical repeat unit may be different from each other, whereby the f-ratio is greater than or less than 50%. For purposes of the present application, we contemplate multilayer optical films whose f-ratio may be any suitable value, and do not limit ourselves to films whose f-ratio of 50%. Accordingly, in the embodiment of FIG. 6, the "A" layers are depicted for generality as being thinner than the "B" layers. Each depicted optical repeat unit (ORU 1, ORU 2, etc.) has an optical thickness ($OT_1$, $OT_2$, etc.) equal to the sum of the optical thicknesses of its constituent "A" and "B" layer, and each optical repeat unit reflects light whose wavelength λ is twice its overall optical thickness.

In exemplary embodiments, the optical thicknesses of the ORUs may differ according to a thickness gradient along the z-axis or thickness direction of the film, whereby the optical thickness of the optical repeat units increases, decreases, or follows some other functional relationship as one progresses from one side of the stack (e.g. the top) to the other side of the stack (e.g. the bottom). Such thickness gradients can be used to provide a widened reflection band to provide substantially spectrally flat transmission and reflection of light over the extended wavelength band of interest, and also over all angles of interest. Thickness gradients tailored to sharpen the band edges at the wavelength transition between high reflection and high transmission can also be used, as discussed in U.S. Pat. No. 6,157,490 (Wheatley et al.) "Optical Film With Sharpened Bandedge". For polymeric multilayer optical films, reflection bands can be designed to have sharpened band edges as well as "flat top" reflection bands, in which the reflection properties are essentially constant across the wavelength range of application. Other layer arrangements, such as multilayer optical films having 2-microlayer optical repeat units whose f-ratio is different from 50%, or films whose optical repeat units include more than two microlayers, are also contemplated. These alternative optical repeat unit designs can be configured to reduce or to excite certain higher-order reflections, which may be useful if the desired reflection band resides in or extends to near infrared wavelengths. See, e.g., U.S. Pat. No. 5,103,337 (Schrenk et al.) "Infrared Reflective Optical Interference Film", U.S. Pat. No. 5,360,659 (Arends et al.) "Two Component Infrared Reflecting Film", U.S. Pat. No. 6,207,260 (Wheatley et al.) "Multi-component Optical Body", and U.S. Pat. No. 7,019,905 (Weber) "Multi-layer Reflector With Suppression of High Order Reflections".

For purposes of the present application, a material is considered to be "birefringent" if the material has an anisotropic dielectric tensor over a wavelength range of interest, e.g., a selected wavelength or band in the UV, visible, and/or infrared portions of the spectrum. Stated differently, a material is considered to be "birefringent" if the principal refractive indices of the material (e.g., n1x, n1y, n1z) are not all the same. Moreover, a material can be said to be "biaxially birefringent" if no two of its principal refractive indices are the same (e.g., n1x≠n1y≠n1z≠n1x). In contrast, a material can be said to be "uniaxially birefringent" if only two if its principal refractive indices are the same (e.g., n1x≠n1y=n1z, or n1x=n1y≠n1z).

To achieve high reflectivities with a reasonable number of layers, adjacent microlayers may exhibit a difference in refractive index (Δnx) for light polarized along the x-axis of at least 0.05, for example. If the high reflectivity is desired for two orthogonal polarizations, then the adjacent microlayers also may exhibit a difference in refractive index (Δny) for light polarized along the y-axis of at least 0.05, for example. In some cases, adjacent microlayers may have refractive index mismatches along the two principal in-plane axes (Δnx and Δny) that are close in magnitude, in which case the film or packet may behave as an on-axis mirror or partial mirror. In variations of such embodiments, the adjacent microlayers may exhibit a refractive index match or mismatch along the z-axis (Δnz≈0 or Δnz large), and the mismatch may be of the same or opposite polarity or sign as the in-plane refractive index mismatch(es). Such tailoring of Δnz plays a key role in whether the reflectivity of the p-polarized component of obliquely incident light increases, decreases, or remains the same with increasing incidence angle.

At least some of the microlayers in at least one packet of the disclosed multilayer optical films are birefringent, either uniaxially birefringent or biaxially birefringent. In some cases, each ORU may include one such birefringent microlayer, and a second microlayer that is either isotropic or that has a small amount of birefringence relative to the other microlayer. "Isotropic" in this regard is understood to encompass materials whose birefringence is so small as to render them substantially isotropic in the intended application. If the second microlayer is birefringent, its birefringence may be of the same sign as the first microlayer (e.g., positively birefringent), or a different sign (e.g., negatively birefringent). Stated differently, if the first microlayer has a positive stress-optic coefficient, the second microlayer may have a stress-optic coefficient that is positive, negative, or zero.

Exemplary multilayer optical films are composed of polymer materials and may be fabricated using coextruding, casting, and orienting processes. Reference is made to U.S. Pat. No. 5,882,774 (Jonza et al.) "Optical Film", U.S. Pat. No. 6,179,948 (Merrill et al.) "Optical Film and Process for Manufacture Thereof", and U.S. Pat. No. 6,783,349 (Neavin et al.) "Apparatus for Making Multilayer Optical Films". The multilayer optical film may be formed by coextrusion of the polymers as described in any of the aforementioned references. The polymers of the various layers may be chosen to have similar rheological properties, e.g., melt viscosities, so that they can be co-extruded without significant flow disturbances. Extrusion conditions are chosen to adequately feed, melt, mix, and pump the respective polymers as feed streams or melt streams in a continuous and stable manner. Temperatures used to form and maintain each of the melt streams may be chosen to be within a range that avoids freezing, crystallization, or unduly high pressure drops at the low end of the temperature range, and that avoids material degradation at the high end of the range.

In brief summary, the fabrication method may comprise: (a) providing at least a first and a second stream of resin corresponding to the first and second polymers to be used in the finished film; (b) dividing the first and the second streams into a plurality of layers using a suitable feedblock, such as one that comprises: (i) a gradient plate comprising first and second flow channels, where the first channel has a cross-sectional area that changes from a first position to a second position along the flow channel, (ii) a feeder tube plate having a first plurality of conduits in fluid communication with the first flow channel and a second plurality of conduits in fluid communication with the second flow channel, each conduit feeding its own respective slot die, each conduit having a first end and a second end, the first end of the conduits being in fluid communication with the flow channels, and the second end of the conduits being in fluid communication with the slot die, and (iii) optionally, an axial rod heater located proximal to said conduits; (c) passing the composite stream through an extrusion die to form a multilayer web in which each layer is generally parallel to the major surface of adjacent layers; and (d) casting the multilayer web onto a chill roll, sometimes referred to as a casting wheel or casting drum, to form a cast multilayer film. This cast film may have the same number of layers as the finished film, but the layers of the cast film are typically much thicker than those of the finished film. Furthermore, the layers of the cast film are typically all isotropic.

In some cases, the fabrication equipment may employ one or more layer multipliers to multiply the number of layers in the finished film. In other embodiments, the films can be manufactured without the use of any layer multipliers. Although layer multipliers greatly simplify the generation of a large number of optical layers, they may impart distortions to each resultant packet of layers that are not identical for each packet. For this reason, any adjustment in the layer thickness profile of the layers generated in the feedblock is not the same for each packet, i.e., all packets cannot be simultaneously optimized to produce a uniform smooth spectrum free of spectral disruptions. Thus, an optimum profile, for low transmitted and reflected color, can be difficult to make using multipacket films manufactured using multipliers. If the number of layers in a single packet generated directly in a feedblock do not provide sufficient reflectivity, then two or more such films can be attached to increase the reflectivity. Further discussion of layer thickness control, so as to provide smooth spectral reflectivity and transmission for low color films, is provided in PCT publication WO 2008/144656 (Weber et al.).

After the multilayer web is cooled on the chill roll, it can be drawn or stretched to produce a finished or near-finished multilayer optical film. The drawing or stretching accomplishes two goals: it thins the layers to their desired final thicknesses, and it orients the layers such that at least some of the layers become birefringent. The orientation or stretching can be accomplished along the cross-web direction (e.g. via a tenter), along the down-web direction (e.g. via a length orienter), or any combination thereof, whether simultaneously or sequentially. If stretched along only one direction, the stretch can be "unconstrained" (wherein the film is allowed to dimensionally relax in the in-plane direction perpendicular to the stretch direction) or "constrained" (wherein the film is constrained and thus not allowed to dimensionally relax in the in-plane direction perpendicular to the stretch direction). If stretched along both in-plane directions, the stretch can be symmetric, i.e., equal along the orthogonal in-plane directions, or asymmetric. Alternatively, the film may be stretched in a batch process. In any case, subsequent or concurrent draw reduction, stress or strain equilibration, heat setting, and other processing operations can also be applied to the film.

The multilayer optical films and film constructions can also include additional layers and coatings selected for their optical, mechanical, and/or chemical properties. For example, a UV absorbing layer can be added at one or both major outer surfaces of the film to protect the film from long-term degradation caused by UV light. Additional layers and coatings can also include scratch resistant layers, tear resistant layers, and stiffening agents. See, e.g., U.S. Pat. No. 6,368,699 (Gilbert et al.).

If the optical thicknesses of all of the microlayers in a given multilayer film were designed to be the same, the film would provide high reflectivity over only a narrow band of wavelengths. Such a film would appear highly colored if the band were located somewhere in the visible spectrum, and the color would change as a function of angle. In the context of display and lighting applications, films that exhibit noticeable colors are generally avoided, although in some cases it may be beneficial for a given optical film to introduce a small amount of color to correct for color imbalances elsewhere in the system. Multilayer films can be provided with broad band reflectivity and transmission, e.g. over the entire visible spectrum, by tailoring the microlayers—or more precisely, the optical repeat units (ORUs), which in many (but not all) embodiments correspond to pairs of adjacent microlayers—to have a range of optical thicknesses. Typically, the microlayers are arranged along the z-axis or thickness direction of the film from a thinnest ORU on one side of the film or packet to a thickest ORU on the other side, with the thinnest ORU reflecting the shortest wavelengths in the reflection band and the thickest ORU reflecting the longest wavelengths. Further discussion of thickness gradients in multilayer optical films, including tailoring the thickness gradient to provide a sharpened band edge, can be found in U.S. Pat. No. 6,157,490 (Wheatley et al.), and is discussed further below.

The materials used in the manufacture of multilayer optical films are typically polymer materials that have very low absorption at least over visible and near-visible wavelengths and for typical optical path distances within the film. Thus, the percent reflection R and the percent transmission T of a multilayer film for a given light ray are typically substantially complementary, i.e., R+T≈100%, usually within an accuracy of about 1%. Thus, unless otherwise noted, a multilayer optical film disclosed herein as having a high reflectivity can be assumed to have a low transmission, and vice versa, and a multilayer optical film disclosed as having a low reflectivity can be assumed to have a high transmission, and vice versa, and reported values of reflectivity or transmission can be assumed to also report on transmission or reflectivity, respectively, via the relationship R+T≈100%.

The reflection and transmission characteristics can be readily determined whether one is dealing with a computer-modeled optical film or an actual film whose properties are measured in the laboratory. The reflection spectrum and all of its features such as the reflectivity at any angle and the band edges for birefringent multilayer films can be calculated using the 4×4 stack code of Berremen and Scheffer, Phys. Rev. Lett. 25, 577 (1970). A description of this method is given in the book "Ellipsometry and Polarized Light" written by Azzam and Bashara, published by Elsevier Science, Holland.

The reflectivity or transmission of a multilayer optical film at highly oblique angles, e.g., angles at or near 90 degrees in air, or even at supercritical angles, can be directly measured by optically coupling glass prisms of a known index of refraction to both sides of the film and measuring the reflectivity at the appropriate angle which is easily determined with Snell's Law. Glass prisms with indices of about 1.5 to 1.7 are suitable for these measurements.

It is often easier to accurately measure transmission instead of reflection of a film, especially at non-zero angles. Since the absorption of light is relatively small in the films of interest (generally less than 1% for normally incident light), one can simply measure the transmissivity value T and assume that R=1−T. If the absorption is greater than about a few percent, then it can be measured at normal incidence by separate measurements of R and T. The absorbance at higher angles can then be readily estimated, whereupon reflectivity can be calculated as R=1−A−T, where R, A, and T are typically expressed as percentages and 1=100%.

Multilayer optical films disclosed herein exhibit asymmetric reflection and transmission characteristics for normally incident light, as a function of polarization. We may therefore refer to the in-plane axis (x-axis) associated with the highest reflection or lowest transmission for normally incident light as a "block" axis, and the other in-plane axis (y-axis), associated with the lowest reflection or highest transmission for normally incident light as a "pass" axis. We may use these terms if the difference between the normal incidence block axis reflection and the normal incidence pass axis reflection is large, as is the case with reflective polarizer-type multilayer optical films. But we may also, for the purposes of the present application, use the terms "pass axis" and "block axis" if the difference between the normal incidence block axis reflection and the normal incidence pass axis reflection is small, as is the case with nearly symmetric mirror-like multilayer optical films.

Multilayer optical films disclosed herein also exhibit an intermediate amount of reflectivity, i.e., partial reflection and partial transmission, over an extended band for one or more specified incidence conditions. The partial reflection and partial transmission provided by the microlayers over the extended band, e.g., the visible wavelength range in the case of many display and lighting applications, makes the films susceptible to introducing undesirable color into the system if the reflection or transmission characteristic is not sufficiently uniform or smooth as a function of wavelength. Depending on the system design of which the multilayer optical film is a part, the intermediate reflectivity/transmission may be designed to occur for a variety of desired incidence conditions. In one case, for example, the incidence condition may be for normally incident light polarized along the pass axis of the film, in which case the broadband partial reflection and transmission are associated with light of a pass state. In another case, the incidence condition may be for normally incident light polarized along the block axis of the film, in which case the broadband partial reflection and transmission are associated with light of a block state. In other cases, the incidence condition may be for light incident obliquely in a selected plane of incidence. For example, s- or p-polarized light may be specified, or an average of s- and p-polarized light (unpolarized light). The selected plane of incidence may be a plane containing the block axis and the z-axis, or a plane containing the pass axis and the z-axis, or a plane rotated at an intermediate position relative to those planes. For example, the plane of incidence may be a plane containing the z-axis and rotated to an azimuthal angle $\phi$ of 10 degrees, or 20 degrees or 45 degrees, for example. The polar angle $\theta$ of the incidence light in such a plane may be further specified, for example, $\theta$=49 degrees in a medium of refractive index 1.494, or $\theta$=38 degrees in such medium, or other angles and other media may be specified, as desired.

Figure 7:
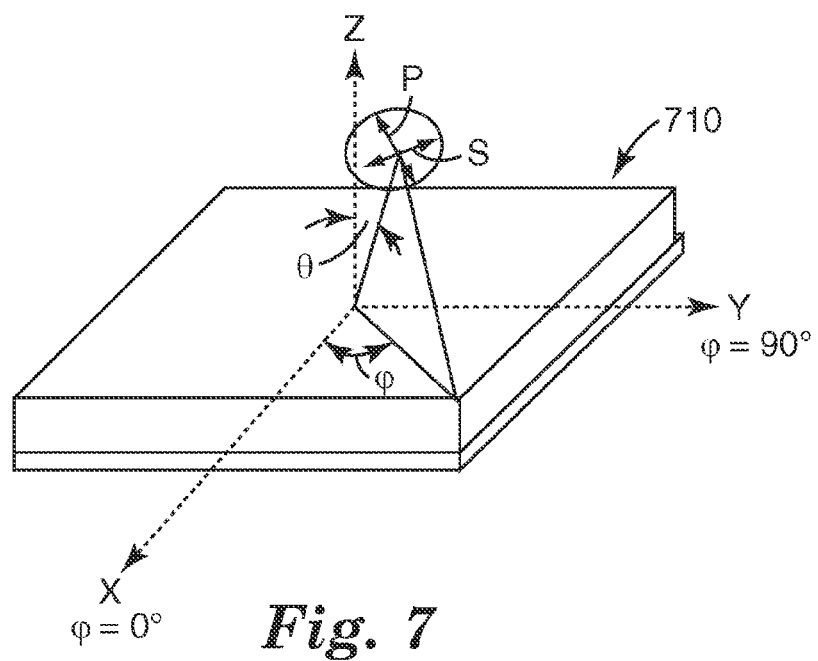
FIG. 7 is a schematic perspective view of a multilayer optical film, which may be an asymmetric reflective film.
Figure 8:
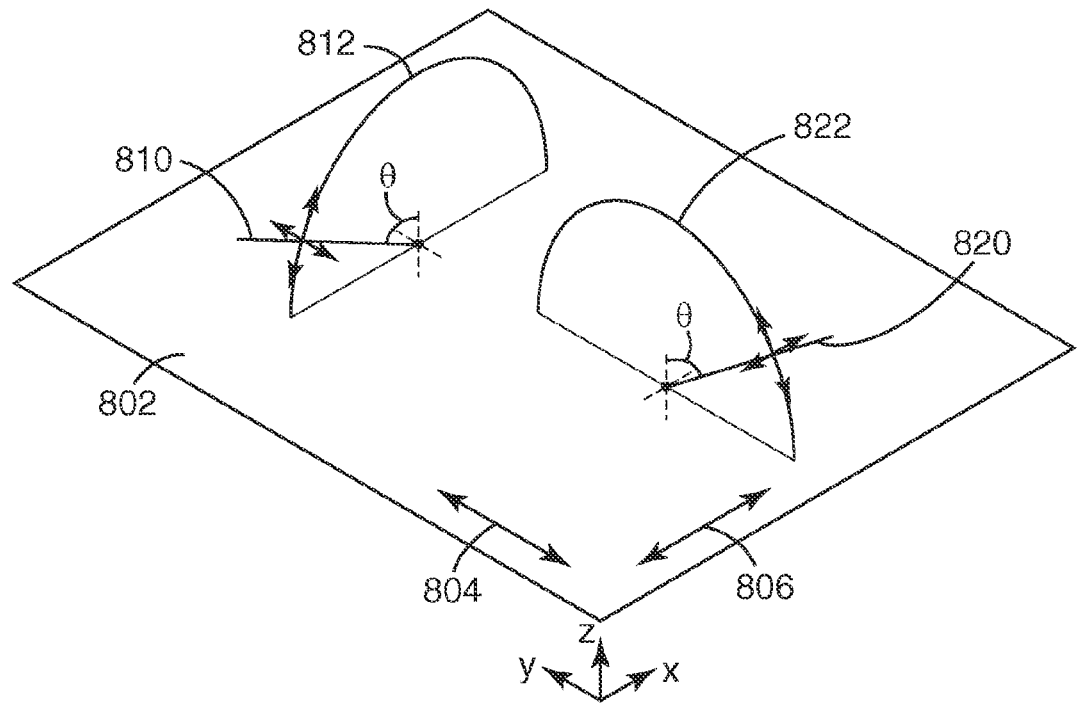
FIG. 8 is another schematic perspective view of a multilayer optical film, which may be an asymmetric reflective film such as a reflective polarizing film.

FIGS. 7 and 8 are provided to remind the reader of the geometry associated with the concepts of "s-" and "p-polarized" light, and to make clear that these polarization states are defined with respect to the plane of incidence of a particular ray or rays of light, and do not in general have any fixed relationship to the in-plane axes (the x- and y-axes) of a multilayer optical film.

Thus, FIG. 7 shows a ray of light that is incident on, or that emerges from, a multilayer optical film 710 or other optical body in a particular direction. The direction of the light ray is specified in a particular optical medium, e.g., the medium in contact with the surface of the film 710, whether that medium is air, or an ultra-low index (ULI) material, or another material having a refractive index greater than that of air. The direction of the light ray is also specified by two angles: a polar angle $\theta$, which is measured from the thickness axis or z-axis of the film 710, and an azimuthal angle $\phi$, which is measured from a particular in-plane axis, typically the x-axis of the film 710. The plane of incidence of the light ray is the plane containing the z-axis and the propagation direction of the light ray. This plane is oriented at an angle $\phi$ relative to the x-z plane. S-polarized light is the component of the light ray whose electric field vibrates perpendicular to the plane of incidence. P-polarized light is the component whose electric field vibrates in the plane of incidence.

Depending on the direction of propagation of the light ray, in some cases the s-polarized component of the light may be more closely aligned with the x-axis of the film (and the p-polarized component may be aligned with the y-axis, or more generally with the y-z plane), while in other cases the s-polarized component may be more closely aligned with the y-axis of the film (and the p-polarized component may be aligned with the x-axis, or more generally with the x-z plane). This is shown more clearly in FIG. 8. In that figure, a light ray 810 is incident on (or emerges from) a conventional polarizing film 802 at an angle of incidence θ, thereby forming a plane of incidence 812. The polarizer 802, which may be a standard absorptive polarizer or reflective polarizer, includes a pass axis 804 that is parallel to the y-axis, and a block axis 806 that is parallel to the x-axis. The plane of incidence 812 of ray 810 is parallel to the block axis 806, and is oriented at an azimuthal angle φ of 0 degrees. Ray 810 has a p-polarized component that is in the plane of incidence 812, and an s-polarized component that is orthogonal to the plane of incidence 812. The p-pol light of ray 810 has a vector component parallel to the block axis 806 of polarizer 802 and will, therefore, be substantially blocked (e.g., absorbed or reflected) by the polarizer, while the s-pol light of ray 810 is parallel to the pass axis 804 of polarizer 802 and will, at least in part, be transmitted.

Further, FIG. 8 illustrates a ray 820 that is incident on polarizer 802 in a plane of incidence 822 that has a vector component parallel to the pass axis 804 of the polarizer 802. The plane of incidence 822 of ray 820 is parallel to the pass axis 804, and is oriented at an azimuthal angle φ of 90 degrees. The p-pol light of ray 820 is parallel to the pass axis 804 of the polarizer 802, while the s-pol light of ray 820 is parallel to the block axis 806 of polarizer 802. As a result, if the polarizer 802 is an "ideal" reflective polarizer that has a reflectance of 100% at all angles of incident light for light polarized in the block axis and 0% at all angles of incident light for light polarized in the pass axis, the polarizer will transmit s-pol light of ray 810 and the p-pol light of ray 820, while reflecting the p-pol light of ray 810 and the s-pol light of ray 820. In other words, such a polarizer 802 will transmit a combination of p- and s-pol light. The amount of transmission and reflection of p- and s-pol light will depend on the characteristics of the polarizer.

We have found that, in the context of optically immersed asymmetric multilayer optical films having thickness gradients tailored for broadband reflection and transmission of light, some light rays can be more strongly associated with undesirable color effects than others, depending on the orientation or "sidedness" of the multilayer optical film. In particular, light rays whose polar angle θ is a supercritical angle, and whose azimuthal angle φ is close to (but not coincident with) the x-axis, e.g., 0<φ≤30 degrees, tend to be strongly associated with undesirable color effects in the immersed film constructions described herein if the multilayer optical film is oriented "thick-side-out".

Figure 9A:
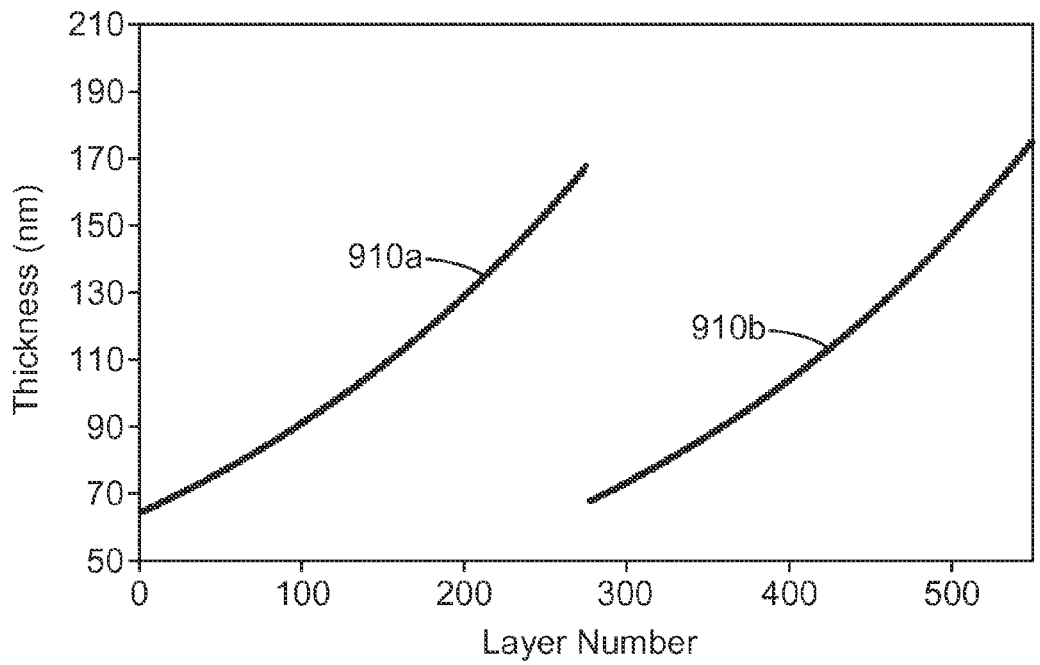
FIGS. 9a and 9b are graphs depicting exemplary layer thickness profiles that may be used in the design of a multilayer optical film.
Figure 9B:
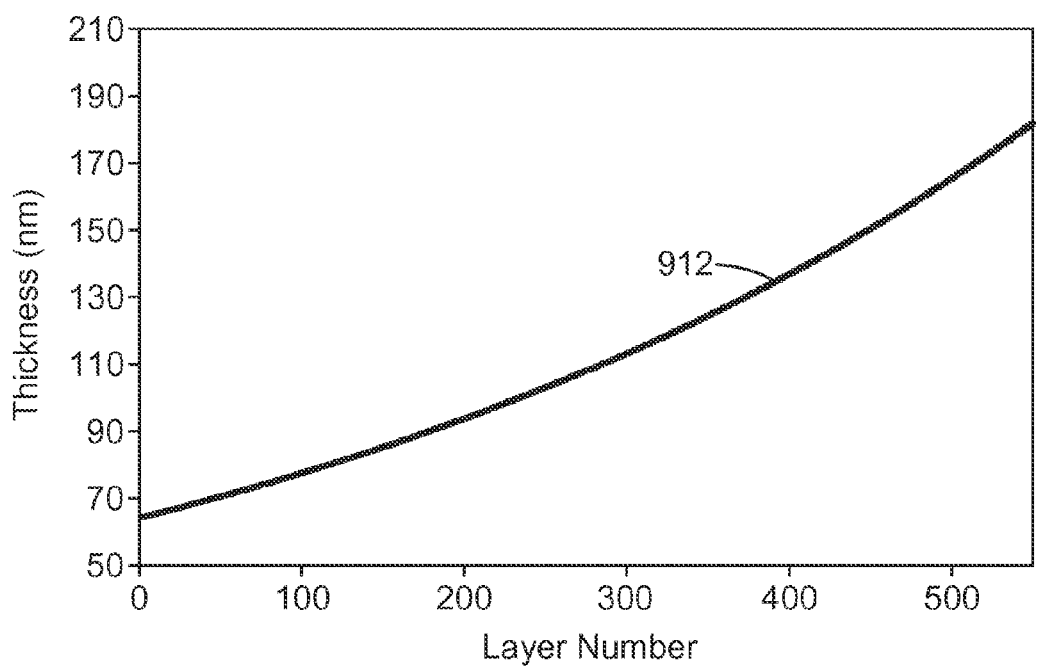

We now turn to consider the "sidedness" of the disclosed multilayer optical films from the standpoint of the layer thickness gradient of the film. FIGS. 9a and 9b are graphs depicting exemplary layer thickness profiles that may be used in the design of a multilayer optical film to provide a reflection band over a broad wavelength range, e.g., over the visible wavelength region over a certain range of incidence angles. Such "broadband" behavior refers to any bandwidth substantially greater than the intrinsic bandwidth of a low and high index material combination of layer pairs in an optical repeat unit. In FIGS. 9a and 9b, each one of about 550 microlayers in the film is assigned a "layer number" along the horizontal axis, where a first layer number 1 is disposed at or near (e.g., possibly separated by an optically thick protective boundary layer and/or skin layer) a first major surface of the film, and a last layer number 550 (FIG. 9a) or 551 (FIG. 9b) is disposed at or near a second major surface of the film opposite the first major surface. The vertical axis of the graphs represents the physical thickness of each microlayer.

In exemplary embodiments, the microlayers represented by FIGS. 9a and 9b may consist essentially of two groups of microlayers composed of two different materials and arranged in an alternating, interleaved fashion similar to the "A" and "B" layers shown above in FIG. 6. Thus, in each figure, layer numbers 1, 3, 5, . . . 549 (and 551 in the case of FIG. 9b) may be composed of a first light-transmissive material "A", and layer numbers 2, 4, 6, . . . 550 may be composed of a different second light-transmissive material "B". In such cases, the microlayers can be considered to be arranged into approximately 275 optical repeat units (ORUs), each ORU consisting essentially of two adjacent microlayers. For example, layer numbers 1 (of material A) and 2 (of material B) may define a first ORU, layer numbers 3 (material A) and 4 (material B) may define a second ORU, and so forth.

The optical thicknesses of the ORUs can be ascertained from the graphs of FIGS. 9a and 9b together with a knowledge of the refractive index of the materials. For rough calculation purposes, if one assumes refractive indices for the A and B materials on the order of 1.7 (ignoring differences in refractive index of the A and B materials for purposes of this rough calculation), one can see that the ORUs of the two figures have optical thicknesses ranging from about 200 nm at or near the first major surface (=(65 nm+65 nm)*1.7) to about 600 nm at or near the second major surface (=(175 nm+175 nm)*1.7). Recalling that the peak reflectivity (at normal incidence) of an ORU typically occurs at a wavelength λ equal to twice the optical thickness of the ORU, this range of ORU optical thicknesses corresponds to a normal incidence reflection band (assuming an appropriate refractive index difference between the "A" material and the "B" material, along at least one in-plane axis of the film) extending continuously from about 400 to 1200 nm. The f-ratio of the ORUs represented by FIGS. 9a and 9b may be close to 50%, since the physical thicknesses of the two microlayers in any given ORU differ by only a small amount, and the refractive indices of such microlayers typically differ by an amount that is small relative to the assumed nominal value of 1.7.

The most striking difference between the plurality of microlayers depicted in FIG. 9a and those depicted in FIG. 9b is that in the former case, the microlayers are assumed to be divided into two separate stacks or packets of microlayers, whereas in the latter case the microlayers are assumed to be grouped into a single stack or packet. A stack or packet in this regard refers to a set or group of microlayers that contains no optically thick layer between microlayers, where an optically thick layer is typically a layer whose optical thickness is greater than about λ/2, where λ is the wavelength to which the majority of the neighboring microlayers (or the corresponding optical repeat units) are tuned. The layer thickness profile for FIG. 9a is thus divided into two parts 910a, 910b, each of which is monotonic, whereas the layer thickness profile for FIG. 9b is a single continuous monotonic curve 912. In FIG. 9a, an optically thick layer is assumed to be present between the microlayer packet represented by curve 910a and the packet represented by curve 910b. For modeling purposes discussed below, a value of 15 microns was assumed for the optical thickness of this optically thick layer.

Despite the differences between the layer profiles of FIGS. 9a and 9b, both profiles can be used to reflect a continuous spectrum from about 400 to 1200 nm at normal incidence. Further, the "sidedness" of both profiles can be characterized by a "thin side" proximate layer number 1 and a "thick side" proximate layer number 550 or 551. In this regard, the average optical thickness of the optical repeat units in the layer thickness profile can be computed. In each of FIGS. 9a and 9b, this average is roughly 400 nm (=(120 nm+120 nm)*1.7), assuming a nominal refractive index of the A and B microlayers near 1.7. ORUs whose optical thickness is less than this average are, on average, closer than ORUs whose optical thickness is greater than this average to the first major surface, which is at or near layer number 1. This first major surface of the multilayer optical film can thus be referred to as the "thin side". In contrast, ORUs whose optical thickness is greater than the average are closer than the ORUs whose optical thickness is less than the average to the second major surface, which is at or near layer number 550 or 551. The second major surface can thus be referred to as the "thick side". Our observations have shown, and our modeling has confirmed, that the sidedness of the optically immersed multilayer optical film in the context of an input and output surface of the film construction of which the multilayer optical film is a part, can make a significant difference in the color perceived by the viewer. Modeling shows that a thin-side-out orientation achieves substantially lower color than thick-side-out, regardless of whether one packet (FIG. 9b) or two packets (FIG. 9a) are used.

FIGS. 9a and 9b should not be construed in a limiting way. For example, the invention can be applied to immersed multilayer optical films that may have any number of microlayer packets, and is not limited to one packet (FIG. 9b) or two packet (FIG. 9a) designs.

For example, in alternative microlayer packet designs to those of FIGS. 9a and 9b, a pseudo-continuous single packet can also be made from two or more packets that have one or more optically thick layers between each packet of microlayers. The presence of one or more optically thick layers in the midst of a continuous ¼ wave graded stack can, however, cause significant oscillation in the spectrum that can also produce significant color. Any successful low color design that can be made from such an arrangement will however still benefit from arranging the layers in the same order as describe here, i.e., a thin-side-out orientation in which, on average, the thinnest ¼ wave layers of the profile face the exit side of the system. Any optically thick layers are preferably made from materials having low birefringence. As discussed above, the individual microlayers do not need to each have an optical thickness of exactly ¼ wave. Rather, the sum of optical thicknesses of the microlayers in the optical repeat unit should be λ/2, and the λ/2 ORUs can then be continuously graded according to a suitable layer thickness profile to provide a broadband reflector. Additionally, in some cases, the ORUs can be much thicker than λ/2, such as 3λ/4λ, or even greater, and having various f-ratios, so as to provide a uniform transmission using $2^{nd}$, $3^{th}$, or higher order harmonic reflection bands with an appropriate f-ratio so as to provide a uniform transmission spectrum of reduced color. In these cases too, the thinner ORUs, on average, desirably face the output surface of the construction for low color.

Figure 10A:
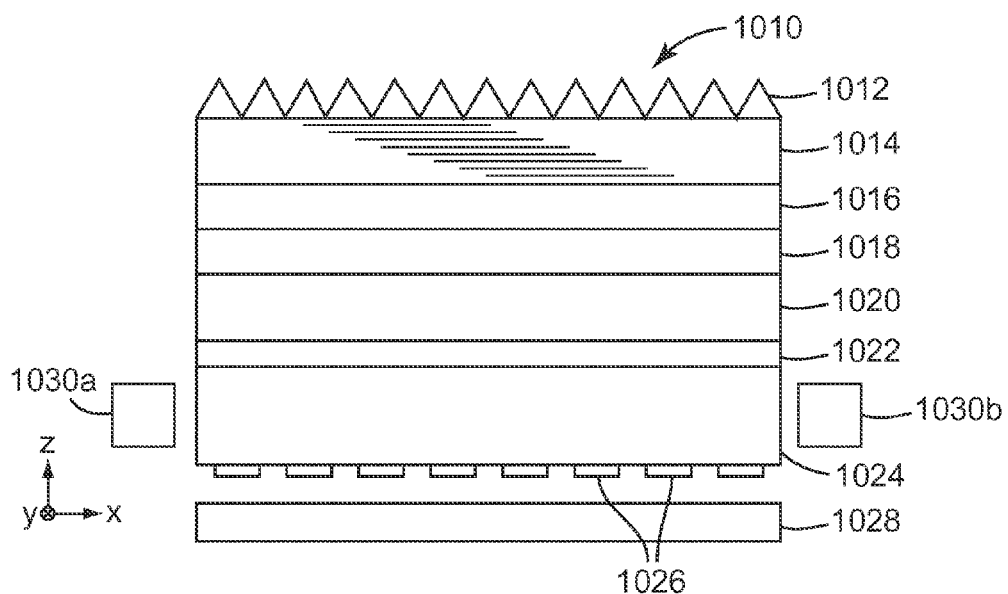
FIG. 10a is a schematic sectional or side view of a film construction including an optically immersed multilayer optical film.

Turning now to FIG. 10a, we see there a schematic sectional or side view of a film construction including an optically immersed multilayer optical film. The film construction is a laminate-on-light guide construction 1010. In this system, prism structures 1012, such as those used in Vikuiti™ BEF-type prismatic films available from 3M Company, St. Paul, Minn., are applied to a multilayer reflective polarizing film 1014 as disclosed herein. The prisms are exposed to air and transmit light that has passed through the polarizing film 1014 generally upwards towards a display panel or viewer. Such light originates from light sources 1030a, 1030b, which are shown in an edge-lit configuration at an edge of a solid light guide 1024. The light guide 1024 is provided with a pattern of conventional extractors 1026. Light that escapes from the bottom of light guide 1024 is reflected by a white back reflector 1028. A pressure sensitive adhesive layer 1022 adheres the light guide 1024 to the other components above, including a graded index ULI layer 1020, a high haze ULI layer 1018 (which may also be a volume diffuser), and a low haze ULI layer 1016.

The construction 1010 thus incorporates the reflective polarizing film 1014 into a backlight in a manner that eliminates air gaps and reduces the number of film substrates and other stand-alone components such as reflective pre-polarizers, light guides, diffusers, retardation films, micro lens sheets or prismatic sheets. In doing this, the reflective polarizing film 1014 is optically immersed in a higher refractive index medium than air, in particular, an optically thick ultra-low index (ULI) layer. The ULI layer allows supercritical light to propagate in the film 1014, but limits the angular range of such supercritical light. The limited range reduces the angular bandwidth requirement for the multilayer reflector relative to an embodiment in which the film 1014 is optically immersed in an even higher refractive index medium. However, the range of angles of propagation is still greater than what occurs when the multilayer optical film 1014 is not optically immersed. The configuration of FIG. 10a substantially represents an embodiment in which the undesired color associated with the sidedness-effect discussed herein was observed. For further information relating to the embodiment of FIG. 10a, and for other information, reference is made to U.S. Patent Application Ser. No. 61/254,691, "Immersed Reflective Polarizer with High Off-Axis Reflectivity", filed Oct. 24, 2009.

Either the diffuser layer 1016 or the light guide 1024 can inject light into the polarizer film 1014 at angles greater than can be injected from air. Although both are used here, one or the other, or a microstructured surface film could be used alone to inject supercritical light into the film. In general, any light redirecting layer that is optically coupled to the multilayer optical film can be used as a light injecting layer (e.g. layer 1024) or as a light extraction layer (e.g. layer 1012). In FIG. 10a these components are a light guide and a prism array respectively. The range of angles of light that can enter the reflective polarizer is limited via Snell's law by the refractive index of the ULI layer 1016. Any of these rays transmitted by the ULI layer can exit the polarizer film 1014 to air if a suitable extraction layer 1012 is optically coupled to the exit surface of the film. Such a configuration is an example of an optically immersed optical film, as discussed above.

Figure 10B:
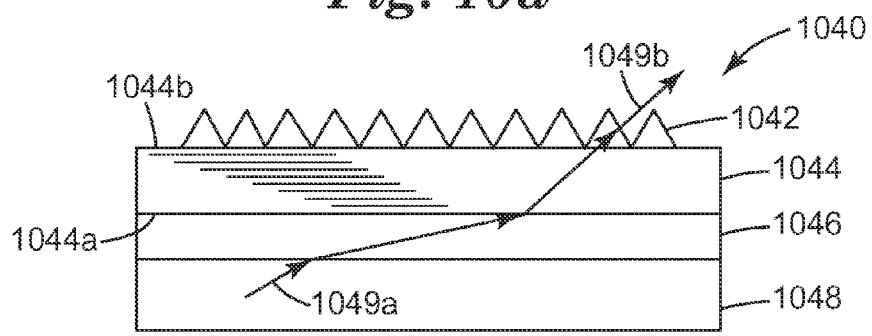
FIG. 10b is a schematic sectional or side view of a simpler film construction including an optically immersed multilayer optical film.

An optically immersed film typically has light injection and light extraction layers that are optically coupled to incident and exit faces of the film, respectively. In this manner light rays can enter and propagate in the film at angles greater than can occur for a film in air through smooth coplanar surfaces, such light being referred to as supercritical light as discussed above. The extraction layer can be any component as described for the injection layer. Immersing the film and light sources in a liquid, or in a liquid that is subsequently cured or dried to a solid, can have the same result. The particular rays of light that can cause significant color generation in the polarizer are those entering from large (supercritical) angles of incidence, such as ray 1049a illustrated in FIG. 10b. FIG. 10b is a schematic sectional or side view of a simpler or more generalized film construction 1040 including an optically immersed multilayer optical film 1044, which may be a reflective polarizing film. The construction 1040 includes a light extraction layer 1042 attached to an output surface 1044b of the film 1044, a ULI layer 1046 attached to an input surface 1044a of the film 1044, and a light injection layer 1048 attached to the ULI layer 1046.

Ray 1049*a* is near or greater than the critical angle for transmission out of the multilayer optical film 1044 into air. However, the light extraction layer 1042, depicted as prisms in FIG. 10*b* although other structures can instead be used, permit the light ray to exit the film (see ray 1049*b*) at angles where it can be easily viewed by an observer. The reader will understand that light ray paths are reversible, i.e. light could be injected into the prismatic surface (see 1042) and extracted by a light guide (see 1048). Typically, the end use utilizes the polarized light output, but the system could in principle be reversed. So in the most general terminology, one may wish to specify that the thinnest layers of a multilayer optical film (i.e., the "thin side") should be closest to the side of the system which transmits the more highly polarized light.

In the case where the light extraction layer 1042 comprises a linear array of prisms such as those of many Vikuiti™ BEF-type films, where each prism extends along a prism axis parallel to the film plane, the prism array may be oriented relative to the multilayer optical film 1044 such that the prism axis is substantially parallel to the pass axis of the film 1044, but other relative orientation angles between the prism axis and the pass axis can be used.

Optical Modeling

Figure 10C:
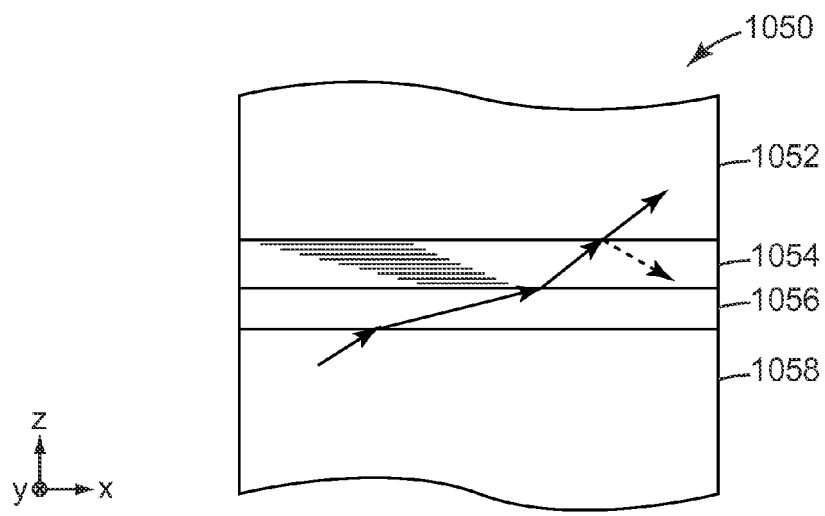
FIG. 10c is a schematic sectional or side view of another simple film construction including an optically immersed multilayer optical film.

Optical modeling of immersed multilayer optical films was employed in order to better understand the observed phenomenon, and to gain a better appreciation of which design parameters have significant impacts on the observed phenomenon. Immersed multilayer optical films can be modeled with standard multilayer interference stack codes. For simplicity, the film stack is modeled as if light is injected and extracted at plane parallel interfaces from and to semi-infinite media of a given refractive index greater than air. Reference in this regard is made to FIG. 10*c*, which shows a schematic sectional or side view of a simple film construction 1050 including an optically immersed multilayer optical film 1054. The construction includes semi-infinite layers 1058, 1052 from which light enters and exits the film 1054, respectively. An optional layer 1056 between layer 1058 and film 1054 may be provided to limit the degree of obliqueness of supercritical light that can be injected into the film 1054. For example, the layer 1056 may be an optically thick layer of ULI material whose refractive index is less than that of semi-infinite layer 1058. For the modeled results below, unless otherwise stated, the semi-infinite medium on each side of the multilayer optical film is assumed to have a refractive index of 1.494, which corresponds to the refractive index of polymethyl methacrylate (PMMA) at 633 nm. In some cases, an absorbing polarizer was also assumed to be included in the modeled film construction as explained further below, such absorbing polarizer being also being immersed in a plane parallel fashion with film 1054.

The light rays that generate significant color cannot be transmitted into air for an observer to measure unless an extraction feature such as a prism is coupled to the film surface. Modeling the extraction of the polarized light by the use of non-planar surfaces such as the prisms of FIG. 10*b* requires additional analysis. This is not done here since there are many types of extraction features that could be used. Instead we only wish to illustrate the basic optical effects that can enhance or diminish color with respect to the effects of layer arrangement of the thin optical layers. The experimental observations are clear and unmistakable, and the modeling was performed to help understand the origins of the color.

The following refractive index values for the materials used in the different microlayers are exemplary of asymmetric multilayer optical films that may be fabricated, and then immersed and used in the disclosed film constructions:

Refractive Index Set 1:

|  | nx | ny | nz |
|---|---|---|---|
| Material "A" | 1.80 | 1.65 to 1.68 | 1.50 |
| Material "B" | 1.57 | 1.57 | 1.57 |
| difference (Δn) | 0.37 | 0.08 to 0.11 | −0.07 |

Refractive Index Set 2:

|  | nx | ny | nz |
|---|---|---|---|
| Material "A" | 1.83 | 1.62 to 1.65 | 1.50 |
| Material "B" | 1.56 to 1.59 | 1.56 to 1.59 | 1.56 to 1.59 |
| difference (Δn) | 0.24 to 0.27 | 0.05 to 0.07 | −0.06 to −0.09 |

Refractive Index Set 3:

|  | nx | ny | nz |
|---|---|---|---|
| Material "A" | 1.83 | 1.620 | 1.50 |
| Material "B" | 1.59 | 1.59 | 1.59 |
| difference (Δn) | 0.24 | 0.03 | −0.09 |

Each of these refractive index sets, if employed in a multilayer optical film with a suitable number of layers and with a suitable layer thickness profile, can provide a reflective polarizing-type multilayer optical film whose reflectivity for normally incident light of one polarization (polarized along the x-axis) is substantially greater than its reflectivity for normally incident light of an orthogonal polarization (polarized along the y-axis). The fact that these refractive index sets have a negative value of Δnz means that their reflectivity for p-polarized light incident in the pass plane (a plane containing the pass axis and the z-axis) can increase with increasing incidence angle, and the non-zero value of Δny also means that the reflectivity for s-polarized light incident in the pass plane also increases with increasing incidence angle. Further information on such films can be found in U.S. Patent Application Ser. No. 61/254,691 referenced above, and in U.S. Patent Application Ser. No. 61/254,692 "Immersed Reflective Polarizer with Angular Confinement in Selected Planes of Incidence", filed Oct. 24, 2009.

Unless otherwise noted, the modeled examples use the refractive indices of Refractive Index Set 3 above, which were believed to be fairly representative of the actual multilayer optical films used in the actual embodiments discussed below.

Modeled transmission spectra for both a 1-packet layer profile similar to that of FIG. 9*b* and a 2-packet layer profile similar to that of FIG. 9*a*, each having about 550 total microlayers, were calculated for the immersed embodiment of FIG. 10*c*, where the semi-infinite layers 1052, 1058 were assumed to have a refractive index of 1.494, and where layer 1056 was omitted. The microlayers were assumed to be in an alternating arrangement with material A and material B indices as set forth in Refractive Index Set 3.

Figure 11A:
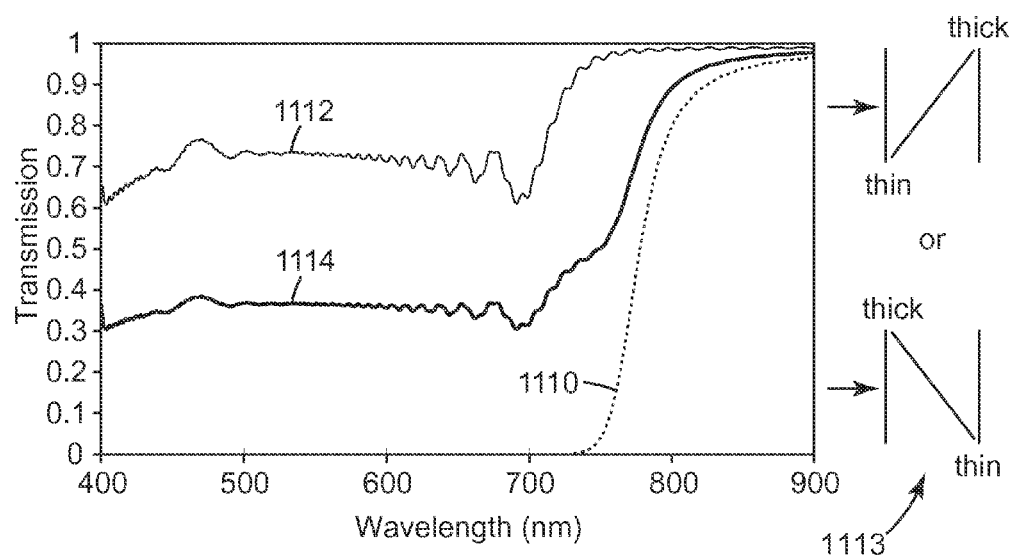
FIG. 11a is a modeled graph of transmission versus wavelength (i.e., spectral transmission) for an exemplary immersed multilayer optical film, where the transmission is calculated for supercritical light incident in the x-z plane ($\phi=0$) at an incidence angle $\theta=49$ degrees measured in a medium of refractive index 1.494, the graph being applicable to both a thick-side-out and a thin-side-out orientation of the film.

FIG. 11*a* is a resulting modeled graph of transmission versus wavelength (i.e., spectral transmission) for such an immersed multilayer optical film, where the multilayer optical film uses a 551 microlayer (275.5 ORUs) 1-packet design similar to that of FIG. 9*b*. The transmission values shown on the vertical axis can be converted to percent transmission values by multiplying by 100, and percent reflection can be assumed to be nominally 100% minus the percent transmission. The transmission is calculated for light whose direction of propagation in the semi-infinite layer 1058 has a polar angle θ=49 degrees and an azimuthal angle φ=0 degrees. The azimuthal angle φ=0 indicates the light is incident in the x-z plane. The polar angle θ=49 in the 1.494 refractive index medium indicates the light is propagating at a supercritical angle. This angle corresponds to a polar angle of 70 degrees in a ULI layer of index 1.2, and to greater than 90 degrees in air, i.e., it would undergo total internal reflection at an interface with air that was parallel to the film exit surface. The transmission was calculated for p-polarized light (curve 1110), s-polarized light (curve 1112), and the average of s- and p-polarized light (curve 1114), which is representative of the transmission of unpolarized light. The transmission calculation was done both for a thick-side-out orientation of the multilayer optical film, wherein the thickest ORUs (see e.g. layer number 550 in FIG. 9*b*) are closest to semi-infinite exit layer 1052, and for a thin-side-out orientation, wherein the thinnest ORUs (see e.g. layer number 1 in FIG. 9*b*) are closest to the semi-infinite exit layer 1052. In this modeled example, the curves 1110, 1112, 1114 were all insensitive to the sidedness-orientation of the multilayer optical film. That is, the calculated transmission curves were essentially the same whether the film was thick-side-out or thin-side-out. This is shown in the figure with simplified illustrations 1113.

Although curve 1114 is not color-free as seen by the variability over the visible portion of the spectrum, the greatest contributor to color in this embodiment is simply the shape of the layer thickness profile, which can be modified to make the spectrum more uniform.

The very same (modeled) immersed multilayer optical film was then evaluated for its transmission in a slightly different plane of incidence. In particular, the azimuthal angle φ was changed to 10 degrees, while the polar angle θ was left unchanged at 49 degrees. The transmission of the immersed film was then calculated in the same way as before, in one case for the multilayer optical film being oriented thick-side-out (FIG. 11*b*) and in the other case with the film being oriented thin-side-out (FIG. 11*c*). Thus, in FIG. 11*b*, curve 1120 represents the transmission of p-polarized light, curve 1122 represents the transmission of s-polarized light, and curve 1124 represents the average of curves 1120 and 1122. Similarly, in FIG. 11*c*, curve 1130 represents the transmission of p-polarized light, curve 1132 represents the transmission of s-polarized light, and curve 1134 represents the average of curves 1130 and 1132. The simplified illustrations 1123, 1133 serve as a reminder for the orientation of the immersed multilayer optical film in the respective figures.

Figure 11B:
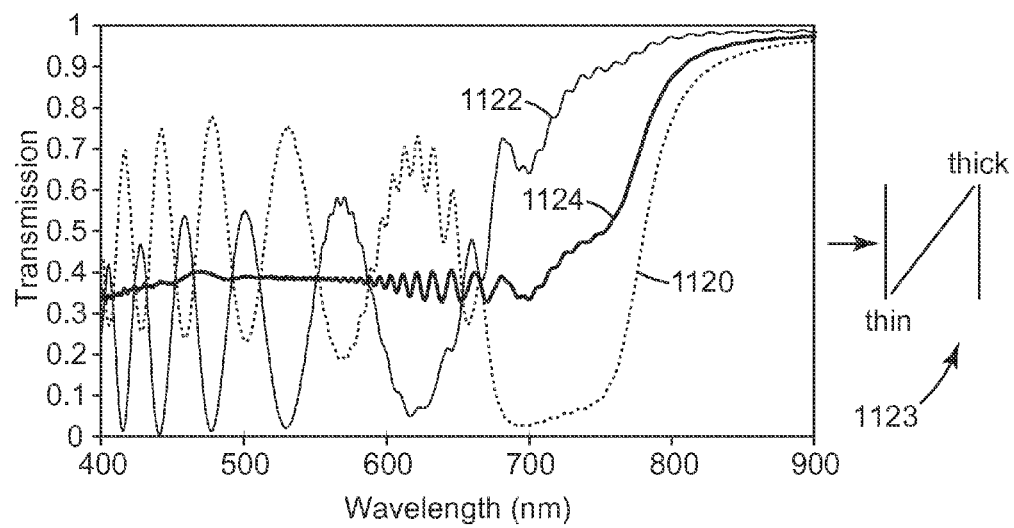
FIG. 11b is a modeled graph of spectral transmission similar to FIG. 11a, but where the plane of incidence is rotated 10 degrees about the z-axis ($\phi=10$), and the multilayer optical film is oriented thick-side-out.
Figure 11C:
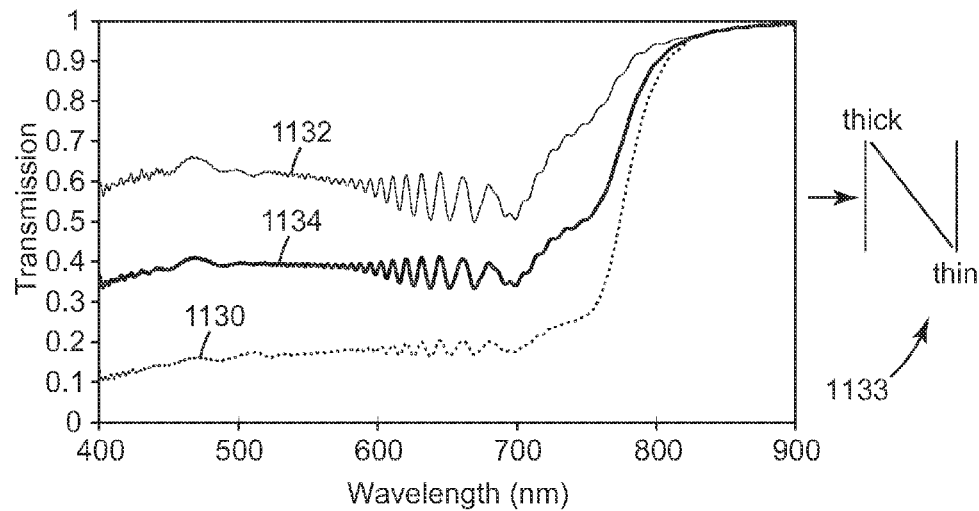
FIG. 11c is a modeled graph of spectral transmission similar to FIG. 11b, but where the multilayer optical film is oriented thin-side-out.

Comparison of FIGS. 11*a*, 11*b*, 11*c* reveals that although the sidedness of the multilayer optical film has no effect on the transmission for light incident in the x-z plane, a slight change in the plane of incidence (while maintaining the same supercritical polar angle) can cause the sidedness of the film to have a great effect on the transmission characteristics. Thus, for light that is incident in a plane that does not include a major axis of the multilayer optical film (the x- or y-axis), such as φ=10 degrees, very different spectra than those of FIG. 11*a* are calculated for s-polarized and p-polarized light. Note the extreme oscillations in curves 1120, 1122 for the p- and s-polarized components of the light, for the thick-side-out orientation. Upon reversing the orientation of the film to thin-side-out, so that the light is first incident on the thicker ORUs of the microlayer stack, and for the very same ray direction (φ=10, θ=49), FIG. 11*c* provides an average transmission 1134 substantially the same as the average transmission 1124 of FIG. 11*b*, but the curves 1130, 1132 of the individual s- and p-polarized components now exhibit very little transmission variation with wavelength relative to the corresponding curves of FIG. 11*b*.

The results of FIGS. 11*b* and 11*c* provide a key to understanding the desirability of arranging the film stack so that the light passes through the thinnest ORUs last. Even though the combined spectra for s and p-polarized light are the same in these two plots (compare curve 1124 with curve 1134), it is easy to see that if a subsequent optical layer is added to the light path that transmits less of either the s-polarized or the p-polarized light, the delicate balance of the individually colorful polarized components of FIG. 11*b* will be upset and the total (combined s- and p-) spectrum will be less uniform.

Figure 12A:
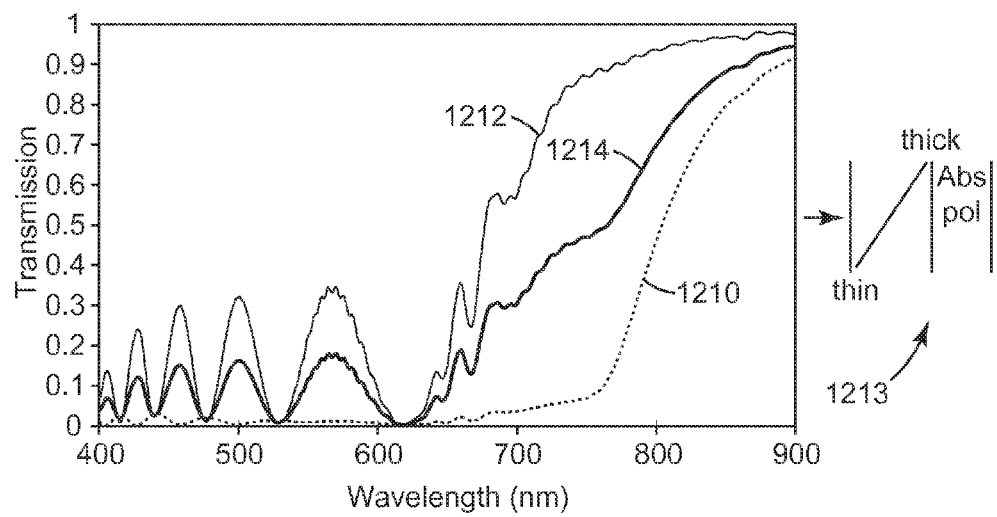
FIG. 12a is a modeled graph of spectral transmission similar to FIG. 11b, but where an absorbing polarizer is placed in optical contact with the output surface of the multilayer optical film.
Figure 12B:
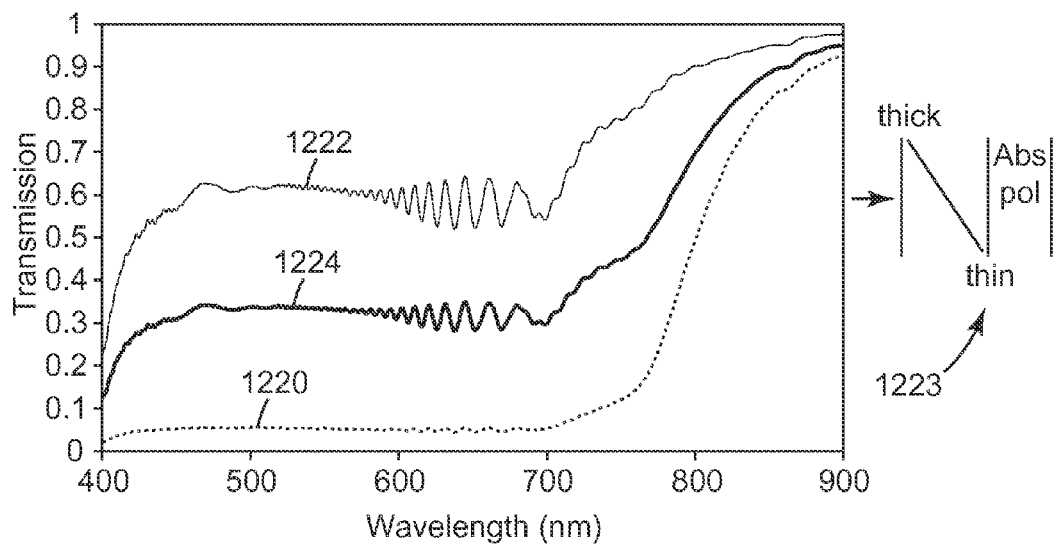
FIG. 12b is a modeled graph of spectral transmission similar to FIG. 11c, but where an absorbing polarizer is placed in optical contact with the output surface of the multilayer optical film.

Such an effect can be demonstrated by simply attaching an absorbing polarizer to the exit surface of the immersed multilayer optical film, i.e., inserting the absorbing polarizer between layers 1052 and 1054 in FIG. 10*c*. Such an arrangement was then modeled, keeping the design characteristics of the multilayer optical film the same as in FIGS. 11*a-c*, and using the same incident ray direction. The pass axis of the absorbing polarizer was assumed to be parallel to the pass axis (y-axis) of the multilayer optical film. The film construction is thus now the same 550 layer single packet multilayer optical film attached to an absorbing polarizer, as shown in the simplified illustrations 1213, 1223 of FIGS. 12*a*, 12*b*. FIG. 12*a* shows the calculated transmission for the embodiment in which the multilayer optical film is oriented thick-side-out, where curve 1210 is for p-polarized light, curve 1212 is for s-polarized light, and curve 1214 is the average of curves 1210, 1212. FIG. 12*b* shows the calculated transmission where the film is thin-side-out, where curve 1220 is for p-polarized light, curve 1222 is for s-polarized light, and curve 1224 is the average of curves 1220, 1222. The shape of the total transmission spectrum (as measured at the output of the absorbing polarizer) is very different depending on the order the thin and thick ORUs of the film stack.

The highly modulated spectrum (curve 1214) of FIG. 12*a* can produce intense colors in most lighting systems. This spectrum is for the system where the light is incident on the thinnest layers first, thickest layers last, and the delicate balance of the s- and p-polarized light components exiting the multilayer optical film is modified by an additional optical film. In this case the additional film was an immersed absorbing polarizer. As discussed above, other optical devices, such as prismatic extraction layers, may be placed on the exit side of the multilayer film. From our experimental observations, such prismatic structures appear to generate spectra similar to those of FIGS. 12*a* and 12*b*, i.e., either relatively uniform or highly modulated with respect to wavelength depending on the layer arrangement within the multilayer optical film.

Figure 13:
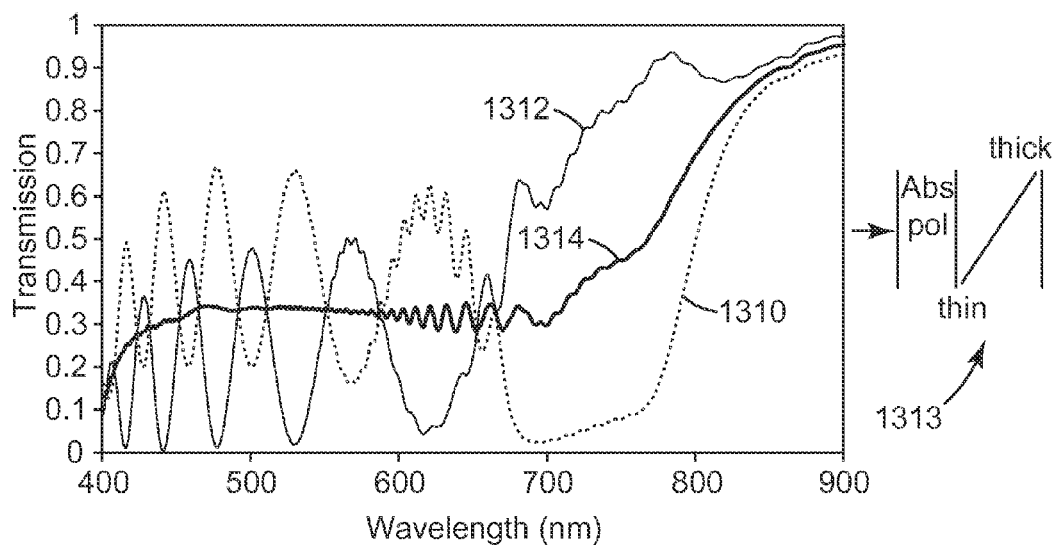
FIG. 13 is a modeled graph of spectral transmission similar to FIG. 12b, but where the light direction has been reversed such that the absorbing polarizer is in optical contact with an input surface of the multilayer optical film.

It should be noted that the total system of FIG. 12*b*, with the thin layers facing another polarizer, can be reversed according to a fundamental theorem of optics and still have the same relatively smooth total transmission spectrum (s-polarized plus p-polarized light, see curve 1224) even though light enters the thin layers first in this reversed case. The reversed case is illustrated in the simple illustration 1313 of FIG. 13. Thus, FIG. 13 is a modeled graph of spectral transmission for the construction of FIG. 12*b*, but where the light direction has been reversed such that the absorbing polarizer is now in optical contact with a surface now deemed to be the input surface (considered the output surface in FIG. 12*b*) of the multilayer optical film. The directional characteristics of the incident light ray (φ=10, θ=49) are otherwise unchanged, as are the design characteristics of the multilayer optical film. Curve 1310 is the calculated transmission for p-polarized light, curve 1312 is for s-polarized light, and curve 1314 is the average of curves 1310, 1312.

Comparing FIG. 13 with FIG. 12*b*, we see that the average transmission 1314 is unchanged relative to the average transmission 1224, but the individual transmission spectra 1312, 1310 for s- and p-polarized light are again highly modulated as a function of wavelength, as we saw previously in FIG. 11*b*. Unless the light can be extracted from the construction of FIG. 13 without disrupting the delicate balance of the transmission spectra for s- and p-polarized light, or unless the construction is used within an immersed system in this form, this reverse arrangement can still result in significant color and may be undesirable.

In summary, the above optical modeling demonstrates that individual transmission spectra for s- and p-polarized light are substantially modulated when light enters the thin layers first (thick-side-out orientation), and these transmission spectra exhibit substantially less modulation with respect to wavelength when the stack is reversed so that light enters the thick layers first (thin-side-out orientation).

Optical modeling was then extended to embodiments in which the microlayers of the multilayer optical film are separated into multiple distinct microlayer packets with optically thick layers therebetween, as discussed above in connection with the 2-packet arrangement of FIG. 9*a*. The results, which are described below, demonstrate that in these cases too, it is preferred from the standpoint of reducing undesirable color to arrange the multilayer optical film so that the thinner optical repeat units are, on average, closer to the output surface of the multilayer optical film than the thicker optical repeat units.

In a first modeled 2-stack embodiment, the multilayer optical film was designed to have two microlayer packets each of which contained 275 microlayers in an alternating A, B arrangement, the refractive indices of which are shown above in Refractive Index Set 3. The two packets were separated by an optically thick layer (15 microns thick) analogous to a protective boundary layer (PBL), and having the same refractive index as the isotropic layer. The model also assumed 50 micron thick skin layers were present on each side of the plurality of microlayers, the skin layers also having the same refractive index as the isotropic layer. (Usually, it is preferred that optically thick layers of a multilayer optical film, such as skin layers and PBL layers, be isotropic or minimally birefringent rather than highly birefringent.) The total number of microlayers in the film was thus 550. The thickness gradient of the microlayers was modeled to be similar to that shown in FIG. 9*a*, i.e., each 275-layer packet had a monotonic gradient of thinner microlayers to thicker microlayers, and thinner ORUs to thicker ORUs.

The transmission of this 2-stack multilayer optical film, when optically immersed as shown in FIG. 10*c*, was calculated in the same manner as before, but in this case the film construction was assumed to include an optically thick ULI layer 1056 between the semi-infinite light injection layer 1058 and the incident side of the multilayer optical film. The semi-infinite layers 1052, 1058 were again assumed to have a refractive index of 1.494. The ULI layer 1056 was assumed to have a refractive index of 1.2 and a physical thickness of 100 microns. The direction of the incident light ray was again characterized by ($\phi$=10 degrees, $\theta$=49 degrees in the 1.494 index material.

Figure 14A:
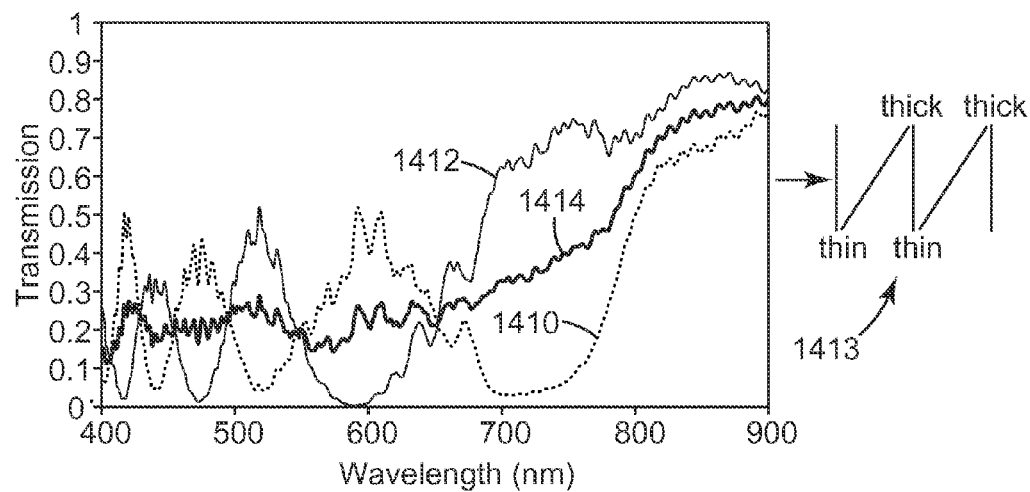
FIG. 14a is a modeled graph of spectral transmission similar to FIG. 11b, but where the microlayers of the multilayer optical film are distributed into two distinct stacks or packets, the thickness profile still being thick-side-out.
Figure 14B:
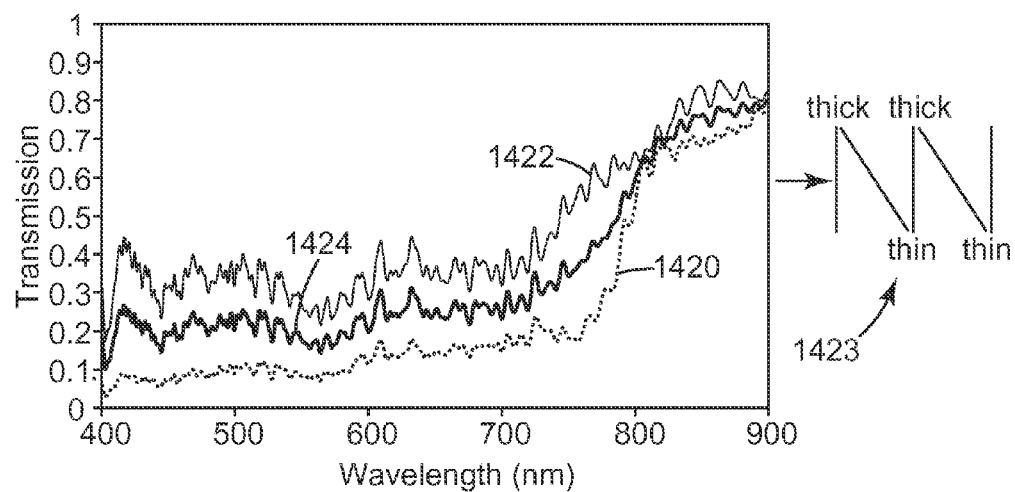
FIG. 14b is a modeled graph of spectral transmission similar to FIG. 11c, but where the microlayers of the multilayer optical film are distributed into two distinct stacks or packets, the thickness profile still being thin-side-out.

FIG. 14*a* shows the resulting calculated transmission spectra of the immersed multilayer optical film in a thick-side-out orientation, as indicated by the simple illustration 1413. In the figure, curve 1410 is the calculated transmission for p-polarized light, curve 1412 is for s-polarized light, and curve 1414 is the average of curves 1410, 1412. FIG. 14*b* shows the calculated transmission spectra of the immersed multilayer optical film in a thin-side-out orientation, as indicated by the simple illustration 1423. In the figure, curve 1420 is the calculated transmission for p-polarized light, curve 1422 is for s-polarized light, and curve 1424 is the average of curves 1420, 1422.

Comparison of FIGS. 14*a*, 14*b* shows that the transmission spectra for s- and p-polarized light are highly modulated as a function of wavelength for the thick-side-out orientation (FIG. 14*a*), compared to the smaller modulate of the thin-side-out orientation (FIG. 14*b*). This is qualitatively the same as the modeling results for the 1-packet multilayer optical film, although differences can also be seen between the modulation of the s- and p-polarized light transmission spectra of FIG. 14*a* (curves 1410, 1412, for 2-packet film, thick-side-out) and the modulation of the s- and p-polarized light transmission spectra of FIG. 11*b* (curves 1120, 1122, for a 1-packet film, thick-side-out).

The s- and p-polarized light transmission spectra of the immersed 2-packet multilayer optical film are more uniform when the film is oriented such that the incident light enters the thicker ORUs of each packet before the thinner ORUs, i.e., thin-side-out. As mentioned, the film construction containing the 2-packet multilayer optical film was assumed to have an optically thick ULI layer of refractive index 1.20 at the input surface of the multilayer optical film. For the both orientations of the 2-packet film, the ULI layer was unchanged, i.e. it was always placed on the incident side of the multilayer optical film. For this reason the total transmission spectrum (curve 1414) of FIG. 14*a* is slightly different from the total transmission spectrum (curve 1424) of FIG. 14*b*.

For the actual multilayer optical films that were fabricated and observed in the laboratory, very little difference between the thick-side-out and thin-side-out orientations was discernable when the films were not optically immersed, e.g., when the film was viewed in transmission after being laid atop a polarized light table. In an attempt to model this behavior, the 2-packet multilayer optical film described in connection with FIGS. 14*a-b* was modeled in a non-immersed, air environment, and the results are shown in FIGS. 15*a*, 15*b*.

Figure 15A:
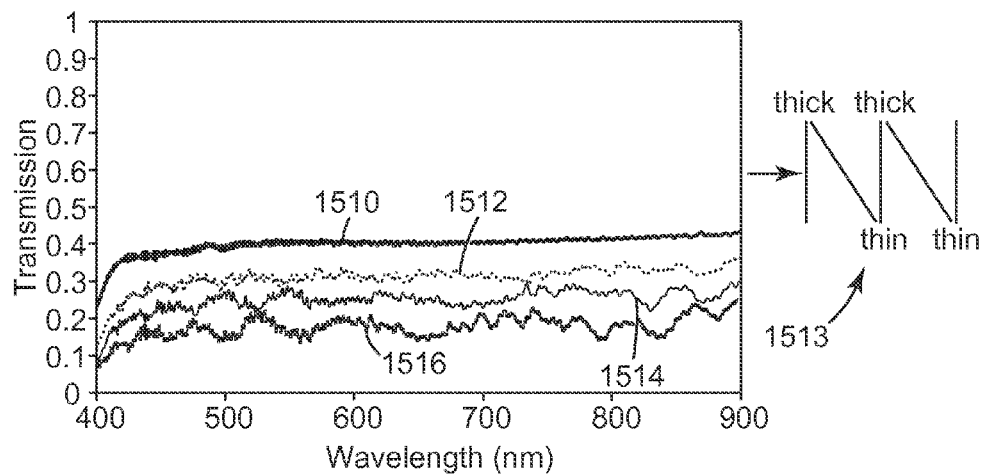
FIGS. 15a and 15b are modeled graphs for the 2-packet multilayer optical film of FIGS. 14a-b, but where the film is no longer optically immersed in the 1.494 refractive index medium (i.e., it is now assumed to be immersed in air), where the film is assumed to be disposed in front of an absorbing polarizer, and where the plane of incidence is at an azimuthal angle of $\phi=20$ degrees, with FIG. 15a having the multilayer optical film oriented thin-side-out, and FIG. 15b having the multilayer optical film oriented thick-side-out.
Figure 15B:
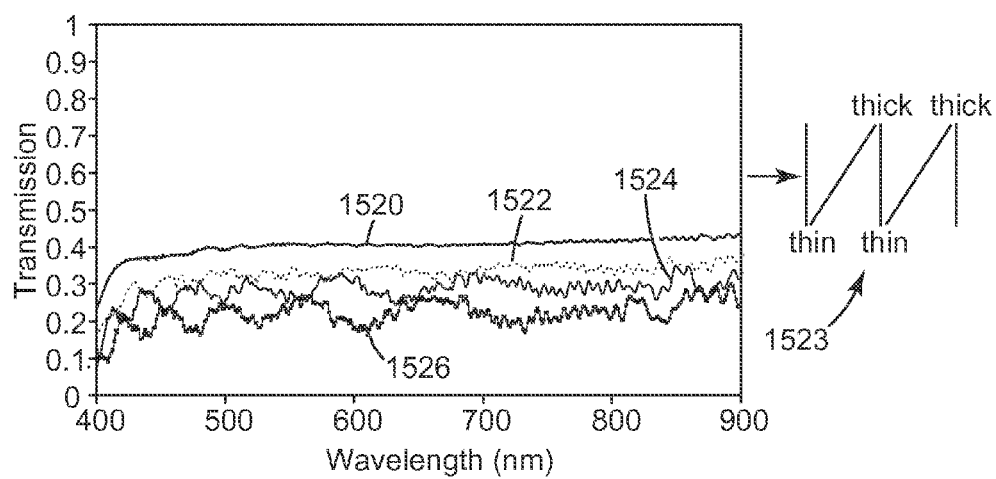

FIGS. 15*a* and 15*b* are thus modeled graphs of total spectral transmission for the 2-packet multilayer optical film of FIGS. 14*a-b*, but where the film is no longer optically immersed in the 1.494 refractive index medium. FIGS. 15*a*, 15*b* instead assume the multilayer optical film is immersed in air, the film being disposed on the output side of a plane parallel, non-diffusive absorbing polarizer whose pass axis is parallel to the pass axis of the multilayer optical film (the y-axis). Light is incident from beneath the absorbing polarizer in air, in a plane of incidence whose azimuthal angle $\phi$=20 degrees. The polar angle $\theta$, measured in air, ranged from 0 degrees (normal incidence) to 70 degrees, and was therefore not a supercritical angle. The multilayer optical film was oriented thin-side-out in FIG. 15*a* as depicted in the simplified illustration 1513, i.e., the thick side of the film faced the absorbing polarizer. In FIG. 15*b*, the film was oriented and thick-side-out as depicted in the simplified illustration 1523, i.e., the thin side of the film faced the absorbing polarizer. The transmission was calculated for polar angles $\theta$, measured in air, of 0 degrees (curve 1510 in FIG. 15*a*, curve 1520 in FIG. 15*b*), 50 degrees (curve 1512 in FIG. 15*a*, curve 1522 in FIG. 15*b*), 60 degrees (curve 1514 in FIG. 15*a*, curve 1524 in FIG. 15*b*), and 70 degrees (curve 1516 in FIG. 15*a*, curve 1526 in FIG. 15*b*).

Comparison of FIGS. 15*a*, 15*b* reveals that, even in the presence of an absorbing polarizer, modulation of the transmission curves as a function of wavelength is moderate, and very little difference can be seen between the degree of modulation for the thick-side-out orientation and the degree of modulation for the thin-side-out orientation. This is very different from film constructions in which the multilayer optical film is optically immersed.

Fabricated Multilayer Optical Film Constructions

Figure 16:
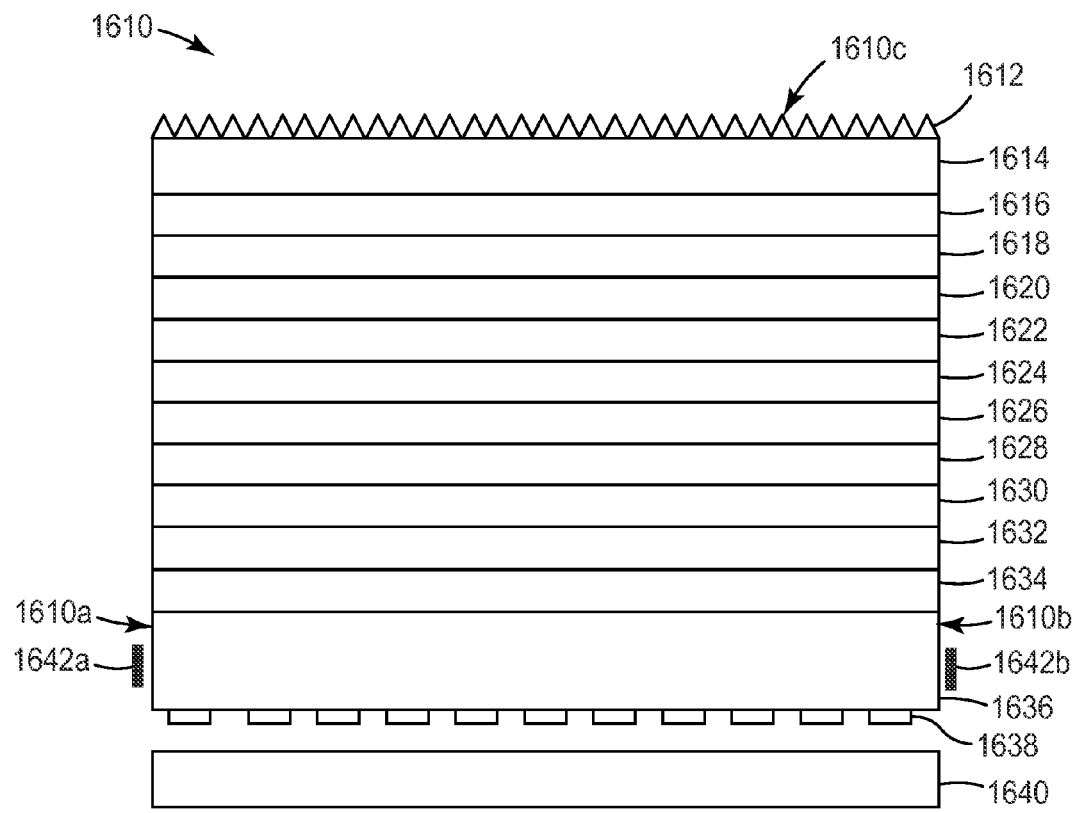
FIG. 16 is a schematic side or sectional view of a film construction that was fabricated in one embodiment with the multilayer optical film oriented thin-side-out, and in another embodiment with the multilayer optical film oriented thick-side-out.

We now describe multilayer optical film constructions that were fabricated and observed in a laboratory setting. These constructions involved the lamination of the multilayer optical film, and other optical films, to a solid light guide suitable for use in a display backlight. A schematic side view of a representative resulting film construction 1610 is shown in FIG. 16. The film construction 1610, in combination with light sources 1642a and 1642b disposed at input surfaces 1610a, 1610b of the construction 1610, and with a white back reflector 1640 disposed behind the construction 1610, constituted an extended area white light source suitable for use as a back light in a display application. Light exits from the backlight at an output surface 1610c of the construction 1610 towards a display panel and/or observer (not shown).

In the laminate-on-light guide construction 1610, prism structures 1612, such as those used in BEF prismatic films, are applied to a multilayer optical film 1614, which in the fabricated embodiments was a reflective polarizing film. The prisms are exposed to air and transmit light that has passed through the polarizing film 1614 generally upwards towards a display panel or viewer. Such light originates from light sources 1642a, 1642b, which are shown in an edge-lit configuration at an edge of a solid light guide 1636. The light guide 1636 is provided with a pattern of conventional extractors 1638. Light that escapes from the bottom of light guide 1636 is reflected by the white back reflector 1640. Pressure sensitive adhesive layers 1634, 1628, 1622, and 1616 adhere the light guide 1636 to the other components in the laminate, including low haze ULI layers 1620, 1632 applied respectively to PET films 1618, 1630, and a volume diffuser layer 1626 applied to PET film 1624.

As a result of the edge-lit geometry of light injection, and the volume diffuser layer 1626, and the ULI layers 1620, and the prism structures 1612, the multilayer optical film 1614 in the construction 1610 is effectively optically immersed in the ULI medium of layers 1620, 1632, and supercritical light propagates through the film 1614 and exits the output surface 1610c. Two film constructions 1610 were fabricated. In a first construction, a first multilayer optical film was oriented thick-side-out. In a second construction, a second multilayer optical film, which was very similar to the first multilayer optical film, was oriented thin-side-out. Other than the different orientations of the multilayer optical films, the first and second constructions had substantially similar designs.

The various components of the construction will now be described in more detail.

Multilayer Optical Film 1614

Two multilayer optical films of similar design were used, one for each film construction. The multilayer optical films are referred to herein as MOF1 and MOF2. These films are reflective polarizing films, each having 550 total microlayers distributed into two packets similar to the packets shown in FIG. 9a, with an optically thick protective boundary layer between the packets and optically thick skin layers that formed the outermost portions of each multilayer optical film. The outermost surface of the film that was nearest the thinner microlayers/thinner ORUs (see e.g. layer number 1 in FIG. 9a) is referred to as the thin side of the film, and the outermost surface of the film that was nearest the thicker microlayers/thicker ORUs (see layer number 550 in FIG. 9a) is referred to as the thick side of the film.

Using a feedblock method (see e.g. U.S. Pat. No. 6,783,349 (Neavin et al.)), the reflective polarizers MOF1, MOF2, having alternating low and high index polymer layers, were each made by co-extruding two similar packets of 275 layers of alternating low and high index polymer materials and subsequently joining the two packets of layers. For each 275 layer packet, the high index layers were made with a 90/10 coPEN (a copolyester containing 90% ethylene naphthalate repeat units and 10% ethylene terephthalate repeat units). The low index layers were made by blending in the extruder a mixture of 55% by weight of PETG (available from Eastman Chemicals) with 45% by weight of the 90/10 coPEN. Some of the low index material was diverted from the melt train to form the protective boundary layers during the coextrusion process. Skin layers of the PETG polymer were applied to the melt flow, immediately preceding the extrusion die, to each side of the film.

In each case, the cast web was oriented in a standard film-making tenter in a continuous operation. The cast web was preheated in the tenter. The film was then stretched at a suitable temperature (154° C. for MOF1; 132° C. for MOF2) at an initial rate of about 60%/second for about 4.5 seconds followed by a rate of about 15%/sec for about 18 seconds. The total overall stretch ratio in the x direction was about 5.5:1. For each of MOF1 and MOF2, the film was then heat set for about 18 seconds at 227° C. while towing in about 1% of the width. In many cases, heat setting can be used to increase the birefringence of the more strongly oriented (i.e., initially more birefringent) microlayers while decreasing or eliminating the birefringence of the more weakly oriented (i.e., initially less birefringent) microlayers.

The relative extrusion rates of the low and high index materials in each packet of layers were adjusted so that adjacent material layers in the finished film would each have approximately the same optical thickness. The listed materials and orientation conditions were intended to yield a set of indices of about $nx1=1.82$, $ny1=1.62$, $nz1=1.505$ and $nx2=ny2=nz2=1.595$ and with both the low and high index layers having a quarterwave optical thickness for the block axis α-axis) that is tuned to reflect from about 425 nm for the thinnest ORUs and increasing in thickness monotonically in a power law profile to reflect about 1150 nm light for the thickest ORUs of each packet. The extrusion casting wheel speed was adjusted so that the resultant reflection band spanned this wavelength range. The shape of the power law profile was chosen so that the resultant spectra were relatively flat across most of the spectrum for each packet. The spectral shape was fine tuned using the axial rod technique outlined in U.S. Pat. No. 6,783,349 (Neavin et al.). In the final oriented film, the skin layers were each about 11 microns thick. The total finished film thickness, for each of MOF1 and MOF2, was about 90 microns. MOF1 and MOF2 were thus both broadband reflective polarizer films, with a block axis along the x-axis and a pass axis along the y-axis.

Prism Structures 1612 Coated onto Multilayer Optical Film

A curable layer of resin was coated onto the multilayer optical film 1614, shaped to form prisms using a suitable mold, and cured. The composition of the resin was: 75% (w/w) epoxy acrylate, sold as CN120 (available from Sartomer, Exton, Pa.), 25% (w/w) 2-phenoxyethyl acrylate, sold as SR-339 (available from Sartomer, Exton, Pa.), and 0.5% (pph) 2,4,6-trimethylbenzoyl-diphenyl-phosphineoxide, sold as Darocur® TPO and 0.5% (pph) 2-hydroxy-2-methyl-1-phenyl-propan-1-one, sold as Darocur® 1173 (both available from Ciba Specialty Chemicals Inc., Switzerland). This resin has a refractive index in the uncured state greater than 1.55. The prism mold produced linear prismatic structures using this resin that substantially resembled the prismatic structured surface of Vikuiti™ BEF III (brightness enhancement film) available from 3M Company, St. Paul, Minn. As such, the prisms had a 90 degree included angle, 50 micron pitch, and tip radius of 7 microns. Also, the height of each prism varied along the length or axis of the prism. The prisms were oriented relative to the multilayer reflective polarizer film 1614 such that the length or axis of each prism was parallel to the pass axis of the film 1614.

Pressure Sensitive Adhesive Layers 1634, 1628, 1622, and 1616

0.1% bisamide crosslinker was added to SK Dyne 2003K wet adhesive, available from Soken Chemicals, Tokyo, Japan, and the mixture was coated onto 2 mil polyester silicone release liner (T50 available from CP Films, St. Louis, Mo.) using a conventional slot die and the solvent was dried, leaving a 1 mil thick adhesive coating. A second release liner was laminated to the surface of the dried adhesive: 2 mil polyester silicone release liner with differential release (T10 also available from CP Films).

Low Haze ULI Layers 1620, 1632 and Volume Diffuser 1626 on Pet Films 1618, 1630, 1624

A volume diffuser coating solution (A) was prepared. First, 982 g of methanol, 301.3 g of photomer 6010 (Cytec Industries, Woodland Park, N.J.), 133.9 g of SR833S and 154 g of SR9003 (Sartomer, Exton, Pa.) were mixed together under ultrasonic until a homogenous solution. After that, 720 g of KSR-3A (3.0 μm polystyrene beads, available from Soken Chemical & Engineering Co., Ltd, Tokyo, Japan) was added under rapid stirring. The milky solution was stirred overnight, and then 982 g of 1-methoxy-2-propanol and 15.1 g of Darocur® 4265 (Ciba Specialty Chemicals, High Point, N.C.) were added to the above solution under rapidly stirring to form a homogenous volume diffuser solution.

A coating solution (B) was made. In a 2 liter three-neck flask, equipped with a condenser and a thermometer, 960 grams of IPA-ST-UP organosilica elongated particles, 19.2 grams of deionized water, and 350 grams of 1-methoxy-2-propanol were mixed under rapid stirring. The elongated particles had a diameter in a range from about 9 nm to about 15 nm and a length in a range of about 40 nm to about 100 nm. The particles were dispersed in a 15.2% wt IPA, and 22.8 grams of Silquest A-174 silane was added to the flask. The resulting mixture was stirred for 30 minutes. The mixture was kept at 81° C. for 16 hours. Next, the solution was allowed to cool down to room temperature, and about 950 grams of the solvent in the solution was removed using a rotary evaporator under a 40° C. water-bath, resulting in a clear A-174-modified elongated silica solution having 41.7% wt A-174-modified elongated silica dispersed in 1-methoxy-2-propanol. The above process was repeated 4 times to make more surface modified nanoparticles. Next, 1500 kg of the clear A-174-modified elongated silica solution, 610.5 grams of SR 444, 12.0 g of TEGO Rad 2250, 3.13 g of Irgacure 819, 7.8 grams of Irgacure 184, and 1900 grams of isopropyl alcohol were mixed together and stirred, resulting in a homogenous coating solution (B), having 31% wt solids.

A coating procedure (C) was developed. First, a coating solution was pumped at a specified rate into a slot-type coating die. The slot coating die uniformly distributed a 12.5-inch wide coating onto a substrate moving at the specified speed. Next, the coating was polymerized by passing the coated substrate through a UV-LED cure chamber that included a quartz window to allow passage of UV radiation. The water-cooled UV-LED bank included a rectangular array of 832 UV-LEDs, 16 down-web by 52 cross-web (approximately covering a 22.8 cm×45.7 cm area). The LEDs (available from LedEngin, Inc., Santa Clara, Calif., 95054, Part #LZ1-00UA05) operated at a nominal wavelength of 395 nm. The UV-LED array was powered using two TDK-Lambda power supplies (available from TDK-Lambda, San Diego, Calif., PN: 00507229). The UV-LEDs were positioned above the cure chamber quartz window at a distance of approximately 2.54 cm from the substrate. The UV-LED cure chamber was supplied with a flow of a mixture of nitrogen and air at a specified flow rate to achieve the desired oxygen concentration in the cure chamber. The oxygen concentration was sensed at a position approximately 0.635 cm above the coated surface of the moving substrate immediately upstream of the UV-LED exposure position. The nitrogen/air mixture was supplied uniformly across the width of the substrate immediately downstream of the UV-LED exposure position.

Coating solution (B) was coated on "Melinex 617" primed 50 μm PET films (available from DuPont Teijin Films) according to the coating procedure (C), with the UV-LEDs operated at 13 amps, a flow rate of 47 cc/min, and web-speed at 30 feet/min. An additional oxygen flow was supplied to control the total oxygen level at 2350 ppm in the UV-LED chamber. The solvent in the cured coating was removed by transporting the coated substrate to a drying oven at 66° C. Next, the dried coating was post-cured using a Fusion System Model I300P configured with an H-bulb (available from Fusion UV Systems, Gaithersburg Md.), operated under nitrogen and 100% UV power. This generates an ultra low haze low index coating on PET film. The resulting ultra low haze low index coating has 93.7% transmission and 2.3% haze, measured using a Haze-Gard Plus (BYK-Gardner USA, Columbia, Md.). The refractive index was measured as 1.25 from the coating side using a Metricon 2010 index measurement instrument available from Metricon Corp., Pennington, N.J., and 1.196 from PET side under TM mode.

Coating solution (A) was pumped through a 100 μm size filter, and then coated on "Melinex 617" primed 50 μm PET films (available from DuPont Teijin Films). Coating solution (A) was pumped through a 100 μm size filter according to the coating procedure (C), with the UV-LEDs off, a flow rate of 109 cc/min, and web-speed at 20 feet/min. The solvent in the cured coating was removed by transporting the coated substrate to a drying oven at 66° C. Next, the dried coating was post-cured using a Fusion System Model 1300P configured with an H-bulb (available from Fusion UV Systems, Gaithersburg Md.), operated under nitrogen and 100% UV power. This generates a volume diffuser coating on PET film. The resulting volume diffuser coating has 93.2% transmission, 96.8% haze, and 3.7% clarity, measured using a Haze-Gard Plus (BYK-Gardner USA, Columbia, Md.).

Note that although the volume diffuser and ULI layers are described here as being coated onto a PET substrate and then laminated to the other components, in alternative embodiments these layers may be coated (in one or more layers) directly onto the multilayer optical film, without a separate lamination step.

Solid Light Guide 1636

The light guide plate was obtained from Coretronic Company (Hsinchu, Taiwan 300, R.O.C.), model AUT1982T32. The light guide is made of poly(methyl methacrylate) with white print dots on the bottom surface, and its dimensions were 6 mm thick, and 385 mm by 306 mm in lateral dimension.

White Back Reflector 1640

The white back reflector was obtained from AOC 22 inch monitor (model#: V22), available from AOC LCD Company (www.aocdisplay.com).

Light Sources 1642*a* and 1642*b* and Backlight Cavity

A 22-inch AOC monitor model#V22 was disassembled to separate the backlight from the panel. The backlight was sized approximately 473 mm by 306 mm. It contained a row of 114 LEDs along each 473 mm edge of the backlight, and a white back reflector lining the back wall. Only 93 LEDs on each edge were used for the film constructions 1610 described in the present patent application. (The 93 LEDs were then arranged regularly along each 385 mm edge of the light guide plate 1636.) In each of the fabricated constructions, the pass axis of the reflective polarizer film 1614, in the laminated construction of FIG. 16, was also aligned with the 385 mm edge. The polarized light guide plate is then set into the backlight on top of the white back reflector such that the pass axis (y-axis) of the multilayer reflective polarizer is parallel to the rows of LEDs, and the 385 mm edge of the light guide 1636 is parallel to the 473 mm edge of the backlight.

Multilayer Optical Film Construction 1610

The foregoing components were combined via coating and lamination operations to form a multilayer optical film construction 1610, i.e., a laminate-on-light guide construction, substantially as shown in FIG. 16. Two such constructions were made: in a first construction, MOF1 was used for the multilayer optical film 1614, and the MOF1 was oriented thick-side-out (the thicker ORUs of the film disposed closer to the output surface 1610*c*); in the second construction, MOF2 was used for the multilayer optical film 1614, and the MOF2 was oriented thin-side-out (the thinner ORUs of the film disposed closer to the output surface 1610*c*). As explained further below, a significant difference in perceived color was observed between these two constructions, with the lower color being associated with the second construction (thin-side-out orientation).

The color uniformity of the first and second constructions were measured using a Prometric Camera (Model#PM-9913e-1, available from Radiant Imaging, Redmond, Wash. 98053, USA), with a 300 mm lens. Each construction was mounted 3 meters away from the camera during measurement. Before making the measurements, a linear absorbing polarizer, not shown expressly in FIG. 16, was placed on top of the backlight constructions with its pass-axis parallel to the long side of the light guide 1636. The measurement was set up such that the optical axis of the camera was 70° (polar angle) from the backlight surface normal and 22° (azimuthal angle) from the direction normal to the long side of the light guide, i.e., 22 degrees in azimuthal angle relative to the block axis (x-axis) of the multilayer reflective polarizer 1614. The measurement arrangement provided color information in the form of x and y color coordinates (CIE 1931) for any given spot or sample area on the output surface of the construction. The measurement results are shown in FIGS. 17*a*, 17*b*, 18*a*, and 18*b*.

Figure 17A:
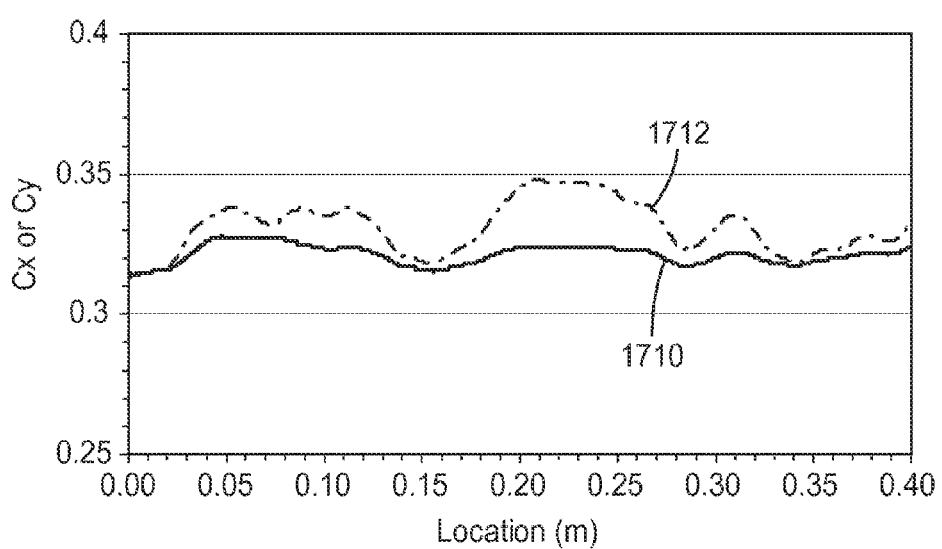
FIGS. 17a and 17b are graphs showing the measured color as a function of position along a horizontal axis for the embodiments of FIG. 16, with FIG. 17a corresponding to thick-side-out and FIG. 17b corresponding to thin-side-out.
Figure 17B:
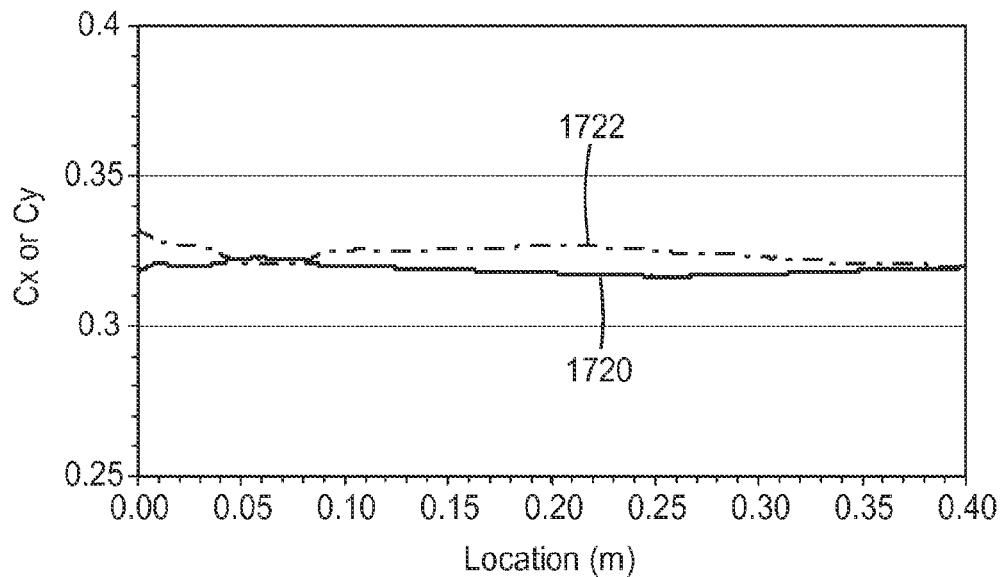

FIG. 17*a* shows the measured color as a function of position along the horizontal axis (corresponds to the 385 mm edge of the light guide 1636, and the pass axis (y-axis) of the multilayer film) of the first construction, i.e., thick-side-out. In the figure, curve 1710 is for the "x" color coordinate ("Cx"), and curve 1712 is for the "y" color coordinate ("Cy"). FIG. 17*b* shows the measured color along the same horizontal axis of the second construction, i.e., thin-side-out. In the figure, curve 1720 is for Cx, and curve 1722 is for Cy.

Figure 18A:
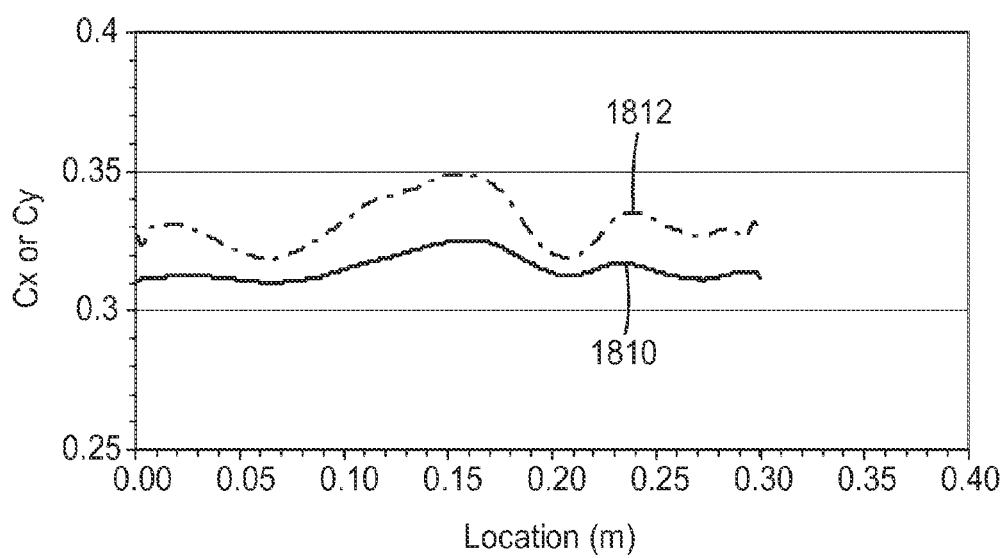
FIGS. 18a and 18b are graphs showing the measured color as a function of position along a vertical axis for the embodiments of FIG. 16, with FIG. 18a corresponding to thick-side-out and FIG. 18b corresponding to thin-side-out.
Figure 18B:
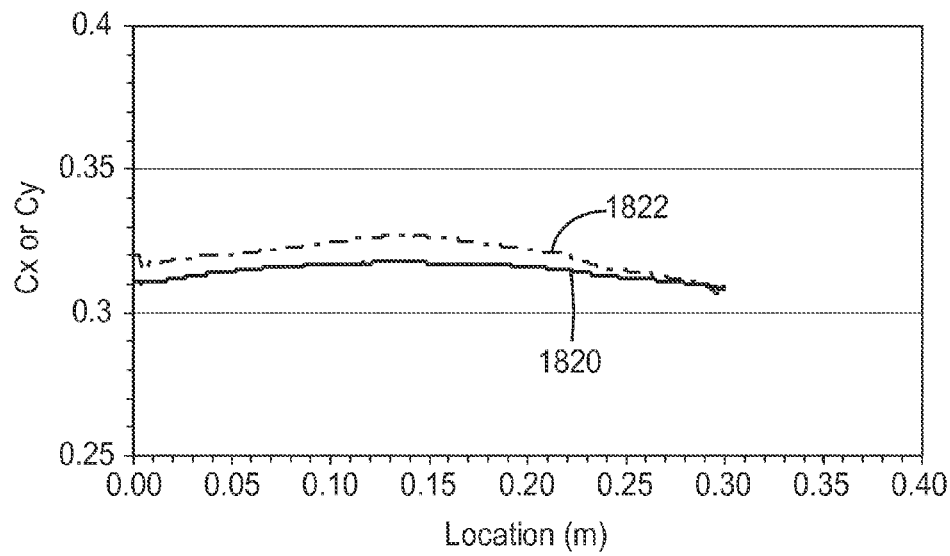

FIG. 18*a* shows the measured color as a function of position along the vertical axis (corresponds to the 306 mm edge of the light guide 1636, and the block axis (x-axis) of the multilayer film) of the first construction, i.e., thick-side-out. In the figure, curve 1810 is for Cx, and curve 1812 is for the Cy. FIG. 18*b* shows the measured color along the same vertical axis of the second construction, i.e., thin-side-out. In the figure, curve 1820 is for Cx, and curve 1822 is for Cy.

The reader should be aware that some amount of color was visible in both of the constructions as a result of dispersion of the material used to make the prismatic structures 1612. However, the color due to this dispersion had little spatial variability due to the high quality of the prismatic microstructured surface over the entire output surface of the constructions. On the other hand, color associated with the multilayer optical film (particularly in the first construction) exhibited significant spatial variability as seen in FIGS. 17*a* and 18*a*. Comparison of those figures with FIGS. 17*b* and 18*b*, respectively, demonstrate that embodiment with the immersed multilayer optical film oriented thin-side-out has significantly better color uniformity than the thick-side-out embodiment. Spatial color non-uniformity from the multilayer optical film is dominant in the first construction, while typical rainbow color due to prism material dispersion is dominant in the second construction. Additional optical modeling was performed with layer profiles that overall were 5% thicker and 5% thinner than the profile of FIG. 9*b*, and the spectral features such as those in FIG. 12*a* moved to correspondingly greater and lower wavelengths, respectively. This confirms that the observed color of light transmitted by the film construction is thickness dependent, and explains why the observed color in thick-side-out constructions is typically highly spatially non-uniform—such spatial color variations correspond to small caliper variations in the film.

Further Optical Modeling

Additional optical modeling was performed to further investigate design parameters that may be relevant to the observed color caused by optically immersed multilayer reflective films. Modeling was pursued to investigate the effect of a perfect y-index match on the observed color. We start from the 551-microlayer single packet multilayer optical film design associated with FIG. 11*b*, in which the film is optically immersed in a 1.494 refractive index medium and has the refractive indices of Refractive Index Set 3. Using optical modeling software, we can change the refractive indices to drive the layer-to-layer refractive index difference in the y-direction to zero, mainly by slightly raising the refractive index of material "B". The modified refractive indices are provided in Refractive Index Set 4:

Refractive Index Set 4:

|  | nx | ny | nz |
|---|---|---|---|
| Material "A" | 1.826 | 1.62 | 1.50 |
| Material "B" | 1.62 | 1.62 | 1.62 |
| difference (Δn) | 0.206 | 0 | −0.12 |

Figure 19A:
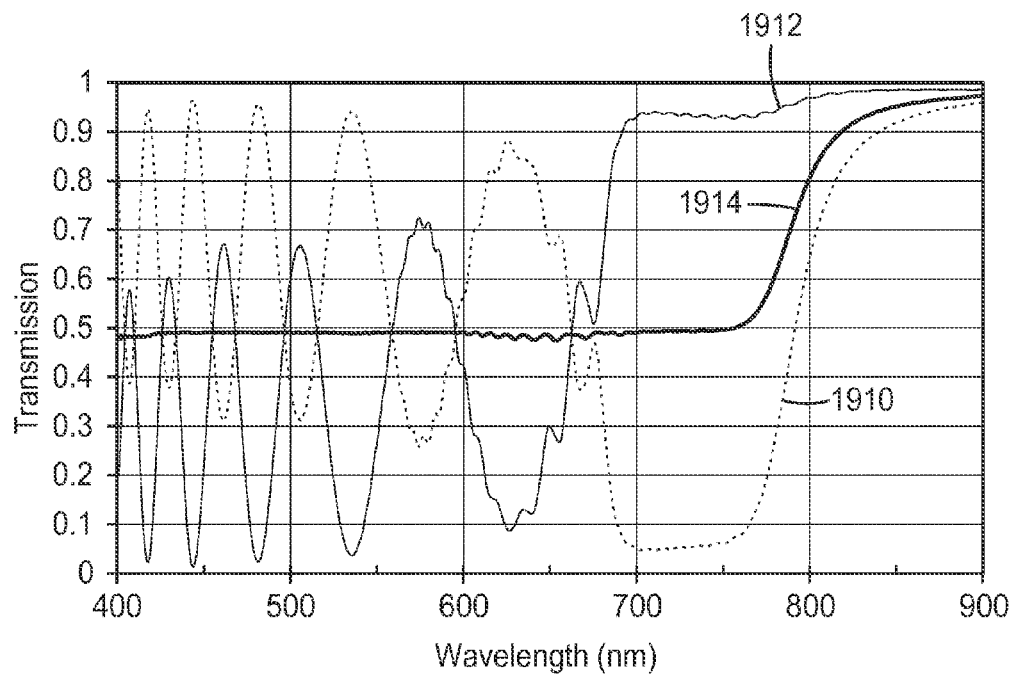
FIG. 19a is a modeled graph of spectral transmission of a multilayer optical film immersed in a 1.494 refractive index medium, the multilayer optical film having matched layer-to-layer refractive indices along one in-plane axis, the multilayer optical film being oriented thick-side-out.

The transmission of the resulting optically immersed multilayer optical film having 551 microlayers of these refractive indices can then be calculated in the same manner as in FIG. 11*b*, where we again select the same ray direction $\phi=10$, $\theta=49$) at which we calculate the transmission, and the multilayer optical film is again oriented thick-side-out. The resulting calculated transmission is provided in FIG. 19*a*, where curve 1910 represents the transmission of p-polarized light, curve 1912 represents the transmission of s-polarized light, and curve 1914 represents the average of curves 1910 and 1912. Comparison of FIG. 19*a* with FIG. 11*b* shows that the shift in the material B refractive index to drive Δny=0 causes the amplitude of the spectral oscillations in the p-pol and s-pol transmission (curves 1910, 1912) to increase.

We next investigate the effect of matching the z-indices of adjacent microlayers. Using the multilayer optical film of FIG. 19*a* (and Refractive Index Set 4) as a starting point, lowering the index of the isotropic material to a value of n=1.50 so as to match the z-index creates a very strong block reflector for both x- and y-axes, such that very little light is transmitted at any angle. The resulting refractive indices are provided in Refractive Index Set 5:

Refractive Index Set 5:

|  | nx | ny | nz |
| --- | --- | --- | --- |
| Material "A" | 1.826 | 1.62 | 1.50 |
| Material "B" | 1.50 | 1.50 | 1.50 |
| difference (Δn) | 0.326 | 0.12 | 0 |

Figure 19B:
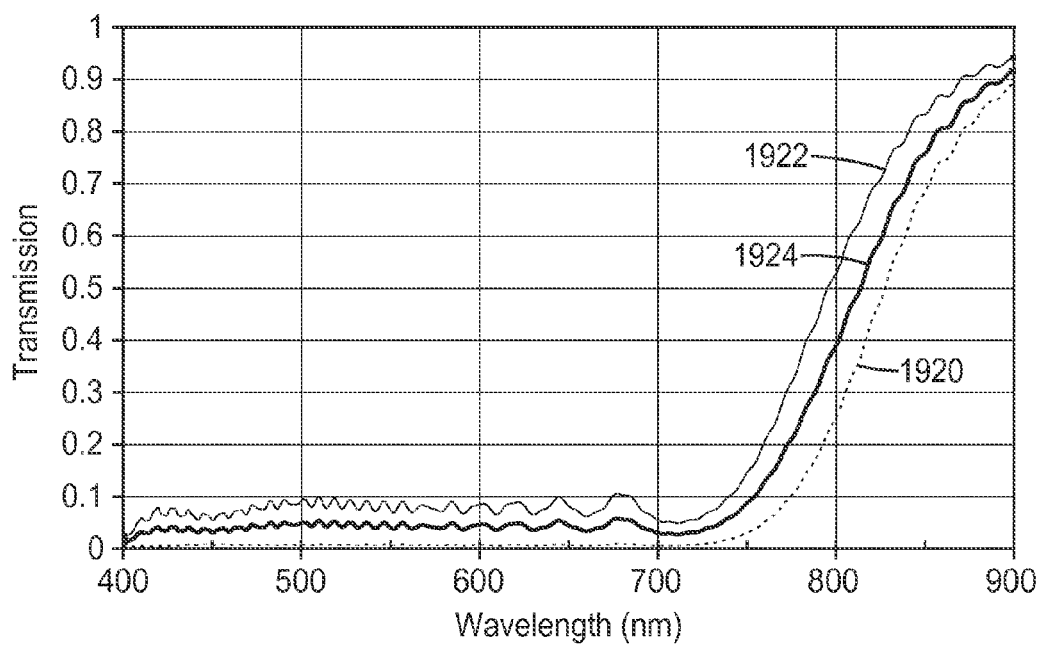
FIG. 19b is a modeled graph of spectral transmission of a multilayer optical film immersed in a 1.494 refractive index medium similar to FIG. 19a, but where the refractive index of the isotropic microlayers has been lowered so that the layer-to-layer refractive indices are matched along the thickness or z-axis, and the number of microlayers in the stack has been reduced from 551 to 221.
Figure 19C:
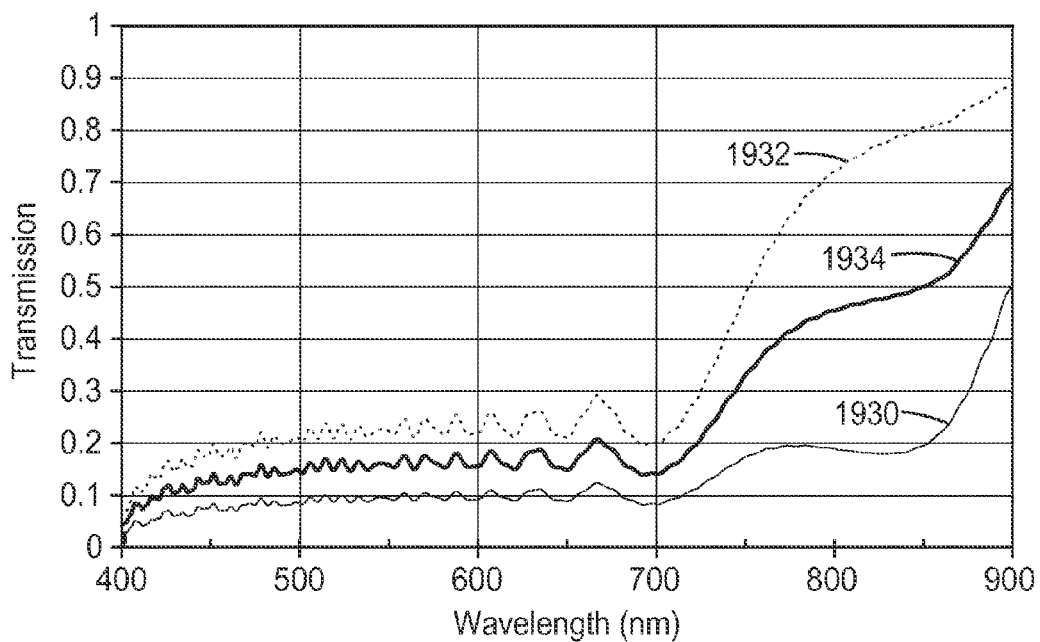
FIG. 19c is a modeled graph of spectral transmission similar for the embodiment of FIG. 19b, but where the spectral transmission is calculated for a different plane of incidence, namely, the plane of incidence is disposed at an angle $\phi=45$ rather than $\phi=10$.

In order to increase the transmission (and decrease reflection), we reduce the number of layers from 551 to 221 while controlling the monotonic thickness profile to keep the same bandwidth. The calculated transmission for the resulting film, which uses Refractive Index Set 5 is still optically immersed in the 1.494 refractive index medium, and is still oriented thick-side-out, is provided in FIGS. 19*b* and 19*c*, both of which also assume an absorbing polarizer (whose pass axis is parallel to the pass axis of the multilayer optical film) is attached to the output surface of the multilayer optical film. FIG. 19*b* shows the transmission for the same incident light ray direction as before (φ=10, θ=49 in the 1.494 index material), while FIG. 19*c* shows the transmission for a light ray whose polar angle θ is still 49 degrees in the 1.494 index material, but whose azimuthal angle φ has been changed to 45 degrees relative to the x-axis. In FIG. 19*b*, curve 1920 represents the transmission of p-polarized light, curve 1922 represents the transmission of s-polarized light, and curve 1924 represents the average of curves 1920 and 1922. In FIG. 19*c*, curve 1930 represents the transmission of p-polarized light, curve 1932 represents the transmission of s-polarized light, and curve 1934 represents the average of curves 1930 and 1932. Corresponding curves (not shown) were plotted by removing the absorbing polarizer from the output surface of the multilayer optical film so as to provide a better comparison to FIGS. 19*a* and 11*b*, which resulted in somewhat higher levels of transmission but about the same variability as a function of wavelength as the curves plotted in FIGS. 19*b* and 19*c*.

We see therefore that the amplitude of the spectral oscillations of the s- and p-pol transmission is much lower for matched z-indices (Δnz=0) than for materials having a large Δnz. It is evident that a small value of Δnz inhibits the oscillatory nature of the individual s- and p-pol transmission spectra, but one should keep in mind that the reflectivity of such films for p-polarized light does not increase with angle of incidence. On the other hand, the reflectivity of s-polarized light for such films exhibits a large increase when the value of Δny is large.

We next investigate uniaxial birefringent films, i.e., multilayer optical films in which one of the microlayers in each ORU is at least approximately uniaxially birefringent. Using the 221 microlayer, single packet, immersed multilayer optical film of FIG. 19*b* as a starting point, we adjust the refractive indices of the birefringent material so that it is uniaxially birefringent. Then, we investigate the effect of the refractive index of the isotropic material. The resulting refractive indices of the alternating A and B microlayers are provided below in Refractive Index Sets 6, 7, and 8:

Refractive Index Set 6:

|  | nx | ny | nz |
| --- | --- | --- | --- |
| Material "A" | 1.826 | 1.57 | 1.57 |
| Material "B" | 1.52 | 1.52 | 1.52 |
| difference (Δn) | 0.306 | 0.05 | 0.05 |

Refractive Index Set 7:

|  | nx | ny | nz |
| --- | --- | --- | --- |
| Material "A" | 1.826 | 1.57 | 1.57 |
| Material "B" | 1.57 | 1.57 | 1.57 |
| difference (Δn) | 0.256 | 0 | 0 |

Refractive Index Set 8:

|  | nx | ny | nz |
| --- | --- | --- | --- |
| Material "A" | 1.826 | 1.57 | 1.57 |
| Material "B" | 1.62 | 1.62 | 1.62 |
| difference (Δn) | 0.206 | −0.05 | −0.05 |

Figure 20A:
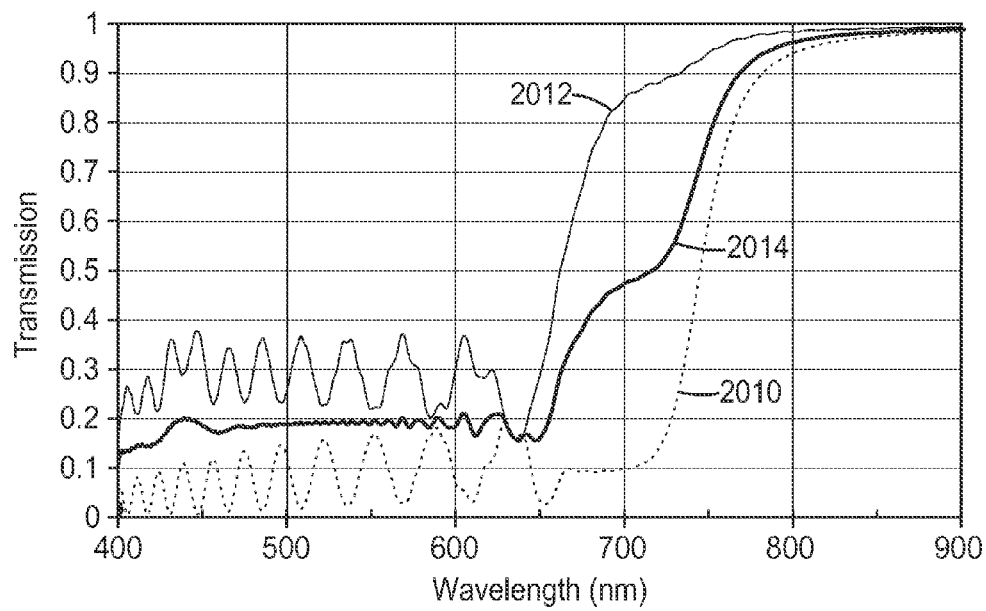
FIG. 20a is a modeled graph of spectral transmission of an immersed multilayer optical film having 551 microlayers, wherein one microlayer in each ORU is uniaxially birefringent and the other microlayer in each ORU is isotropic, the layer-to-layer refractive index differences along the y- and z-axes being positive but much smaller than the layer-to-layer refractive index difference along the x-axis, the multilayer optical film being oriented thick-side-out.
Figure 20B:
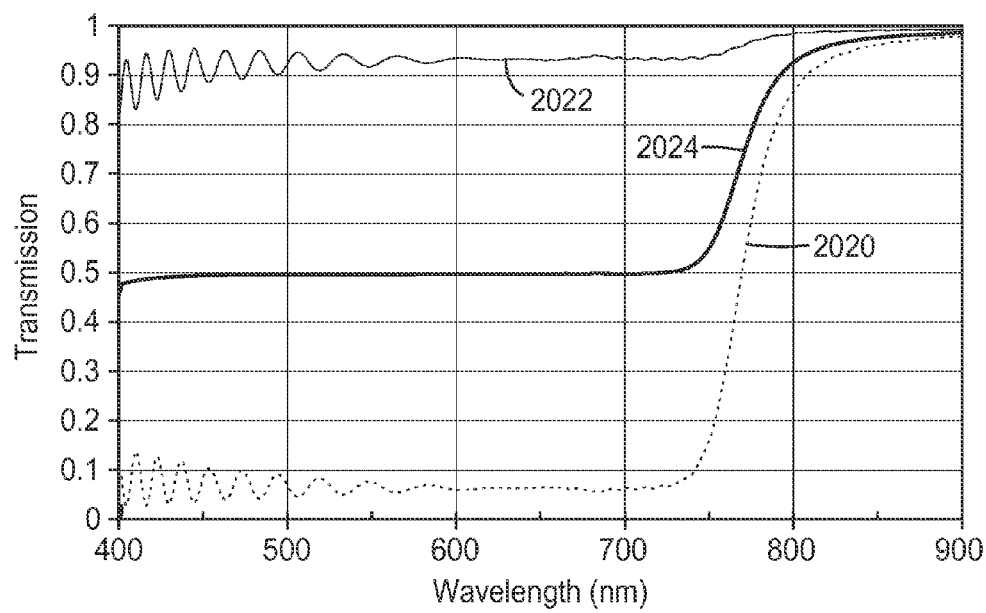
FIG. 20b is a modeled graph similar to FIG. 20b, but where the refractive index of the isotropic microlayers has been changed so that the layer-to-layer refractive index differences along the y- and z-axes are zero.
Figure 20C:
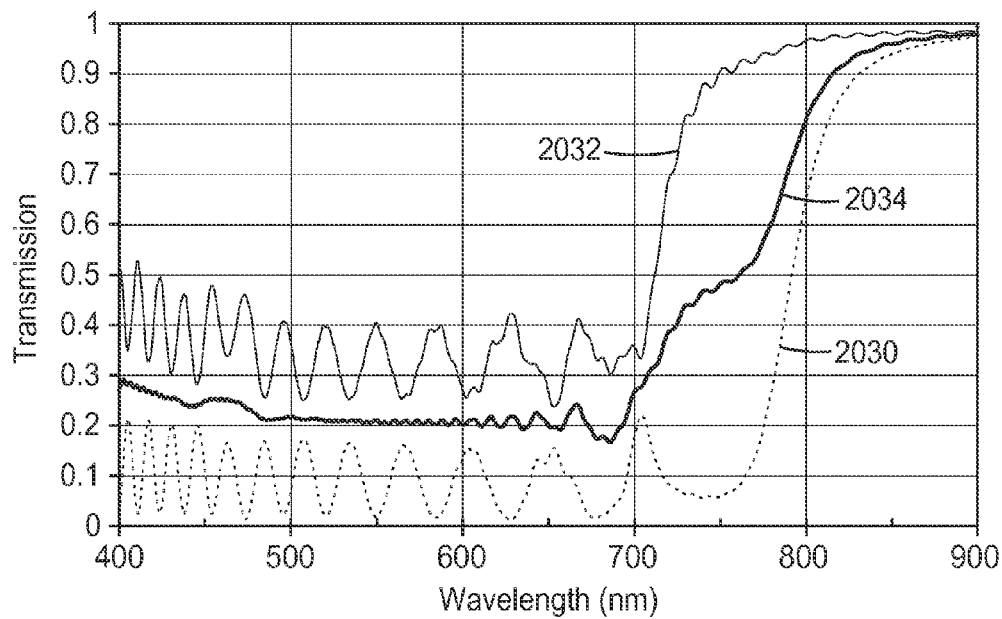
FIG. 20c is a modeled graph similar to FIGS. 20a and 20b, but where the refractive index of the isotropic microlayers has been changed so that the layer-to-layer refractive index differences along the y- and z-axes are negative.

We calculate the transmission of the resulting films, which still have a single packet of 221 microlayers, are still optically immersed in the 1.494 refractive index medium, and are still oriented thick-side-out. Unlike FIGS. 19*b* and 19*c*, there is assumed to be no absorbing polarizer between the output surface of the multilayer optical film and the semi-infinite medium of refractive index 1.494. The transmission is calculated for the same incident light ray direction as before (φ=10, θ=49 in the 1.494 index material). FIG. 20*a* shows the calculated transmission of such an immersed film whose microlayers have refractive indices as set forth in Refractive Index Set 6. In the figure, curve 2010 represents the transmission of p-polarized light, curve 2012 represents the transmission of s-polarized light, and curve 2014 represents the average of curves 2010 and 2012. FIG. 20*b* shows the calculated transmission of a similar immersed film but whose microlayers have refractive indices as set forth in Refractive Index Set 7. In the figure, curve 2020 represents the transmission of p-polarized light, curve 2022 represents the transmission of s-polarized light, and curve 2024 represents the average of curves 2020 and 2022. FIG. 20*c* shows the calculated transmission of a similar immersed film but whose microlayers have refractive indices as set forth in Refractive Index Set 8. In the figure, curve 2030 represents the transmission of p-polarized light, curve 2032 represents the transmission of s-polarized light, and curve 2034 represents the average of curves 2030 and 2032.

Upon review of FIGS. 20*a*, 20*b*, and 20*c*, we see that if the highly birefringent layer of the optical repeat units is approximately uniaxial, the transmission oscillations of the s-pol and p-pol components of the supercritical light can be small, but their amplitude is very dependent on the z index mismatch, Δnz. The lowest color occurs with both Δnz=0 and (n1y−n1z)=0.

We next investigate the color of immersed multilayer optical films whose normal incidence asymmetry is relatively small, i.e., whose block axis reflectivity is only slightly greater than its pass axis reflectivity. Depending on the degree of asymmetry, such multilayer optical films may in some applications be useable as mirrors or partial mirrors rather than as polarizers. Using the 221 microlayer, single packet, immersed multilayer optical films of FIGS. 20a-c as a starting point, we adjust the refractive indices of the materials so that the layer-to-layer refractive index mismatch along the y-axis is close to the mismatch along the x-axis. The resulting refractive indices of the alternating A and B microlayers are provided below in Refractive Index Set 9:

Refractive Index Set 9:

|  | nx | ny | nz |
|---|---|---|---|
| Material "A" | 1.766 | 1.738 | 1.492 |
| Material "B" | 1.592 | 1.592 | 1.592 |
| difference (Δn) | 0.174 | 0.146 | −0.100 |

Figure 21:
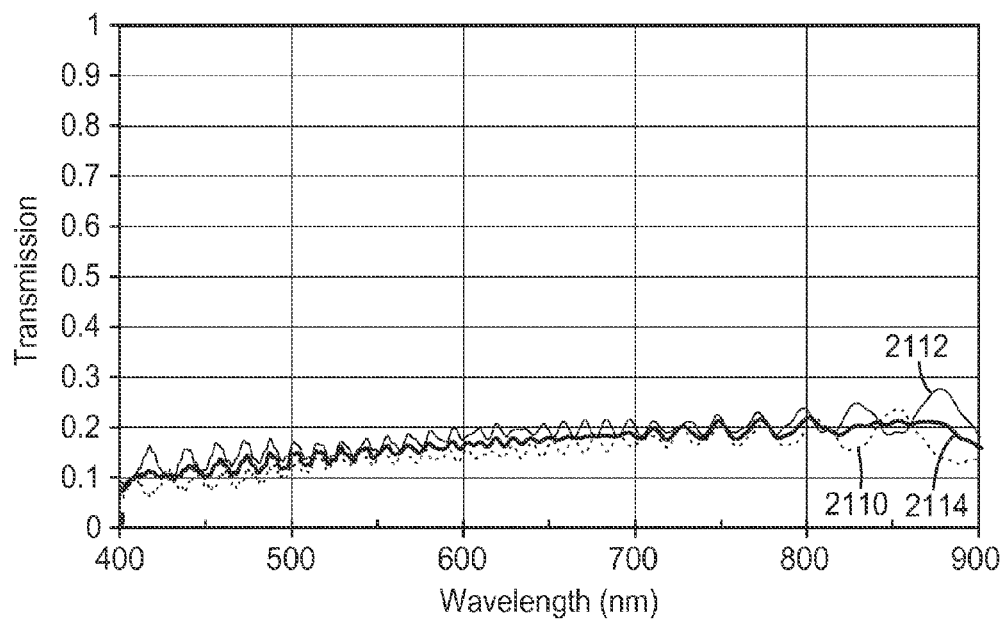
FIG. 21 is a modeled graph of an immersed multilayer optical film whose layer-to-layer refractive index difference along one in-plane axis (x-axis) is tailored to be relatively close to the layer-to-layer refractive index difference along the other in-plane axis (y-axis), such that the multilayer optical film more nearly behaves like a mirror than a reflective polarizer, the multilayer optical film being oriented thick-side-out.

We calculate the transmission of the resulting film, which still has a single packet of 221 microlayers, is still optically immersed in the 1.494 refractive index medium, and is still oriented thick-side-out. No absorbing polarizer is assumed to be present at the output surface of the multilayer optical film. The transmission is calculated for an incident light ray whose azimuthal angle φ is 20 degrees, and whose polar angle θ is 38 degrees measured in the 1.494 index material. (The polar angle of 38 degrees, which is not a supercritical angle but corresponds to a highly oblique angle in air, is used rather than 49 degrees because at 49 degrees the transmission of the immersed film was virtually zero as a result of the large value of Δny and the large negative value of Δnz.) FIG. 21 shows the calculated transmission of such an immersed film whose microlayers have refractive indices as set forth in Refractive Index Set 9. In the figure, curve 2110 represents the transmission of p-polarized light, curve 2112 represents the transmission of s-polarized light, and curve 2114 represents the average of curves 2110 and 2112.

Some observations that can be made in view of the foregoing experimental and modeling investigations are:
- a larger layer-to-layer z index mismatch tends to increase the amplitude of oscillation of the separate s and p-pol transmission spectra;
- selecting the refractive index of the isotropic material so that the layer-to-layer z-index mismatch is zero or near-zero greatly reduces the oscillatory behavior;
- if the birefringent microlayers are approximately uniaxial, the oscillations of both s-pol and p-pol light can be small, but their amplitude is very dependent on the z-index mismatch;
- nearly symmetric multilayer optical films (e.g., mirror-like films), in which the in-plane refractive index differences Δnx and Δny are nearly equal but larger in magnitude than Δnz, do not appear to generate much potential for color in an immersed system;
- overall, the layer-to-layer z-index difference Δnz appears to be the biggest driver of the spectral oscillations and the resulting color in immersed systems.

Further Discussion

Teachings of the present application can be used by the system designer to solve problems unique to the situation encountered when some or all of the following conditions occur simultaneously: the multilayer optical film is optically immersed; highly oblique light is incident on the immersed multilayer optical film; and light from the multilayer optical film is extracted toward a viewer via a structured surface or other suitable means. There are several instances of commercial importance where this situation will arise, and some of these are depicted in FIGS. 22 through 26a. In all cases, the upper light extraction structure (e.g., prisms) and the multilayer optical film may be the same if desired, but the manner in which the highly oblique light reaches the multilayer optical film may be different.

Figure 22:
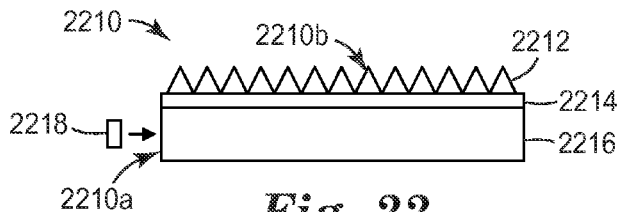
FIGS. 22, 22a, 23, 23a, 23b, 24, 24a, 25, 26, and 26a are schematic side or sectional views of various exemplary film constructions in which the multilayer optical film is optically immersed.
Figure 22A:
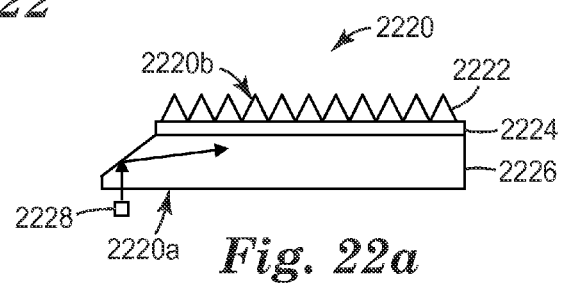

In FIG. 22, a film construction 2210 includes a prismatic light extraction layer 2212, a multilayer optical film 2214 as disclosed herein, and a solid light guide 2216. These components are joined together directly or indirectly with no air gaps such that the film 2214 is optically immersed. A light source 2218 is disposed proximate an input surface 2210a of the construction for edge injection, which allows supercritical light to propagate into the film 2214. Light is emitted from the construction 2210 from an output surface 2210b corresponding to the facets of the prisms in the layer 2212. In a variant of FIG. 22, a film construction 2220 (FIG. 22a) includes a prismatic light extraction layer 2222 (which may be the same as or similar to layer 2212), a multilayer optical film 2224 (which may be the same as or similar to film 2214), and a solid light guide 2226. A light source 2228 has been positioned behind the light guide rather than at the edge of the light guide, and light injected through an input surface 2220a is turned by total internal reflection (TIR) or by a reflective surface so as to propagate along the light guide. Supercritical light is able to propagate in the film 2224, and light is emitted from an output surface 2220b. In the embodiments of FIGS. 22 and 22a, the multilayer optical film can advantageously be oriented thin-side-out so as to reduce undesirable color in the system.

Figure 23:
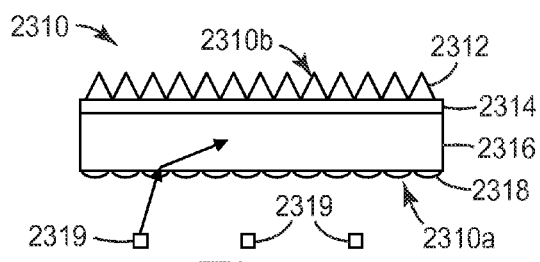

In FIG. 23, a film construction 2310 includes a prismatic light extraction layer 2312, a multilayer optical film 2314 as disclosed herein, a solid light guide 2316, and a structured surface layer 2318 which may be a lower portion of the light guide 2316 or a separate layer. The components are joined together directly or indirectly with no air gaps such that the film 2314 is optically immersed. Light sources 2319 are disposed proximate an input surface 2310a of the construction, which allows supercritical light to propagate in the film 2314. Light is emitted from the construction 2310 from an output surface 2310b corresponding to the facets of the prisms in the layer 2312. The structured surface of layer 2318, corresponding to the input surface 2310a, may be microreplicated or bead coated, for example.

The structured surface, alternatively referred to as a microstructured surface, in this and other disclosed embodiments may have a regular repeating pattern, a random pattern, or a combination thereof. The microstructured surface may be faceted, with identifiable edges or boundaries between adjacent facets or other features, or it may be undulating with no such edges or boundaries. The microstructured surface may be formed, cast, coated, made by microreplication techniques involving a mold, or made by any other suitable technique such as incorporating beads or other particles into an otherwise smooth layer. In some cases, the microstructured surface may include a plurality of linear prisms, each of the prisms extending parallel to a prism axis. The prism axis may, for example, be substantially parallel to the second axis of the film construction, but other orientations of the prism axis may also be used as desired. Other types of prisms, including but not limited to 3-sided prisms or 4-sided prisms, may also be used. In some cases, the microstructured surface may include a regular or irregular array of lenticular structures. Reference is made to U.S. Pat. No. 6,752,505 (Parker) for further examples of suitable microstructured surfaces.

In a first variant of FIG. 23, a film construction 2320 (FIG. 23a) includes a prismatic light extraction layer 2322 (which may be the same as or similar to layer 2312), a multilayer optical film 2324 (which may be the same as or similar to film 2314), a solid light guide 2326 (which may be the same as or similar to light guide 2316), and a prismatic light injection layer 2328. Light sources 2319 are positioned behind the light guide as in FIG. 23, and light injected through an input surface 2320a is refracted by the layer 2328 into the light guide, allowing supercritical light to propagate into the film 2324. Light is emitted from an output surface 2320b.

In another variant of FIG. 23, a film construction 2330 (FIG. 23b) includes a prismatic light extraction layer 2332 (which may be the same as or similar to layer 2312), a multilayer optical film 2334 (which may be the same as or similar to film 2314), a solid light guide 2336 (which may be the same as or similar to light guide 2316), and a light injection layer 2338 (which may be the same as or similar to layer 2318). Rather than being positioned directly behind the light guide, a light source 2339 is positioned behind but along an edge of the light guide. Light injected through an input surface 2330a is refracted by the layer 2338 into the light guide, allowing supercritical light to propagate in the film 2324. Light is emitted from an output surface 2330b.

Figure 23A:
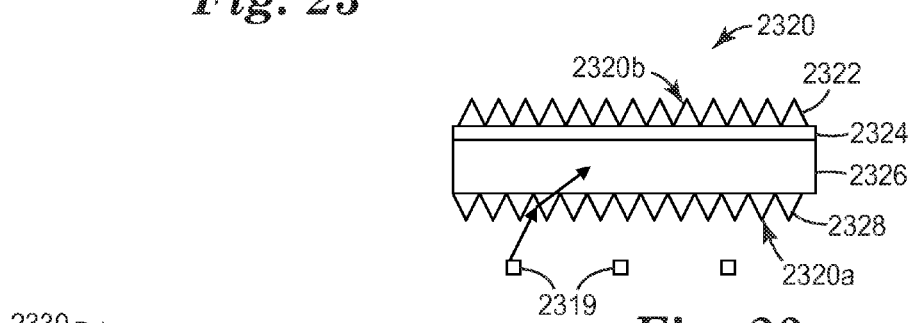
Figure 23B:
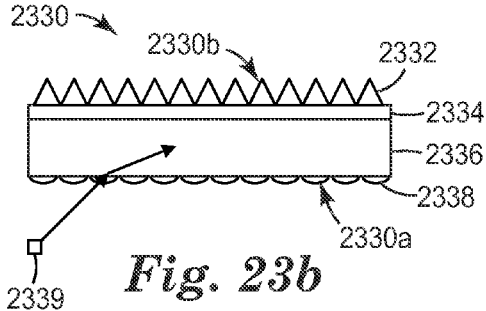

FIGS. 23 and 23a depict "direct lit" configurations, where light encounters a structured surface from the underside of a film or plate, which refracts or scatters at least a portion of the light to high angles. In FIG. 23b, the light source 2339, which may be one or more LEDs, for example, is mounted near an edge of the backlight, and is compatible with a hollow backlight design. The solid light guide in these and other figures may be or comprise a polymer plate, or the light guide may be omitted, and a structured surface may be coated or cast directly on the multilayer optical film. In the embodiments of FIGS. 23, 23a, and 23b, the multilayer optical film can advantageously be oriented thin-side-out so as to reduce undesirable color in the system.

Figure 24:
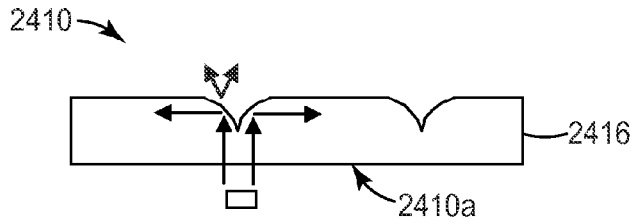

In FIG. 24, a device 2410 is shown that includes a solid light guide 2416 in which a plurality of depressions have been formed in an upper surface thereof. A light source disposed behind the light guide 2416 injects light through an input surface 2410a, and some of this light passes through the light guide, encounters a depression, and is turned to within the critical angle for TIR. The depression could reflect the light by TIR if so designed, or it could be coated with a reflective material such as silver. A small amount of transmission through the depression may be desirable so as to avoid a dark spot to a viewer or display disposed above the light guide. This can be engineered into the shape of the depression, and/or into the reflective coating, if used.

Figure 24A:
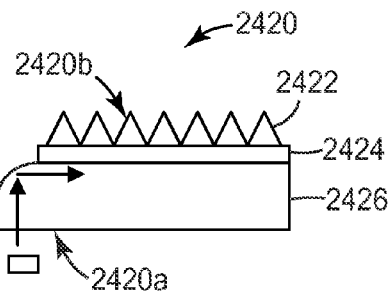

FIG. 24a shows a more complete film construction than FIG. 24. In FIG. 24a, a film construction 2420 includes a prismatic light extraction layer 2422, a multilayer optical film 2424 as disclosed herein, and a solid light guide 2426, (which may the same as or similar to the light guide 2416 of FIG. 24). The components are joined together directly or indirectly with no air gaps such that the film 2424 is optically immersed. A light sources is disposed proximate an input surface 2420a of the construction, which allows supercritical light to propagate in the film 2424. Light is emitted from the construction 2420 from an output surface 2420b corresponding to the facets of the prisms in the layer 2422. The multilayer optical film 2424 can advantageously be oriented thin-side-out so as to reduce undesirable color in the system.

Figure 25:
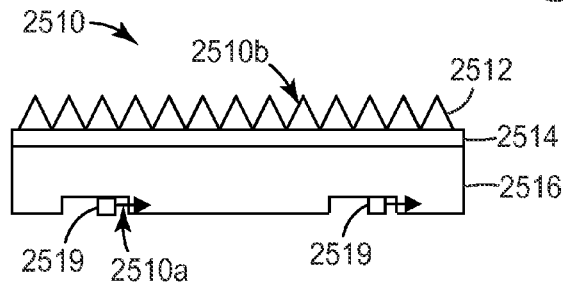

In FIG. 25, a film construction 2510 includes a prismatic light extraction layer 2512, a multilayer optical film 2514 as disclosed herein, and a solid light guide 2516. The components are joined together directly or indirectly with no air gaps such that the film 2514 is optically immersed. Light sources 2519 are disposed as shown proximate slots formed in the lower surface of the light guide, which serve as an input surface 2510a of the construction, allowing supercritical light to propagate in the film 2514. Light is emitted from the construction 2510 from an output surface 2510b corresponding to the facets of the prisms in the layer 2512. In this embodiment, light injection into the light guide occurs at positions other than the edge of the light guide. The light sources 2519 may be side-emitting LEDs positioned under the light guide within the two slots so as to inject light into the guide. Tens or hundreds of these injection points could be used for applications such as dynamically dimmed backlights for LCD TV. Dynamic dimming provides significant contrast improvement and power savings.

Figure 26:
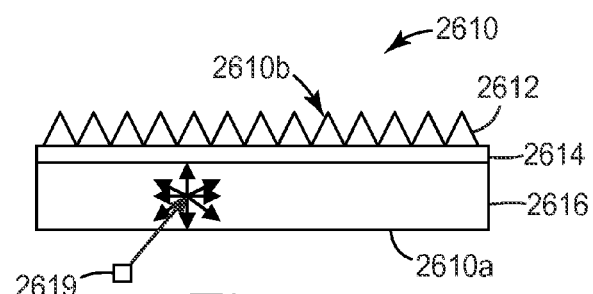
Figure 26A:
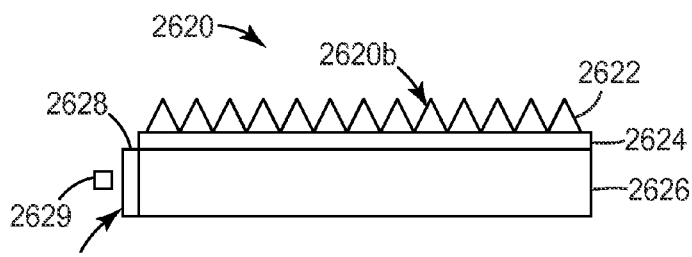

In FIG. 26, a film construction 2610 includes a prismatic light extraction layer 2612, a multilayer optical film 2614 as disclosed herein, and a solid light guide 2616. The components are joined together directly or indirectly with no air gaps such that the film 2614 is optically immersed. The light guide 2616 is provided with down-converting materials such as phosphor(s) and/or fluorescent material(s), which operate to introduce highly oblique light into the system. Light from a light source 2619 may be relatively short wavelength such as blue or ultraviolet (UV), and after passing through an input surface 2610 of the construction, this light may be absorbed by the down-converting material(s) and re-emitted at longer wavelengths and in all directions in the light guide. Supercritical light is thus again allowed to propagate in the film 2614. Light is emitted from the construction 2610 from an output surface 2610b corresponding to the facets of the prisms in the layer 2612. FIG. 26 can also represent a system where the light guide plate 2616 contains internal scattering materials or structures instead of or in addition to the down-converting material(s). In this regard, the light guide plate 2616 may represent a diffusive light guide, or alternatively a diffuser plate that does not significantly guide light laterally, i.e., a diffuser plate that is not a light guide plate.

In a variant of FIG. 26, a film construction 2620 (FIG. 26a) includes a prismatic light extraction layer 2622 (which may be the same as or similar to layer 2612), a multilayer optical film 2624 (which may be the same as or similar to film 2614), a solid light guide 2626, and a down-converting component 2628 attached to an edge (or any other desired portion) of the light guide. Light source 2629 is positioned proximate an input surface 2620a which coincides with a surface of the component 2628. Just as with light source 2619, light source 2629 may emit light of a relatively short wavelength such as blue or UV. This light passes through the input surface 2620a, is absorbed by down-converting material(s) in the component 2628, and re-emitted at longer wavelengths and in all directions. This re-emitted light then propagates at highly oblique angles in the light guide as in FIG. 26, and some propagates into the multilayer optical film 2624 at supercritical angles. Light is emitted from an output surface 2620b.

Figure 27:
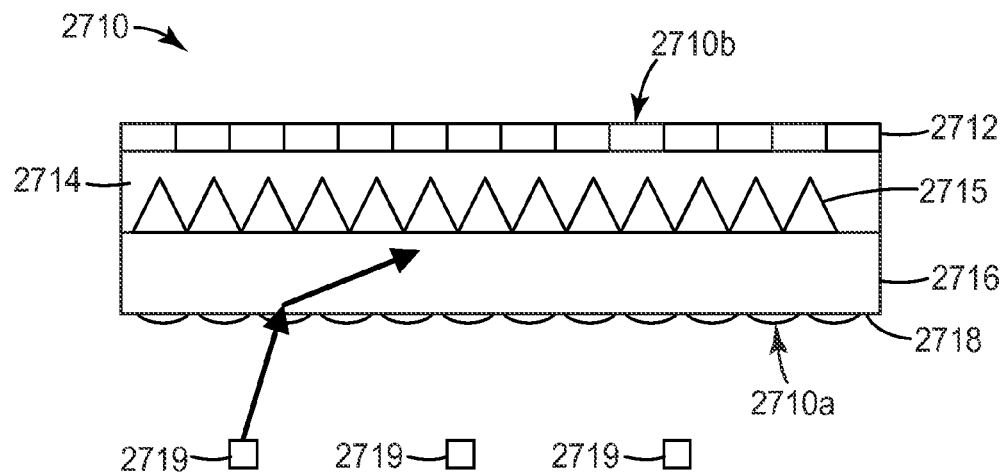
FIG. 27 is a schematic side or sectional view of another exemplary film construction in which the multilayer optical film is optically immersed.

A significant end-use of the unitary product constructions described herein is in integration with other optical components such as a liquid crystal display (LCD) panel. FIG. 27 shows such a device 2710 that utilizes, among other things, an optically immersed multilayer optical film 2716 and a planarized ultra-low index (ULI) coating 2714. The device 2710 includes an LCD panel 2712, the planarized ULI coating 2714, a prismatic light extraction layer 2715, the multilayer optical film 2716, and a structured surface layer 2718 which may be a lower portion of the light guide 2716 or a separate layer. The components are joined together directly or indirectly with no air gaps such that the film 2716 is optically immersed. Light sources 2719 are disposed proximate an input surface 2710a of the construction, which allows supercritical light to propagate in the film 2716. Light is emitted from the device 2710 from an output surface 2710b corresponding to an output surface of the LCD panel. The structured surface of layer 2718, corresponding to the input surface 2710a, may be microreplicated or bead coated, for example. In the figure, adhesive between the ULI coating 2714 and the panel 2712 is not shown, but may be included.

Some or all of the constructions described in connection with FIGS. 22 through 26a may also be integrated with an LCD panel, in like fashion to FIG. 27. Further variations of the disclosed embodiments involve attaching a back reflector (see e.g. element 1640 in FIG. 16) a back or rear surface of a light guide plate (see e.g. element 1636 in FIG. 16).

Figure 28:
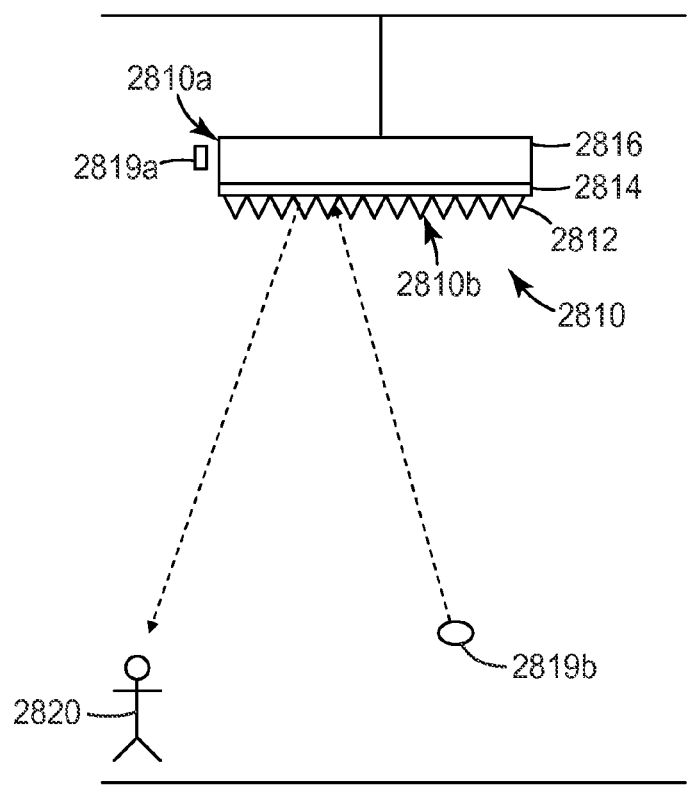
FIG. 28 is a schematic side view of an arrangement in which a luminaire includes a film construction wherein the multilayer optical film is optically immersed.

In many of the disclosed embodiments, the viewer and the light source are not disposed on the same side of the light management stack, i.e., the same side of the multilayer optical film construction. However, this may occur in some applications, one of which is shown in FIG. 28. This figure is a schematic side view of an arrangement in which a luminaire 2810 includes a film construction wherein a multilayer optical film 2814 is optically immersed. The film construction includes a prismatic light extraction layer 2812, the multilayer optical film 2814, and a solid light guide 2816. These components are joined together directly or indirectly with no air gaps such that the film 2614 is optically immersed. A light source 2819a is positioned proximate an input surface 2810a of the construction that corresponds to a side surface of the light guide. Highly oblique light is thus introduced into the light guide, and is able to propagate in the film 2814. Such light exits the construction at an output surface 2810b, corresponding to the faceted surface of the extraction layer 2812. In one mode of operation, light that is emitted from the surface 2810b originates from the light source 2819a. However, in another mode of operation, light from an ambient source 2819b can enter the construction through the surface 2810b, propagate in the multilayer optical film 2814, and be reflected back out of the surface 2810b. In this mode of operation, the surface 2810b functions both as an input surface and an output surface. This mode of operation is similar to the reflective mode of a transflective LCD display. Whether in a luminaire application or in a transflective LCD display, patches of color nonuniformity that result from an improperly installed optically immersed multilayer optical film would be highly objectionable. Whether in transmissive or reflective mode, the thin side of the multilayer optical film preferably faces the viewer 2820 or output surface 2810b for lowest color. Thus, the teachings of the present application can be used also in these applications to design and orient the multilayer optical film in a way that minimizes such color.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. For example, the reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. A film construction having an input surface and an output surface, comprising:
    a plurality of microlayers arranged into optical repeat units (ORUs) to selectively reflect light by constructive or destructive interference, the microlayers having a greater reflectivity for normally incident light polarized along a first axis than for normally incident light polarized along a second axis, the first and second axes defining a film plane;
    wherein the microlayers are optically immersed in a medium having a refractive index greater than air, such that supercritical light can propagate through the plurality of microlayers;
    wherein the ORUs have a layer thickness distribution along a thickness axis perpendicular to the film plane, the layer thickness distribution having an average thickness and being effective to provide the plurality of microlayers with an intermediate reflectivity over an extended reflection band for a given incidence condition, the ORUs comprising thinner ORUs whose thicknesses are less than the average thickness, and thicker ORUs whose thicknesses are greater than the average thickness;
    wherein the microlayers are oriented such that, on average, the thinner ORUs are closer than the thicker ORUs to the output surface; and
    wherein the reflectivity for normally incident light polarized along the first axis is R1 over visible wavelengths and the reflectivity for normally incident light polarized along the second axis is R2 over visible wavelengths, and wherein R1 is at least 50% and R2 is at least 10%.

2. The construction of claim 1, wherein the microlayers are arranged in a single optical packet, and the thinner ORUs are disposed predominantly on a first side of the optical packet, and the thicker ORUs are disposed predominantly on a second side of the optical packet, the first side facing the output surface of the film construction.

3. The construction of claim 1, wherein the microlayers are arranged in at least two distinct optical packets.

4. The construction of claim 1, wherein the plurality of microlayers includes a first set of microlayers comprising a first material and a second set of microlayers comprising a second material different from the first material.

5. The construction of claim 4, wherein each of the ORUs comprises a first microlayer from the first set of microlayers and a second microlayer from the second set of microlayers.

6. The construction of claim 5, wherein the first material is biaxially birefringent.

7. The construction of claim 5, wherein the first material is uniaxially birefringent.

8. The construction of claim 5, wherein the second material is isotropic.

9. The construction of claim 1, wherein the construction comprises first and second opposed major surfaces exposed to air, and wherein the input surface is the first major surface and the output surface is the second major surface.

10. The construction of claim 1, wherein the plurality of microlayers comprise low absorption materials such that percent transmission plus percent reflection of the plurality of microlayers is about 100%, and wherein the intermediate reflectivity comprises an average reflectivity for the given incidence condition of at least 10% but less than 90% over visible wavelengths from 400-700 nm.

11. The construction of claim 10, wherein the given incidence condition is for the normally incident light polarized along the second axis.

12. The construction of claim 1, further comprising:
a first optical element connected to the plurality of microlayers with no air gap.

13. The construction of claim 12, wherein the first optical element comprises a microstructured surface.

14. The construction of claim 13, wherein the microstructured surface comprises a plurality of linear prisms.

15. The construction of claim 12, wherein the first optical element comprises a layer of ultra low index (ULI) material whose refractive index is in a range from 1.1 to 1.3.

16. An optical system, comprising:
the construction of claim 1; and
a light source disposed to introduce light into the construction through the input surface.

17. The system of claim 16, further comprising a display panel disposed proximate the output surface.

18. The system of claim 16, wherein the construction comprises a first optical element connected to the plurality of microlayers with no air gap.

19. The system of claim 18, wherein the first optical element comprises a light guide, and the input surface comprises a side surface of the light guide.

20. The system of claim 18, wherein the first optical element comprises an optically thick layer, and the input surface comprises a major surface of the optically thick layer.

21. The system of claim 20, wherein the major surface comprises a microstructured surface.

22. The system of claim 20, wherein the optically thick layer comprises light diffusive elements disposed therein.

23. The system of claim 20, further comprising an LCD panel, the LCD panel being connected to the film construction with no air gap.

* * * * *

UNITED STATES PATENT AND TRADEMARK OFFICE
CERTIFICATE OF CORRECTION

PATENT NO. : 9,057,843 B2  
APPLICATION NO. : 13/501860  
DATED : June 16, 2015  
INVENTOR(S) : Weber et al.

Page 1 of 1

It is certified that error appears in the above-identified patent and that said Letters Patent is hereby corrected as shown below:

In the specification

Column 15
Line 10, Delete "$\Delta n_y$," and insert -- $\Delta n_z$ --, therefor.

Column 23
Line 48, Delete "$3^{th}$," and insert -- $3^{rd}$, --, therefor.

Signed and Sealed this
Fifteenth Day of March, 2016

Michelle K. Lee
*Director of the United States Patent and Trademark Office*